US005555189A

United States Patent [19]
Yamazato et al.

[11] Patent Number: 5,555,189
[45] Date of Patent: Sep. 10, 1996

[54] INTERNAL COMMUNICATIONS SYSTEM FOR REFRIGERATOR AND WIRING STRUCTURE THEREOF

[75] Inventors: Hisao Yamazato, Hirakata; Naoki Tani, Nara; Naohiko Aoki, Ikoma-gun; Jyunzou Kasihara, Kashiba; Yasunari Uramoto, Kitakyushu, all of Japan

[73] Assignee: Sharp Kabushiki Kaisha, Osaka, Japan

[21] Appl. No.: 430,357

[22] Filed: Apr. 28, 1995

Related U.S. Application Data

[62] Division of Ser. No. 95,402, Jul. 23, 1993, Pat. No. 5,485,397.

[30] Foreign Application Priority Data

| Jul. 30, 1992 | [JP] | Japan | 4-203641 |
|---|---|---|---|
| Jan. 21, 1993 | [JP] | Japan | 5-8039 |
| Mar. 4, 1993 | [JP] | Japan | 5-44050 |
| Apr. 9, 1993 | [JP] | Japan | 5-83330 |
| May 7, 1993 | [JP] | Japan | 5-106681 |

[51] Int. Cl.[6] .............. H01B 7/00; H02J 5/00; F16L 11/12
[52] U.S. Cl. .......... 364/492; 364/138; 364/514 R; 340/825.06; 340/825.07; 361/601; 174/47
[58] Field of Search .......... 364/492, 138, 364/550, 551.01, 132, 514 R, 505; 340/310.01, 310.02, 310.03, 310.04, 310.05, 310.06, 310.07, 310.08, 825.02, 825.06, 825.07, 825.43, 825.52; 138/112, 165; 174/47; 361/601, 627, 637; 62/331

[56] References Cited

U.S. PATENT DOCUMENTS

| 2,320,093 | 5/1943 | Moore | 138/112 |
|---|---|---|---|
| 3,126,444 | 3/1964 | Taylor | 138/165 |
| 3,987,249 | 10/1976 | Andersen | 370/114 |
| 4,048,620 | 9/1977 | Crandall et al. | 340/163 |
| 4,234,926 | 11/1980 | Wallace et al. | 364/138 |
| 4,368,348 | 1/1983 | Eichelberger et al. | 174/47 |
| 4,522,114 | 6/1985 | Matsuno | 174/47 |
| 4,535,401 | 8/1985 | Penn | 364/138 |
| 4,623,976 | 11/1986 | Carp et al. | 364/571.07 |
| 4,716,516 | 12/1987 | DuLong | 364/132 |
| 4,742,475 | 5/1988 | Kaiser et al. | 364/138 |
| 4,744,218 | 5/1988 | Edwards et al. | 340/825.06 |
| 4,791,547 | 12/1988 | Petroff | 364/138 |
| 4,808,994 | 2/1989 | Riley | 340/825.06 |
| 4,831,558 | 5/1989 | Shoup et al. | 340/825.06 |

(List continued on next page.)

FOREIGN PATENT DOCUMENTS

| 149639 | 1/1991 | China . |
|---|---|---|
| 55-116074 | 9/1980 | Japan . |
| 60-101561 | 5/1985 | Japan . |
| 62-156787 | 10/1987 | Japan . |
| 292994 | 11/1989 | Japan . |
| 310858 | 2/1991 | Japan . |

*Primary Examiner*—Emanuel T. Voeltz
*Assistant Examiner*—Eric W. Stamber

[57] ABSTRACT

A communication system is provided in electric devices such as refrigerators. Refrigerators include a plurality of output units such as electric fans, electric dampers, and output units such as sensors, thermistors, etc. The communication system is provided in the vicinity of the input and output units. The communication system includes a plurality of sub-control sections for controlling operations of the output units, a main control section for controlling the electric device by controlling operations of each sub-control section, a single communication-use cable for connecting the main control section and the sub-control sections so as to permit communications between them. The communication system permits a reduction in the number of cables required for connecting the main control section to the input and output units and simplified processes for routing the cables. As a result, compact size electric devices and reduction in manufacturing costs are enabled. Also included in refrigerators and cold guide members in the form, for example, of a pipe. Communication lines and wiring members can be located, for example, in the pipe itself or the wall of the pipe.

19 Claims, 46 Drawing Sheets

U.S. PATENT DOCUMENTS

| | | | |
|---|---|---|---|
| 4,850,396 | 7/1989 | McClish et al. | 174/47 |
| 4,864,519 | 9/1989 | Appleby et al. | 364/138 |
| 4,910,658 | 3/1990 | Dudash et al. | 364/138 |
| 4,920,758 | 5/1990 | Janke et al. | 62/187 |
| 4,924,680 | 5/1990 | Janke et al. | 62/187 |
| 4,929,940 | 5/1990 | Franaszek et al. | 340/825.02 |
| 4,970,871 | 11/1990 | Rudick | 62/187 |
| 4,973,957 | 11/1990 | Shimizu et al. | 340/825.06 |
| 4,985,845 | 1/1991 | Gotz et al. | 364/492 |
| 5,044,445 | 9/1991 | Kayahara | 174/47 |
| 5,089,974 | 2/1992 | Demeyer et al. | 364/492 |
| 5,109,534 | 4/1992 | Naito et al. | 174/47 |
| 5,122,948 | 6/1992 | Zapolin | 364/138 |
| 5,134,250 | 7/1992 | Caveney et al. | 138/165 |
| 5,142,277 | 8/1992 | Yarberry et al. | 340/825.06 |
| 5,216,778 | 6/1993 | Suzuki et al. | 174/47 |
| 5,218,552 | 6/1993 | Stirk et al. | 364/492 |
| 5,225,632 | 7/1993 | Gorin et al. | 174/47 |
| 5,247,450 | 9/1993 | Clark | 364/138 |
| 5,311,172 | 5/1994 | Sadamori | 340/825.06 |
| 5,334,801 | 8/1994 | Mohn | 174/47 |
| 5,348,099 | 9/1994 | Yokoi | 174/47 |
| 5,442,518 | 8/1995 | Beam | 174/47 |

FIG.11

| | COMPRESSOR 15 | ELECTRIC FAN 10 | ELECTRIC DAMPER 14 | DOOR SWITCH 7a | DOOR SWITCH 7b | THERMISTOR 8b / ROOM TEMPERATURE IN COOLING COMPARTMENT 3 | THERMISTOR 8a / ROOM TEMPERATURE IN REFRIGERATING COMPARTMENT 2 |
|---|---|---|---|---|---|---|---|
| PRESENT | 1 | 0 | 1 | 0 | 1 | 00001110 (15°C) | 10001010 (-10°C) |
| 1 HOUR BEFORE | 1 | 0 | 1 | 1 | 1 | 00001000 (8°C) | 10001110 (-15°C) |
| 2 HOURS BEFORE | 1 | 0 | 1 | 0 | 1 | 00000101 (5°C) | 10010001 (-17°C) |

FIG.13

| | 2 HOURS BEFORE | 1 HOUR BEFORE | PRESENT |
|---|---|---|---|
| COMPRESSOR 15 | 1 | 1 | 1 |
| ELECTRIC FAN 10 | 0 | 0 | 0 |
| ELECTRIC DAMPER 14 | 1 | 1 | 1 |
| ⋮ | ⋮ | ⋮ | ⋮ |
| DOOR SWITCH 7a | 0 | 1 | 0 |
| DOOR SWITCH 7b | 1 | 1 | 1 |
| ⋮ | ⋮ | ⋮ | ⋮ |
| THERMISTER 8b (ROOM TEMPERATURE IN COOLING COMPARTMENT 3) | 00000101 (5°c) | 0000100 (8°c) | 00001110 (15°c) |
| TERMISTER (ROOM TEMPERATURE IN REFRIGERATING COMPARTMENT 2) | 10010001 (−17°c) | 10001110 (−15°c) | 10001010 (−10°c) |

FIG. 23
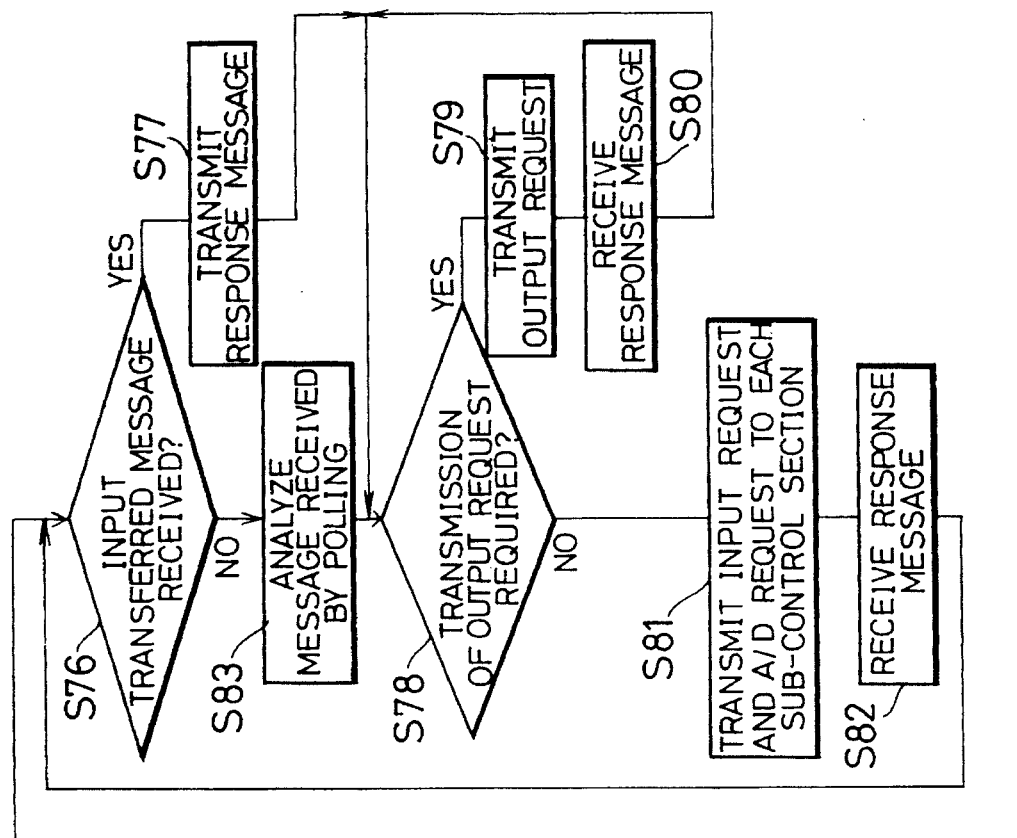
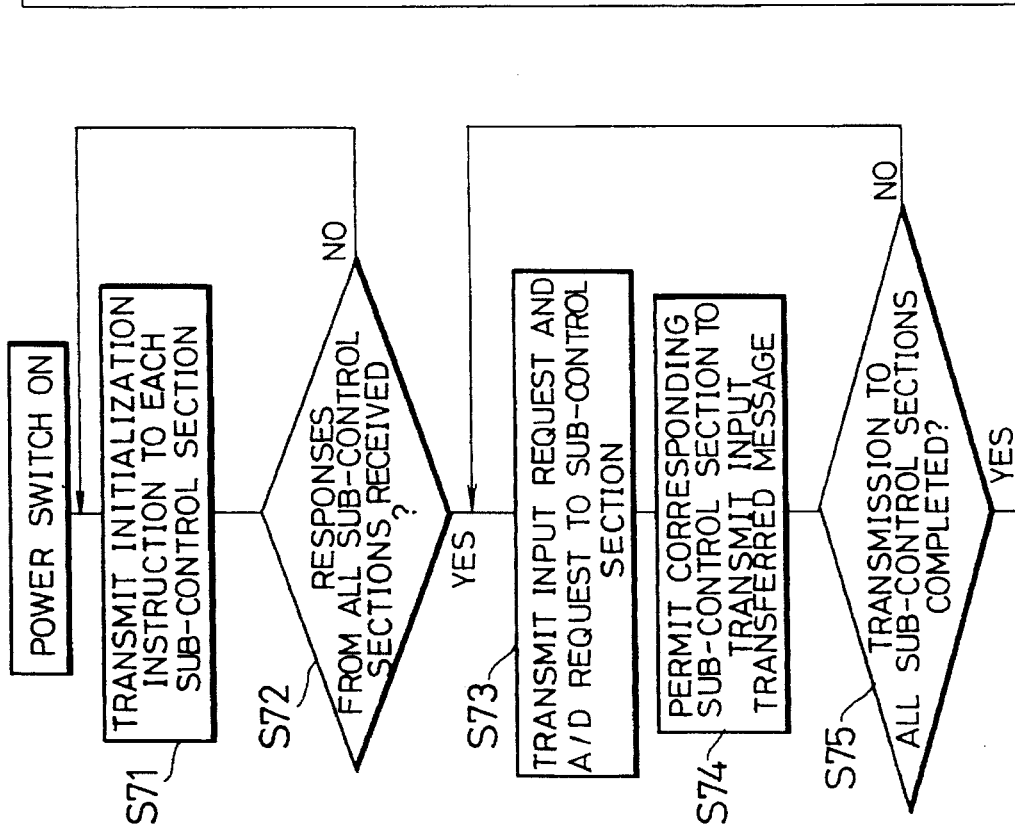

INTERNAL COMMUNICATIONS SYSTEM FOR REFRIGERATOR AND WIRING STRUCTURE THEREOF

This application is a divisional of application Ser. No. 08/095,402, filed on Jul. 23, 1993 now U.S. Pat. No. 5,485,397 issued Jan. 16, 1996, the entire contents of which are hereby incorporated by reference.

FIELD OF THE INVENTION

The present invention relates to a communication system provided in an electric device such as a refrigerator including a plurality of input units such as sensors, and output units such as lamps, etc.

BACKGROUND OF THE INVENTION

Recently, electric devices such as refrigerators, etc., are provided with many sensors and actuators within them in order to meet the demand for a plurality of different and intricate functions. The schematic configuration of a conventional refrigerating and cooling device provided with a communication system will be explained below with reference to FIG. 46.

As shown in FIG. 46, the conventional refrigerating and cooling device is provided with a control section 501 on the upper part of the device. Further, the following output units (actuators) are provided within a refrigerating compartment 548, a cooling compartment 549, and a vegetable compartment 550, or outside a casing 536 in respective predetermined positions: a compressor 522 for supplying cold air into an evaporator (not shown); a heater 544 for removing frost adhering to the evaporator; an electrical fan 545 for circulating cold air generated from the evaporator into the compartments 548, 549, and 550; an electrically operated damper 546 provided along a cold air path between the refrigerating compartment 548 and the cooling compartment 549. Further, the refrigerating and cooling device is also provided with sensors such as thermistors 541, 542, and 543. Because the above output units are electrically connected to the respective control sections 501, most one to one, more than two wires 515 are provided for each output unit. The communication system is mainly composed of the control sections 501 and many wires 515. Additionally, the wires 515 and feeders 523 are provided on the back surface of the casing 536.

The control section 501 is provided with a power circuit 502, a microcomputer 503 which is an essential part of the control system, an input circuit 509 for receiving a signal from sensors, a drive circuit 510 in each output unit, a drive unit 511 for activating each of the above output units, a connector 540 for electrically connecting the wires 515, which are connected to each output unit, and the microcomputer 503, and other units. AC power is supplied from an AC power supply (not shown) to the power circuit 502 through the feeder 523. A part of the AC power supplied to the power circuit 502 is stepped down and rectified in the power circuit 502. Then, after being converted into DC power in the power circuit 502, it is supplied to each output unit through the drive circuit 510 and the drive unit 511. In the meantime, with a further stepdown, it is supplied to the microcomputer 503, etc.

Based on signals received from sensors through the input circuit 509, the microcomputer 503 controls each output unit through the drive circuit 510 and the drive unit 511 so as to adjust the respective temperatures in the compartments 548, 549, and 550.

However, in the above arrangement of conventional devices, because the output units and sensors are electrically and directly connected one to one to the respective control sections 501, the same number of I/O units as the number of output units and sensors are required in the microcomputer 503. Moreover, a large number of wires are required for connecting output units and sensors to the respective control sections 501, thereby presenting the problem of noise being generated in controlling the output units.

When a large number of wires 515 are required, for example, when manufacturing the refrigerating and cooling device, the process for routing the wires 515 becomes complicated, and a long time is required for the process. Moreover, when long wires (for example, with the length of over 100 m) are used, problems such as disconnection of the wires are likely to occur. The above arrangement also presents the problem of increases in the weight and the manufacturing cost of the device.

The wires 515 are normally provided in the heat insulating material provided between the casing 536 and an outer casing of the device. Therefore, in order to provide a large number of wires 515, the heat insulating material must be made thicker, thereby presenting the problem of, for example, reducing the volume efficiency in the refrigerating and cooling device.

When the electric devices such as refrigerating and cooling devices have been manufactured in the factory, performance tests are required to check if each internal device in the main device performs properly. These performance tests require a long time in conventional models. For example, when the performance tests of the electric damper 546 are carried out to check if the electric damper 146 opens and closes properly, the temperature of the thermistor 542 must be dropped using a cooling agent. Thus, the performance test cannot be carried out easily. As described, in conventional models, carrying out the performance tests is a large burden to the workers, and a long time is required for the performance tests, thereby reducing manufacturing efficiency.

When trouble has occurred in an electric device, such as a refrigerating and cooling device, in the user's place, in order to figure out the cause of the trouble, a serviceman carries out performance tests for input units, such as sensors, and output units, such as heaters. Conventionally, the serviceman disassembles the electric device for the performance tests. Therefore, the cause of trouble in the electric device cannot be figured out quickly in the user's place, and a long time is required for fixing the device, thereby hindering the serviceman from offering efficient services.

As shown in FIG. 47, some conventional refrigerating and cooling devices are arranged such that control information is transmitted and received among a main control section 601, a display control section 602, and an ice-making control section 603 through the communication lines 608 and 609. The display control section 602 is provided for controlling display on a display section (not shown). The ice-making substrate 603 is provided for controlling the operations in the ice-making compartment.

In order to connect the main control section 601 and the display control section 602, and to connect the main control section 601 and the ice-making control section 603, wiring materials are necessary. The wiring materials include the DC power feeder 605 and a earth conductor 606 for supplying power, a synchronization clock line 607, and a pair of communication lines 608 and 609. The communication processes between the main control section 601 and the display control section 602 are the same as the communication processes between the main control section 601 and the ice-making control section 603. Thus, only the communication processes between the main control section 601 and the display control section 602 will be explained below with reference to the timing chart of FIG. 48.

When the device is set in the test mode, one-way serial communications are carried out from the main control section 601 to the display control section 602 through the communication line 608 according to the timing shown in FIG. 48. On the other hand, in normal operations, one-way serial communications are carried out from the display control section 602 to the main control section 601 through the communication line 609 according to the timing shown in FIG. 48.

Here, it is assumed that the data transmitted from the display control section 602, which indicates the state of the switch include the following data of 4 bits each: datum 1 (0011), datum 2 (1010), and datum 3 (0110). When the data are transmitted from the display control section 602, first, the display control section 602 transmits a mark signal with a predetermined bit length, for example, a high level signal of 10 bits as a header. Then, the display control section 602 sends a low level signal of 1 bit as a start bit. Thereafter, the display control section 602 sends the datum 1 (0011), and datum (1100) obtained by reversing the datum 1 in this order. Similarly, the datum 2 (1010), and datum (0101) obtained by reversing the datum 2, the datum 3 (0110), and datum (1001) obtained by reversing the datum 3 are sent in this order, thereby terminating the transmission of the message. Immediately after completing the transmission of the message, the display control section 602 sends a mark signal, and repeats the transmission of the message in response to new data in the same manner as described above.

The main control section 601 receives the datum 1, the datum 2, and the datum 3 transmitted from the display control section 602 in this order, and analyzes the received data. Based on the received data, the main control section 601 controls the output units connected thereto through the wires 515 which respectively connect the above units.

The above conventional communication system is arranged such that one to one communications are carried out between the main control section 601 and each of the sections 602 and 603 to be controlled by the main control section 601. Therefore, if the number of the sections to be controlled by the main control section 601 increases, the numbers of the input and output ports for the main control section 601 and the communication lines are required to increase as well. Moreover, because a response message is not transmitted from the receiving end section in response to the message transmitted from the main control section 601, even if trouble has occurred while the message is being transmitted, and the message transmission cannot be carried out properly, it cannot cope with the situation. As a result, in the conventional communication system, a reliable control system cannot be achieved.

SUMMARY OF THE INVENTION

An object of the present invention is to provide a communication system which permits simplified manufacturing processes of electric devices, and the reduction in the size thereof by reducing the number of wires used in the electric devices.

Another object of the present invention is to provide a communication system which permits a reliable control system for internal devices within electric devices.

Yet another object of the present invention is to provide a communication system which enables performance tests of electric devices to be easily carried out so that the burden of servicemen and workers can be reduced and the production efficiencies for the electric devices can be improved.

Yet another object of the present invention is to provide a communication system which permits simplified manufacturing processes of refrigerators.

In order to achieve the above objects, the communication system of the present invention designed for electric devices including a plurality of internal devices is characterized by comprising:

at least one sub-control means for controlling operations of the internal devices, the sub-control means being placed in the vicinity of the corresponding internal device so as to be connected thereto;

main control means for controlling the electric device by controlling the sub-control means; and a single communication line for connecting the main control means and the sub-control means so as to permit communications between them, and wherein the main control means includes:

first transmission means for transmitting a message to the sub-control means through the communication line;

first receiving means for receiving a message from the sub-control means through the communication line, and the sub-control means includes:

second transmission means for transmitting a message to the main control means through the communication line; and second receiving means for receiving a message from the main control means through the communication line.

In the above arrangement, a plurality of internal devices are not directly controlled by the main control means, but are controlled through the sub-control means which communicate with the main control means through the communication line. Thus, the number of wires required for connecting the main control means and a plurality of internal devices can be reduced. As a result, when manufacturing electric devices, the processes for routing the wires can be simplified, and time required for the processes can be reduced. Moreover, because the length of each wire can be shortened, the possibility that trouble occurs due to the wires being disconnected can be reduced. Especially, when the communication system of the present invention is adopted in refrigerators, because heat insulating materials can be made thinner by reducing the required number of wires, the volume efficiencies thereof can be improved.

In order to achieve the above objects, the communication system of the present invention having the above configuration may be characterized by comprising:

a pair of AC power feeders for feeding AC power from an AC power supply to the main control means and for feeding AC power from the AC power supply to the internal devices through sub-control means; and a pair of DC power feeders for feeding DC power, which connects the main control means and the sub-control means, and wherein the main control means includes power converter means for converting AC power supplied from the AC power supply into DC power, and supplies the converted DC power to the sub-control means through the pair of AC power feeders.

In the above arrangement, DC power is supplied to each sub-control means from the power converter means the main control means through the DC power feeder. Then, it is supplied to the internal device through the sub-control means. Thus, each sub-control means does not require power converter means for converting AC power to DC power. This permits a simplified structure and a reduction in the size of each sub-control means, thereby enabling a reduction in the size of the electric devices. Especially, when the communication system of the present invention is adopted in refrigerators, this reduction in the size of each sub-control means permits an improvement in the volume efficiencies thereof.

In order to achieve the above object, the communication system of the present invention may be characterized in that:

the sub-control means includes a drive circuit for driving the internal device connected to the sub-control means, and a storage member for housing the sub-control means, and the drive circuit is formed on a surface of a radiating substrate, the back surface of the radiating substrate being exposed to a surface of the storage member.

In the above arrangement, because heat generated in the drive circuit of the sub-control means can be easily released outside the storage member, the operation in the drive circuit can be stabilized.

The radiating substrate is arranged such that an insulating film is formed on the surface of a metal plate, and a conductor pattern is formed on the insulating film. In this arrangement, by connecting the metal plate of the back surface of the radiating substrate and the ground level side of the drive circuit, the problem of noise being generated in the drive circuit can be prevented, thereby achieving a reliable operations of the electric devices.

In order to achieve the above objects, the communication system of the present invention having the above arrangement is characterized by further comprising:

first information processing means provided outside the electric device, the first information processing means being connected to the communication line, and wherein at least either one of the main control means and the sub-control means includes first memory means for storing information indicating the state of the internal device, and information indicating the state of the internal device having being controlled, and the first information processing means including display means for displaying information reads out the information stored in the first memory means by communicating through the communication line, and displays the information on the display means.

In the above arrangement, the state of the internal device of the electric device cab be easily and promptly recognized using the first information processing means, and the operation in each internal device can be easily recognized by the first information processing means. Therefore, when some trouble has occurred in the electric devices in the user's place, servicemen can promptly figure out the causes of the trouble without a great degree of disassembly of the electric devices. Therefore, the burden of the servicemen in maintaining the electric devices can be reduced, and the electric devices can be promptly fixed, thereby achieving an improvement in the service.

In order to achieve the above object, the communication system of the present invention having the above arrangement may be characterized by further comprising:

second information processing means provided outside the electric device, the second information processing means being connected to the communication line, and wherein the second information processing means including second memory means for storing information communicates with at least either one of the main control means and the sub-control means through the communication line so as to collect information indicating the state of the internal device and the information indicating the state of the internal device having being controlled, and stores the collected information in the second memory means.

In the above arrangement, the state of the internal device of the electric device can be easily and promptly recognized by analyzing the information stored in the second memory means in the second information processing means, and the operation in each internal device can be easily recognized by the second information processing means. Therefore, when some trouble has occurred in the electric devices in the user's place, servicemen can promptly figure out the causes of the trouble without a great degree of disassembly of the electric devices. Therefore, the burden of the servicemen in maintaining the electric devices can be reduced, and the electric devices can be promptly fixed, thereby achieving an improvement in the service.

In order to achieve the above objects, the communication system of the present invention having the above arrangement, is characterized by further comprising:

third information processing means provided outside the electric device, the third information processing means being connected to the communication line, and wherein the third information processing means includes: display means for displaying information; and input means for inputting data for operating the internal device in the electric device, and the third information processing means communicates with at least either one of the main control means and the sub-control means through the communication line so as to instruct it to carry out a performance test of the internal device based on the input data from the input means, and collects information indicating the results of the performance test so as to display it on the display means.

In the above arrangement, the performance test of each internal device of the electric device is enabled by operating the input means in the third information processing means. Further, because the results of the performance tests are displayed on the display means, only by looking at the display means in the third information processing means, the results of the performance tests can be confirmed.

Therefore, when the servicemen carry out a maintenance check of the electric device at user's place, the performance test for each internal device in the electric device can be easily carried out using the third information processing means, thereby permitting a reduction in the burden of the servicemen and an improvement in the service. Further, by connecting the third information processing means to the electric device manufactured in the factory, the performance test of each internal unit in the electric device can be easily carried out. As a result, the burden of the workers who carry out the performance tests can be reduced, and the production efficiencies can be improved.

In order to achieve the above objects, the communication system of the present invention having the above arrangement is characterized by comprising:

fourth information processing means provided outside the electric device, the fourth information processing means being connected to the communication line for communicating with at least either one of the main control means and the sub-control means through the communication line so as to collect information indicating the state of the internal device and information indicating the state of the internal device having being controlled; and production control means for controlling manufacturing processes of a plurality of electric devices based on the information collected respectively through a plurality of the fourth information processing means, the production control means being connected to the plurality of fourth information processing means which are respectively connected to the plurality of electric devices.

In the above arrangement, the production control means is connected to the plurality of electric devices on line through the plurality of the fourth information processing means. Therefore, the performance tests of the plurality of electric devices manufactured in the factory can be efficiently carried out by single production control means. As a result, the burden of the workers who carry out the performance tests of the electric devices can be reduced, and the production efficiencies of the electric devices can be improved.

In order to achieve the above objects, the communication system of the present invention having the above arrangement is characterized in that:

the second transmission means of the sub-control means includes second response means for transmitting a response message to the main control means when a message is received therefrom, and the main control means includes:

response detection means for detecting whether or not the response message is received from the sub-control means after transmitting a message to the sub-control means; and first initialization means for initializing all of the sub-control means when the response detection means detects successively a predetermined number of times that the response message from the sub-control means has not been received.

In the above arrangement, if the response message has not been received from the sub-control means in response to the message transmitted from the main control means, it is possible that a run-away has occurred in the corresponding sub-control means. In this case, because the main control means instructs the first initialization means to initialize all the sub-control means, the sub-control means wherein a run-away has occurred can restart its normal operation, and thereafter, the communication processes can be carried out properly. As a result, reliable communication system and control system for the internal devices can be achieved.

In order to achieve the above objects, the present invention of the present invention having the above arrangement may be characterized in that:

the first transmission means of the main control means includes first mark transmission means for transmitting a mark indicating that a message transmission to the sub-control means has started;

the first receiving means of the main control means includes first state-detection means for detecting the state of the communication line;

the main control means includes first wait means for setting the main control means in the wait state for transmitting a message when the first state-detection means detects that the state of the communication line does not correspond to a mark while the mark is being transmitted from the first mark transmission means;

the second transmission means of the sub-control means includes second mark transmission means for transmitting a mark indicating that a message transmission to the main control means has started;

the second receiving means of the sub-control means includes second state-detection means for detecting the state of the communication line; and the sub-control means includes second wait means for setting the sub-control means in the wait state for transmitting a message when the second state-detection detects that the state of the communication line does not correspond to a mark while the mark is being transmitted from the second mark transmission means.

In the above arrangement, the main control means and the sub-control means can detect if a collision among messages has occurred while the mark, which indicates that the message transmission has started, is being transmitted. If the main control means detects the collision among the messages while the mark is being transmitted, (i.e., when the first state-detection means detects that the state of the communication line does not correspond to the mark while the mark is being transmitted by the first mark transmission means), the main control means immediately stops the transmission of the message, and it is set in the wait state for transmitting the message. Similarly, if the sub-control means detects the collision among the messages while the mark is being transmitted (i.e., when the second state-detection means detects that the state of the communication line does not correspond to the mark while the mark is being transmitted by the second mark transmission means), the sub-control means immediately stops the transmission of the message, and it is set in the wait state for transmitting the message. Specifically, between the control means from which messages are transmitted at the same time, the one which detects the collision first stops the transmission of the message while the mark is being transmitted so that the message from the other control means can be transmitted without being disturbed, thereby eliminating the possibility that the control process is delayed due to the collision among the messages.

In order to achieve the above objects, the communication system of the present invention having the above arrangement may be characterized in that:

the mark transmitted by the first mark transmission means of the main control means and the mark transmitted by the second mark transmission means of each sub-control means have mutually different lengths, and in the marks transmitted by the first mark transmission means of the main control means and the marks transmitted by the second mark transmission means of the sub-control means, respective lengths of the marks are set in order according to the priority of the means which transmit messages set beforehand, the order being such that the higher the priority is, the shorter the length of the mark is.

In the above arrangement, the message is transmitted from control means through the communication line in order according to the priority of the control means from the message transmitted from the highest priority control means. Therefore, the main control means is given a higher priority over the sub-control means. Further, among the sub-control means, the one, which is connected to the input means for inputting the most important information for controlling the output unit, is given the highest priority. In this way, the more important the information is, the faster the main control means receives thereby enabling a prompt control of the output unit based on the information.

The communication system of the present invention having the above arrangement, may be characterized in that:

the first transmission means of the main control means includes first transmission authorization means for permitting the transmission of a message when the first state-detection means detects that a null state where communications are not carried out through the communication line has last for a first time period; and the second transmission means of the sub-control means includes second transmission authorization means for permitting the transmission of a message when the second state-detection means detects that a null state where communications are not carried out through the communication line has last for a second time period different from the first time period.

In the above arrangement, the timing when the main control means starts a message transmission and the timing when sub-control means starts a message transmission are set different, thereby preventing the occurrence of collision between the messages.

The communication system of the present invention having the above arrangement may be characterized in that:

the internal device of the electric device includes input units for inputting information regarding the electric device;

the first transmission means of the main control means includes polling means for sending a transmission request signal for requesting by polling each sub-control means to transmit input information from the input units to the main control means when a message transmission is permitted by the first transmission authorization means;

the second transmission means of the sub-control means includes input information transmission means for transmitting a massage including the input information from the input unit when the transmission of the message is permitted by the second transmission authorization means after receiving the transmission request signal from the main control means; and the second time period is set shorter than the first time period.

In the above arrangement, while the main control means repeats polling using the polling means, the sub-control means is permitted to interrupt so as to transmit a message including input information from the input unit. Thus, the main control means can promptly response to changes in input information, thereby enabling high speed control of the internal devices.

The communication system of the present invention having the above arrangement may be characterized in that:

the main control means includes receiving end address addition means for adding identifying information for identifying a receiving end sub-control means in a message to be transmitted thereto; and transmitting end identifying means for identifying a transmitting end sub-control means based on identifying information in the message received therefrom, and the sub-control section includes:

identifying information recognition means for recognizing its own identifying information; and receiving end recognition means for recognizing itself as a receiving end by comparing the identifying information in the received message with its own identifying information; and transmitting end address addition means for adding its own identifying information into a message to be transmitted to the main control means, and the message transmitted from the main control means does not include information specifying a transmitting end, and the message transmitted from the sub-control means does not include information specifying a receiving end.

In the above arrangement, messages respectively transmitted from the main control means and the sub-control means can be made shorter, thereby enabling high speed communication processes.

The present invention of the present invention having the above arrangement may be characterized in that the main control means includes:

communication line state detection means for detecting whether or not a transmission through the communication line is permitted;

wait means for setting the main control means in the wait state for starting the transmission until the communication line state detection means detects that the transmission through the communication line are permitted; and the sub-control means includes communication inhibit means for setting the communication line in a communication inhibit state while the sub-control means is carrying out an operation which is given a priority over communication processes.

In the above arrangement, while the sub-control means is carrying out the process given a priority over the communication process, s communication through the communication line is inhibited by the communication inhibit means, and the main control means is set in the wait state. Therefore, the sub-control means carries out the process which is given a higher priority than the communication process. Moreover, the main control means detects if a communications through the communication line is permitted using the state detection means. Thus, soon after the communication inhibit state of the communication line set by the communication inhibit means in the main control means is cancelled, the main control means can start a message transmission.

The communication system of the present invention having the above arrangement may be characterized in that:

the communication line state detection means includes:

transmission means for sending a detection signal through the communication line; and waveform judge means for detecting a waveform of the signal transmitted through the communication line while the detection signal is being sent by the transmission means, and judges whether the waveform of the communication line corresponds to the detection signal, the communication line state detection means detects that the communication line is in the state where a communication therethrough is not permitted when the waveform judge means judges that the waveform thereof does not correspond to the detection signal, whereas, it detects that the communication line is in the state where a communication therethrough is permitted when the waveform judge means judges that the waveform thereof corresponds to the detection signal, and the detection signal sent from the transmission means is a mark indicating that a message transmission has started.

In the above arrangement, the mark, which indicates that the message transmission has started, is used as the detection signal sent by the transmission means. Therefore, an increase in the number of signals can be prevented. Moreover, when the state of the communication line changes to the communication permitted state, the transmission of the mark can be started simultaneously, thereby achieving an improvement in the communication efficiency.

The communication system of the present invention having the above arrangement, is characterized in that:

the second transmission means of the sub-control mean includes second response means for transmitting a response message to the main control means when a message is received therefrom, and the main control means includes:

initialization instruction means for transmitting a message including an initialization instruction to each sub-control means;

response detection means for detecting whether or not the response message is received from the sub-control means after transmitting a message to the sub-control means; and instruction means for instructing the initialization means to transmit a message including an initialization instruction to the sub-control means when the response detection means detects successively more than a predetermined number of times that a response message has not been received from the sub-control means.

In the above arrangement, if the response message has not been transmitted from the sub-control means not because a run-away has occurred therein but because it is suddenly reset in the middle of the operation due to noise being generated, the sub-control means from which the response message has not been transmitted can promptly restart its normal operation.

The communication system of the present invention having the above arrangement may be characterized in that:

the main control means includes second initialization means for initializing all of the sub-control means when the response detection means detects that the response message has not been received from the corresponding sub-control means although the message including the initialization instruction has been transmitted to the sub-control means a predetermined number of times based on an instruction from the instruction means.

In the above arrangement, after the message including the initialization instruction has been transmitted to the corresponding sub-control means a predetermined number of times, if the response message has not been received from the corresponding sub-control means, the main control means initializes all the sub-control means by the second initialization means. As described, when the response message is not received, first, the message including the initialization message is transmitted to the corresponding sub-control means so that it can restart its normal operation. Only when the corresponding sub-control means cannot restart its normal operation even after transmitting the above message, the main control means initializes all the sub-control means. Because the process for enabling to the sub-control means to restart its normal operation is composed of the above two stages, only when the response message has not been transmitted from the corresponding sub-control means because of a run-way occurring in the sub-control means, the main control means initializes all the sub-control means. Thus, when the response message is not received from the sub-control means only because it is suddenly reset, the initializations of all the sub-control means are not carried out, thereby eliminating the possibility of wasting time.

The communication system of the present invention having the above arrangement, may be characterized in that:

the electric device is a refrigerator which includes a pipe-shaped cold air guide member for guiding cold air into the compartments, the cold air guide member being provided on the back surface of the refrigerator, and the communication line, AC power feeders, and DC power feeders are inserted within the space of the cold air guide member.

In the above arrangement, since the wires (communication line, AC power feeders, and DC power feeders) which connect the main control means and the sub-control means are inserted into the space of the cold air guide member, the wires can be protected by the cold air guide member. Therefore, in the manufacturing process or when being used, even if the back surface of the refrigerator is hit by external forces, the wires can be prevented from being disconnected. Moreover, because the wires are inserted into the space in the cold air guide member, components for securing the wires such as tape, etc., are not required, thereby reducing the required number of components. Moreover, because the wires are not exposed, the appearance of the back surface of the refrigerator can be kept in a presentable condition without providing a back plate on the back surface of the refrigerator.

In the above arrangement, the connecting member provided for removably connecting the wires to the sub-control means is integrally provided with the cold air guide member. Thus, the process for securing the cold air guide member and the process for connecting the wires to the sub-control means so as to be detachable can be carried out at the same time. As a result, the process for assembling the refrigerator can be simplified.

Alternatively, the wires may be buried into the wall of the air guide member instead of inserting the wires into the space in the cold air guide member. In this arrangement, the wires can be protected by the cold air guide member, and the appearance of the back surface of the refrigerator can be kept in a presentable condition without providing the back plate. Moreover, because the wires and the cold air guide member are provided as one integral part, the components can be more easily dealt with.

The communication system of the present invention having the above arrangement may be characterized in that the electric device is a refrigerator which includes:

a pipe-shaped cold air guide member for guiding cold air into compartments, the cold air guide member being provided on the back surface of the refrigerator; and a guide member for guiding said communication line and said wiring members along said cold air guide member, said guide member being provided along said cold air guide member.

In the above arrangement, since the wires (communication line, AC power feeders, and DC power feeders) which connect the main control means and the sub-control means are provided along the cold air guide member, the wires can be protected by the cold air guide member. Therefore, in the manufacturing process or when being used, even if the back surface of the refrigerator is hit by external forces, the wires can be prevented from being disconnected.

In the above arrangement, the connecting member provided for removably connecting the wires to the sub-control means is integrally provided with the guide member. Thus, the process for securing the guide member and the process for connecting the wires to the sub-control means so as to be detachable can be carried out at the same time. As a result, the process for assembling the refrigerator can be simplified.

Moreover, because the cold air guide member and the guide member are provided as one integral part, the process for securing the guide member can be omitted, thereby achieving a simplified process for assembling the refrigerator.

Moreover, because the guide member is provided within the space of the cold air guide member, and the wires are inserted into the space in the cold air guide member, the wires are protected by the air guide member, and the appearance of the back surface of the refrigerator can be kept in a presentable condition. Furthermore, the position of the wires in the cold air guide member can be controlled by the guide member, air flow in the cold air guide member can be stabilized.

For a fuller understanding of the nature and advantages of the invention, reference should be made to the ensuing detailed description taken in conjunction with the accompanying drawings.

BRIEF DESCRIPTION OF THE DRAWINGS

FIGS. 1 through 45 show first through fifteenth embodiments of the present invention.

FIG. 1 is a block diagram showing a schematic configuration of the refrigerating and cooling device adopted in the first embodiment of the present invention.

FIG. 2 is a block diagram showing the configuration of the sub-control section of the refrigerating and cooling device.

FIG. 3 is an explanatory view showing the state of the sub-control section stored in the casing.

FIG. 4 is a circuit diagram showing an I/F circuit of the sub-control section.

FIG. 5 is a flow chart showing the control processes of the main control section in the refrigerating and cooling device.

FIG. 6 is a flow chart showing the receiving processes of the sub-control section.

FIG. 7 is a block diagram showing a basic configuration of a microcomputer.

FIG. 8 is a block diagram showing a schematic configuration of a refrigerating and cooling device adopted in the second embodiment of the present invention.

FIG. 9 is a circuit diagram showing a schematic configuration of a communication system provided in the refrigerating and cooling device.

FIG. 10 is a front view showing a schematic configuration of terminal units in the communication system.

FIG. 11 an explanatory view showing how a microcomputer the main control section of the communication system record various data.

FIG. 12 is a flow chart showing readout process of the terminal units.

FIG. 13 is an explanatory view showing how the terminal units print each datum on a recording material.

FIG. 14 is a block diagram showing a schematic configuration of a terminal unit used in the communication system adopted in the third embodiment of the present invention.

FIG. 15 is a flow chart showing the processes which the check unit in the communication system reads out each datum stored in the terminal unit by a check unit.

FIG. 16 is a flow chart showing processes of the performance test of each unit to be carried out by a terminal unit used in the communication system adopted in the fourth embodiment of the present invention.

FIG. 17 is a front view showing a schematic configuration of a terminal unit used in the communication system adopted in the fifth embodiment of the present invention.

FIG. 18 is a circuit diagram showing a schematic configuration of an I/F circuit for the production control unit provided in the terminal unit.

FIG. 19 is a flow chart showing the control process of the main control section of a communication system adopted in the sixth embodiment of the present invention.

FIG. 20 is a circuit diagram showing I/F circuits respectively provided in the main control section and the sub-control section of a communication system adopted in the seventh embodiment of the present invention.

FIG. 21(a) through FIG. 21(e) are timing charts which respectively explain communication processes when polling is performed by the main control section.

FIG. 22(a) through FIG. 22(e) are timing charts which respectively explain communication processes when calling out is performed by the sub-control section.

FIG. 23 is a flow chart showing the communication processes of the main control section.

FIG. 24 is a flow chart showing the communication processes of the sub-control section.

FIG. 25 is a flow chart showing the processes which the sub-control section starts communication processes.

FIG. 26(a) through FIG. 26(e) are timing charts which respectively explains the communication process of sub-control sections which start respective message transmissions at the same time.

FIG. 27 is a flow chart showing the operations of the main control section after turning ON the power switch.

FIG. 28 is a circuit diagram showing a schematic configuration of the communication system adopted in the eighth embodiment of the present invention.

FIG. 29 is a diagram showing a configuration of a microcomputer and communication-use interface circuit in the main control section of the communication system.

FIG. 30 is a diagram showing a configuration of the microcomputer and communication-use interface circuit in the sub-control section of the communication system.

FIG. 31 is a timing chart which explains the respective operations of the main control section and the sub-control section after turning ON the power supply.

FIG. 32 is a flow chart showing operations of the main control section.

FIG. 33 is a flow chart showing operations of the sub-control section.

FIG. 34 is a block diagram showing a schematic configuration of a refrigerating and cooling device adopted in the ninth embodiment of the present invention.

FIG. 35 is a schematic longitudinal cross-sectional view which shows relative positions between a cold air duct and wires in the refrigerating and cooling device.

FIG. 36 is a schematic rear view which shows relative positions between the cold air duct and the wires in the refrigerating and cooling device.

FIG. 37 is a schematic rear view which shows relative positions between a cold air duct and wires in a refrigerating and cooling device adopted in the tenth embodiment of the present invention.

FIG. 38 is a lateral cross sectional view which shows respective schematic configurations of the cold air duct, wires, and a guide member of the refrigerating and cooling device.

FIG. 39 is a lateral cross sectional view which shows respective schematic configurations of a cold air duct, wires, and a guide member of the refrigerating and cooling device adopted in the eleventh embodiment of the present invention.

FIG. 40 is a lateral cross sectional view which shows respective schematic configurations of a cold air duct, wires, and a guide member of the refrigerating and cooling device adopted in the eleventh embodiment of present invention.

FIG. 41 is an enlarged cross-sectional view which shows a cold air duct, wires, and a connector in the refrigerating and cooling device.

FIG. 42 is an enlarged cross-sectional view which shows a cold air duct, wires, and a connector in the refrigerating and cooling device adopted in the thirteenth embodiment of the present invention.

FIG. 43 is a schematic rear view which shows relative positions between a cold air duct and wires in the refrigerating and cooling device adopted in the fourteenth embodiment of the present invention.

FIG. 44 is a lateral cross sectional view which shows respective schematic configurations of the cold air duct, a guide member, wires, and a connector of the refrigerating and cooling device.

FIG. 45 is a lateral cross sectional view which shows respective schematic configurations of a cold air duct, wires, and a guide member of the refrigerating and cooling device adopted in the fifteenth embodiment of present invention.

FIG. 46 is a block diagram showing a schematic configuration of a conventional refrigerating and cooling device.

FIG. 47 is a block diagram showing a schematic configuration of a communication system used in the conventional refrigerating and cooling device.

FIG. 48 is a timing chart which explains the communication processes of the communication system.

DESCRIPTIONS OF THE EMBODIMENTS

[EMBODIMENT 1]

The following descriptions will discuss the first embodiment of the present invention with reference to FIG. 1 through FIG. 7.

Figure 1:
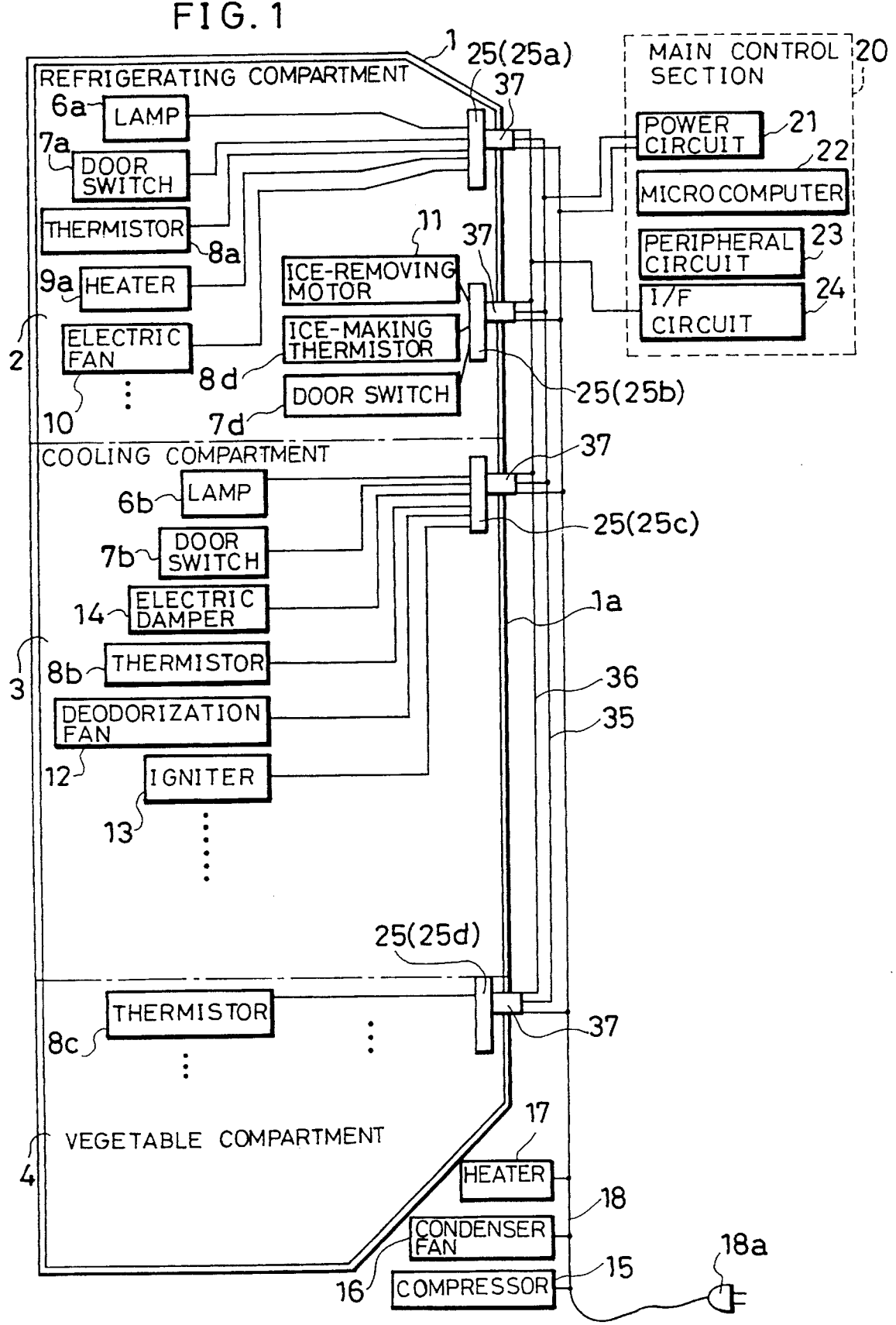

As shown in FIG. 1, a refrigerating and cooling device (electric device) of the present embodiment includes a refrigerating compartment 2, a cold compartment 3, and a vegetable compartment 4. The above compartments 2, 3, and 4 are provided in a casing 1, and all serve as storage compartments. Further, an outer casing (not shown) is provided for housing the casing 1, and a heat insulating material is provided between the casing 1 and the outer casing.

The refrigerating and cooling device is provided with a main control section 20 (main control means) outside the casing 1 on the upper side thereof. On the other hand, a compressor 15, a condenser fan 16, a heater 17, etc., are provided outside the casing 1 on the lower side thereof. The compressor 15 is provided for compressing a refrigeration medium, and the condenser fan 16 is provided for condensing the refrigeration medium.

For input units (inner units) of the refrigerating compartment 2, a door switch 7a, a thermistor 8a, etc., are provided. The door switch 7a is turned ON/OFF when a door (not shown) opened and closes. The thermistor 8a is provided for measuring the temperature in the refrigerating compartment 2. For output units (inner units) of the refrigerating compartment 2, a lamp 6a for lightening the refrigerating compartment 2, a heater 9a for removing frost adhering to the evaporator, provided in the vicinity of an evaporator (not shown) for evaporating the refrigeration medium, an electric fan 10 for circulating cold air generated by the evaporator within the compartment 2, etc., are provided. In addition, the above input units 7a and 8a, and the output units 6a, 9a, and 10a are connected to a sub-control section 25 (sub-control means) (to be described later) provided in the refrigerating compartment 2.

The refrigerating compartment 2 is further provided with an ice-making compartment (not shown). For input units in connection with the ice-making compartment, the refrigerating compartment 2 is provided with a door switch 7d for the ice-making compartment, a thermistor 8d for measuring the temperature in the ice-making compartment, etc. On the other hand, for the output units, the refrigerating compartment 2 is provided with a ice-removing motor 11 for removing ice from the ice-maker, etc. The input units 7d, and 8d, and the output unit 11 are connected to another sub-control section 25 (sub-control means) provided in the refrigerating compartment 2.

For input units of the cold compartment 3, a door switch 7b, a thermistor 8b for measuring the temperature in the cold compartment 3, etc., are provided. On the other hand, for output units, a lamp 6b, a deodorization fan 12 for deodorizing odor in the compartment 3, an igniter 13, etc., are provided. Furthermore, a path (not shown) is provided between the refrigerating compartment 2 and the cold compartment 3, for sending cold air from the refrigerating compartment 2 to the cold compartment 3. As an output unit, an electric damper 14 is provided for shutting off the flow of cold air by closing the path. The input units 7b and 8b, and output units 6b, 12, 13, and 14 are connected to a sub-control section 25 (sub-control means) (to be described later) provided in the refrigerating compartment 2.

For input units, the vegetable compartment 4 is provided with a thermistor 8c for measuring the temperature in the vegetable compartment 4, etc. The input unit 8c is connected to a sub-control section 25 (sub-control means) provided in the vegetable compartment 4.

The main control unit 20 includes a power circuit 21 (power converter means) for supplying DC power from a DC power supply (not shown) through a pair of DC power feeder 35, a microcomputer 22 which is an essential part for controlling the refrigerating and cooling device, a peripheral circuit 23 composed of an oscillating circuit, a reset circuit, etc., a communication-use interface circuit 24 (first transmission means, and first receiving means) (hereinafter referred to as an I/F circuit) for bidirectional communications with the sub-control section 25, etc. Further, a pair of DC power feeders 35 are electrically connected to the power circuit 21. On the other hand, a communication-use cable 36 (communication line) is electrically connected to the I/F circuit 24.

Figure 7:
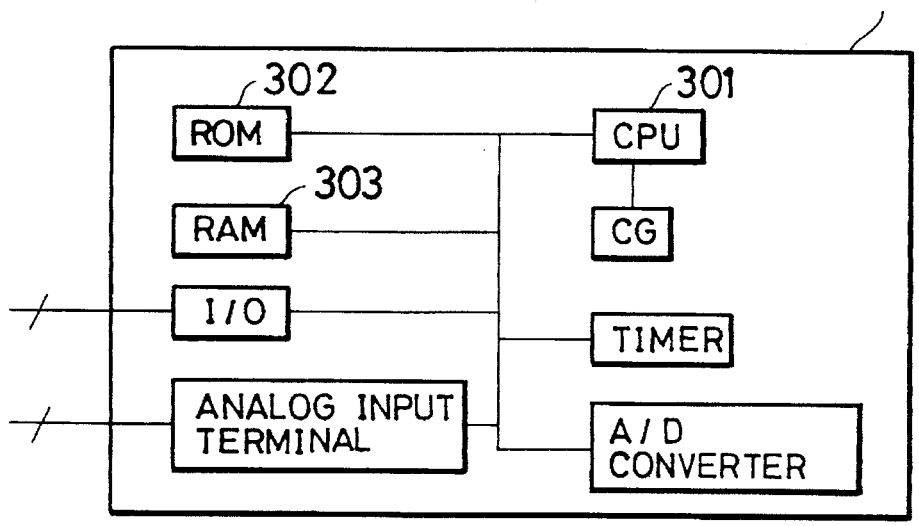

As shown in FIG. 7, the microcomputer 22 of the main control section 20 is mainly composed of CPU 301 (Central Processing Unit), ROM 302 (Read Only Memory), and the RAM 303 (Random Access Memory). This basic arrangement of the control section 20 is generally known. The ROM 302 stores various programs to be executed by the CPU 301. Further, the ROM 303 stores various data used when the CPU 301 executes each program stored in the ROM 302.

Each of the following means are composed of CPU 301 which executes each program stored in the ROM 302 of the microcomputer 22 in the main control section 20: the first transmission means for transmitting a message to each sub-control section 25 through I/F circuit 24; a first receiving means for receiving a message from the sub-control section 25 through the I/F circuit 24; receiving end address addition means for adding a node address (identifying information) to the message to be transmitted so as to identify the receiving end sub-control section 25; transmitting end discrimination means for identifying the sub-control section 25 of the transmitting end based on the node address in the message received from the sub-control section 25; initialization instruction means for transmitting an initialization instruction (to be described later) to the sub-control section 25 when the power supply to the sub-control section 25 starts; a first collision detection means for detecting whether a collision among the messages occur; a first transmission wait means for setting the main control section 20 in the wait state for transmitting a message when a collision among the messages is detected; and the first response means for transmitting a response message to the corresponding sub-control section 25 when a message is received from the sub-control section 25.

A part of AC power supplied to the power circuit 21 is insultated in the power circuit 21, and is stepped down and rectified. Then, after being converted into DC power, it is fed through a DC power feeder 35 to various units provided in the casing 1, such as an electric fan 10, an electric damper 14, etc. In the meantime, with a further stepdown, it is supplied to the microcomputer 22 of the main control section 20. The power circuit 21 supplies DC power to each sub-control section 25 through the DC power feeder 35.

Additionally, the minus side of the DC power feeder 35 is set on ground level. Further, a communication system is mainly composed of the main control section 20, the sub-control sections 25, and the communication-use cable 36.

A plug 18a (AC power supply connecting section) to be connected to the AC power supply is provided at the end of an AC power feeder 18. The AC power feeder 18 is composed of a feeder made for high current provided so as to connect the plug 18a and the compressor 15, and a feeder made for low current provided for feeding AC power from the compressor 15.

Figure 2:
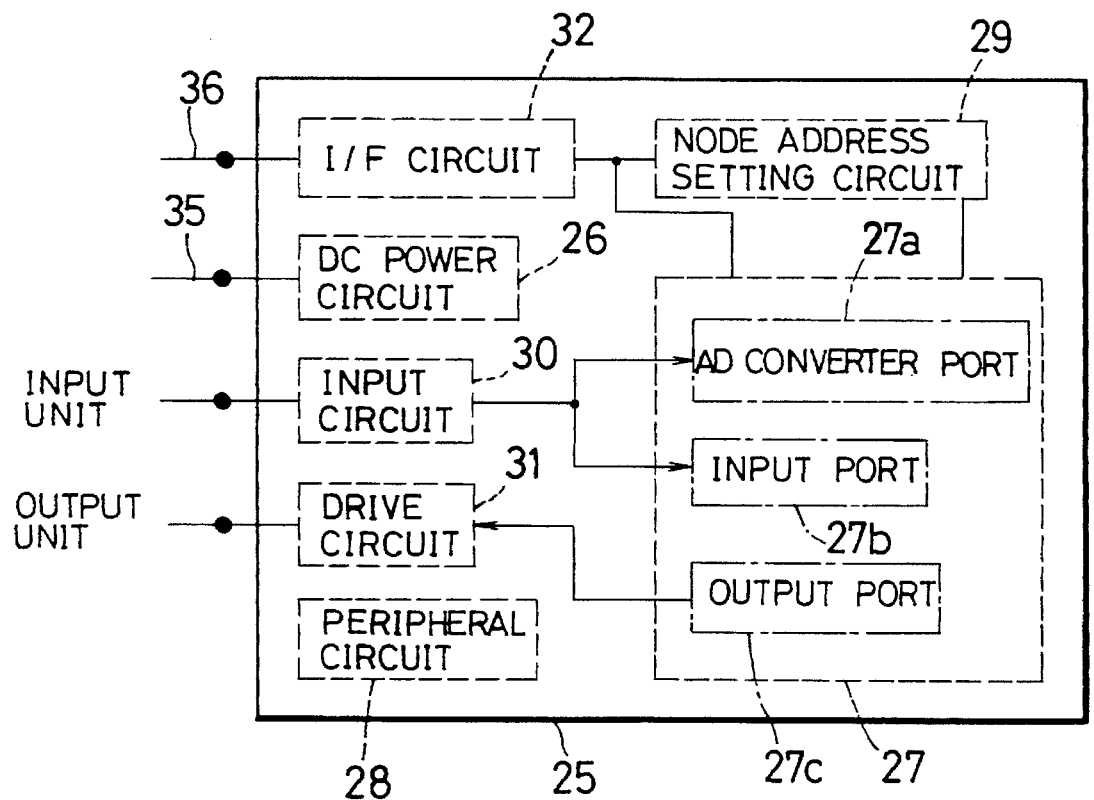
Figure 3:
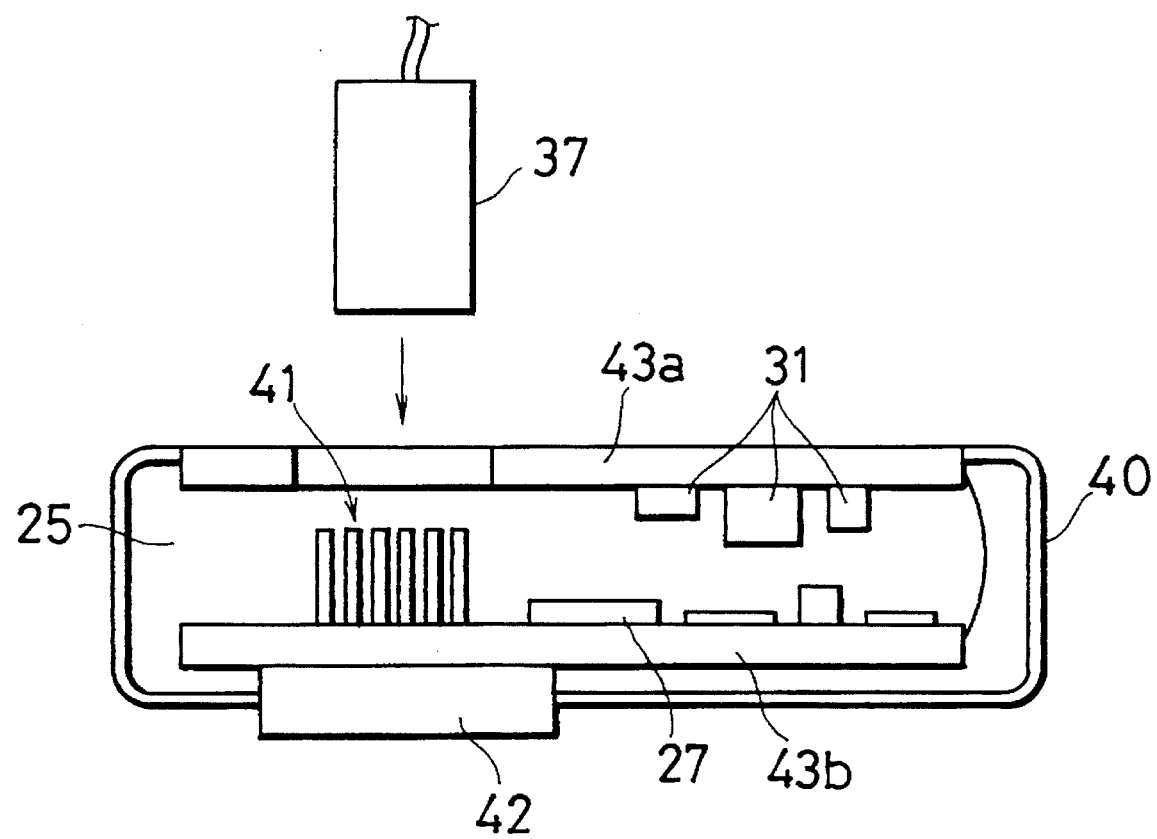

As shown in FIG. 3, a casing 40 is provided for housing each of the sub-control sections 25 which are respectively connected to the input or output units. Each sub-control sections 25 provided in the casing 40 is placed in the vicinity of the corresponding input or output unit. As shown in FIG. 2, each of the sub-control sections 25 includes a DC power circuit 26 for supplying thereto DC power through the DC power feeder 35, a microcomputer 27 which is an essential part of the controlling system, a peripheral circuit 28 composed of an oscillating circuit, etc., a node address setting circuit 29 (discriminating information setting means), an input circuit 30 for entering thereto signals from various units, a drive circuit 31 for driving various units, a communication-use interface circuit 32 (second transmission means and second receiving means) for bidirectional communications with the main control section 20.

As shown in FIG. 7, the microcomputer 27 of the sub-control section 25 is manly composed of the CPU 301, the ROM 302, and the RAM 303. This basic arrangement of the microcomputer 27 is generally known as in the casing of the basic arrangement of the microcomputer 22 of the main control section 20.

Each of the following means are composed of a CPU 301 which executes each program stored in the ROM 302 of the microcomputer 27 in the sub-control section: the second transmission means for transmitting a message to the main control section 20 using the I/F circuit 32; second receiving means for receiving a message from the main control section through the I/F circuit 32; discriminating information identifying means for identifying one's own node address (identifying information); receiving end identifying means for identifying the receiving end when a message is received from the main control section 20 by comparing the node address in the message with one's own node address; transmitting end address addition means for adding one's own address as a transmitting end in the message to be transmitted when transmitting a message to the main control section; second collision detection means for detecting a collision among the message; second transmission wait means for setting in the wait state for transmitting a message when a collision among the message is detected; and a second response means for transmitting a response message to the main control section 20 when a message is received from the main control section 20.

As shown in FIG. 3, the microcomputer 27 of the sub-control section 25 includes a plurality of input ports 27b for inputting thereto signals from various input units, a plurality of output ports 27c for outputting signals to various output units, and a plurality of A/D (analog/digital) converter ports 27a. The microcomputer 27 of the sub-control section 25 is arranged such that when voltage generated in the node address setting circuit 29 is applied to the A/D converter port 27a, for example, by dividing the voltage by 8, its own node address is recognized. Additionally, the input port 27b is convertible to the A/D converter port as will be described later.

Each units, such as the ice-removing motor 11, etc., is controlled by being connected to the sub-control section 25, and is driven by a DC power which is supplied from the power circuit 21 of the main control section 20 through the DC power feeder 35. Therefore, the DC power circuit 26 of each sub-control section 25 is not required to supply DC power to each unit, and it is only required to supply DC power to each circuit of the sub-control section 25. This arrangement enables the structure of the DC power circuit 26 to be simplified, and the size of the DC power circuit 26 to be made smaller. Therefore, the structure of the sub-control section 25 can be simplified, and the size thereof can be made smaller. This structure results in a refrigerating and cooling device without a problem of a reduction in the volume efficiency in the refrigerating and cooling device.

As shown in FIG. 1, the main control section 20 is connected to each of the sub-control sections 25 by the following five cables total: The single communication-use cable 36 for bidirectional communications between the control section 20 and each of the sub-control sections 25; a pair of DC power feeders 35; and a pair of AC power feeders 18. The above cables 18, 35, and 36 are provided along a back surface 1a of the casing 1. The respective ends on the sides of the sub-control sections 25 of the above cables 18, 35, and 36 are always bundled. Further, female connecters 37 are connected to the respective ends. On the other hand, an I/F circuit 32 which is illustrated in FIG. 2 is electrically connected to the casing 40 for storing the sub-control section 25. In addition, the female connector 37 is provided with a detachable male connector 41. In this way, the female connector 37 and the male connector 41, namely, the I/F circuit 24 and the I/F circuit 32 are electrically connected by the communication-use cable 36.

The casing 40 has a connecting section 42 which connects the drive circuit 31 of the sub-control section 25 and the various units. The respective circuits 26–32 in the sub-control section 25 are formed on a substrate 43a (radiating substrate) and a substrate 43b. The substrate 43a is composed of a metal plate made of aluminum whereon a conductor pattern made of copper is formed. The substrate 43b is composed of a resin plate made of paper/phenol resin, epoxy resin, etc., with a surface thereof coated with copper via an electric insulating film. Further, a drive circuit 31 is provided on a substrate 43a which is excellent in releasing heat; on the other hand, other connectors such as the male connector 41, etc., and the microcomputer 27, etc., are formed.

Further, the back surface of the substrate 43a is exposed to the surface of the casing 40. Therefore, heat generated in the casing can be easily released outside. The metal plate of the substrate 43a and the ground level side of the drive circuit 31 are electrically connected. Thus, the problem of noise being generated in the drive circuit can be reduced.

Next, the I/F circuit 24 of the main control section 20 and the I/F circuit 32 of the sub-control section 25 will be explained. In the explanation, since the I/F circuit 24 has the same configuration as the I/F circuit 32, only the I/F circuit 32 will be explained.

Figure 4:
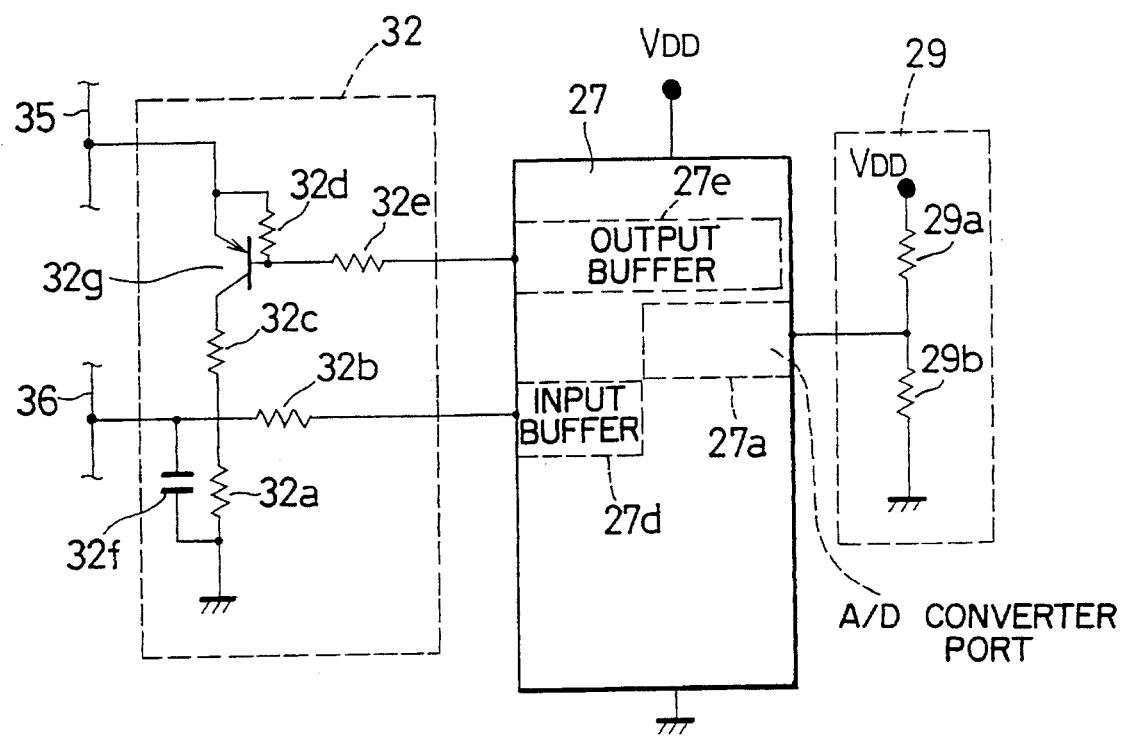

As shown in FIG. 4, the I/F circuit 32 of the sub-control section 25 includes five resistors 32a–32e, a capacitor 32f, and a PNP-type transistor 32g. The resistor 32a and the capacitor 32f are connected to the communication-use cable 36 in parallel, and one end of the resistor 32a and one end of the capacitor 32f are respectively connected to ground. The communication-use cable 36 and the input buffer 27d for intermediate pressure of the microcomputer 27 are connected through the resistor 32b for protecting input. On the other hand, the emitter of the transistor 32g is connected to the plus side feeder of the DC power feeder 35, and the connecter thereof is connected to the communication-use cable 36 through the resistor 32c. Further, the emitter and the base of the transistor 32g are connected through the resistor 32d. Furthermore, the base is also connected to a drain output buffer 27e which can be an Nch open drain output (hereinafter referred to as output buffer) of intermediate pressure of the microcomputer 27 through the resistor 32e. The node address setting circuit 29 composed of resistors 29a and 29b (voltage dividing means and voltage dividing resistor) is connected to the A/D converter port 27a of the microcomputer 27.

In the above arrangement of the main control section 20 and the sub-control section 25, the respective operations of the main control section 20 and the sub-control section 25 will be explained below.

First, when a power switch of the refrigerating and cooling device is turned ON, AC power is supplied to the main control section 20 and to an AC duty of the compressor 15, etc., and the AC power is converted into DC power in the power circuit 21 of the main control section 20. The DC power is supplied to each sub-control sections 25 and to various units such as the electric fan 10, etc., through the DC power feeder 35. The DC power is also supplied to the emitter of the transistor in the I/F circuit 24 of the main control section 20. After the step-down by the I/F circuit 24, the DC power is supplied to the microcomputer 22 of the main control section 20 and the peripheral circuit 23. When DC power is supplied to the microcomputer 22, the microcomputer 22 starts communicating with each of the sub-control sections 25. First, the microcomputer 22 randomly selects one of the sub-control sections 25, and data specifying the node address and a message for initialization are sent to the sub-control section 25 in the following manner.

Namely, the communication-use cable 36 is set at low level because it is discharged by the resistor of the I/F circuit 24 in the main control section 20. When transmitting the message including an initialization instruction, etc., the output buffer 27d of the microcomputer 22 is turned ON so as to turn ON the transistor 32g of the I/F circuit 24. As a result, the communication-use cable 36 is switched to high level. Further, the main control section 20 transmits a message including an initialization instruction, etc., through the communication-use cable 36 by turning ON/OFF the output buffer 27d (first transmission control means) of the microcomputer 22 so as to control the switching operating of the transistor 32g (first switching means) of the I/F circuit 24.

While transmitting a message, the main control section 20 determines whether the transmission of the message is carried out properly by an input level of the signal inputted to the input buffer 27d of the microcomputer 22 of the main control section.

Even when the output buffer 27e of the microcomputer 22 of the main control section 20 is turned OFF, if the output buffer 27e of the microcomputer 27 in the sub-control section 25 is set ON, the communication-use cable 36 is still at high level. Therefore, while the message is being transmitted from the main control section 20, if the input buffer 27d (the first level detection means) of the microcomputer 22 detects that the communication-use cable 36 is at high level, the main control section 20 recognizes that the collision has occurred among the messages. When, the collision among the messages is detected in the manner described above, the main control section 20 is set in the wait state for transmitting the message.

Similarly, each sub-control section 25 transmits a message through the communication-use cable 36 by the ON/OFF of the output buffer 27d of the microcomputer 27 so as to control the switching of the transistor 32g in the I/F circuit 24. While the message is being transmitted from the main control section 20, if the input buffer 27d (second level detection means) of the microcomputer 22 detects that the communication-use cable 36 is at high level although the output buffer 27e is turned OFF, and the transistor 32g of the I/F circuit is turned OFF, the main sub-control section 25 recognizes that a collision has occurred among the messages. When, the collision among the messages is detected in the manner described above, the sub-control section 20 is set in the wait state for transmitting the message.

As described above, the bidirectional communications between the main control section 20 and the sub-control section 25 are carried out by a so-called base band method.

After the down-level by the AC power power circuit 26, AC power supplied to each of the sub-control sections 25 through the AC power feeder 35 is supplied to the microcomputer 27, etc. Then, voltage set by the node address setting circuit 29 is applied to the microcomputer 27 through the A/D converter port 27a, and the microcomputer 27 determines a node address based on the voltage, and stores it as its own node address. Thereafter, the microcomputer 27 reads the node address transmitted from the microcomputer 22 through the I/F circuit 32, and compares with the node address stored therein. If these two node addresses are the same, the microcomputer 27 of the sub-control section 25 receives the message for initialization, etc., and goes on to the next process. More concretely, according to the message for initialization, the microcomputer 27 initializes the input port 27b and the output port 27c. Thereafter, the microcomputer 27 controls various units such as the electric fan 10, the electric damper 14, etc., by bidirectional communications with the microcomputer 22. On the other hand, if the above two node addresses are different, the microcomputer 27 does not receive the signal, and it is set in a wait-state until it receives another node address.

Additionally, the message for initialization, etc., is set so as to be transmitted from the smaller node address. Here, if the number of the sub-control sections 25 is large, the respective program capacities for the microcomputer 22 and the microcomputer 27 are required to be made larger as well. Moreover, a long time is required for communications, or the length of the bit used in communications is made long. In order to avoid the above problems, the maximum number of the sub-control sections 25 is set 8 in the present embodiment. Thus, the node address can be specified in 3 bits.

Figure 5:
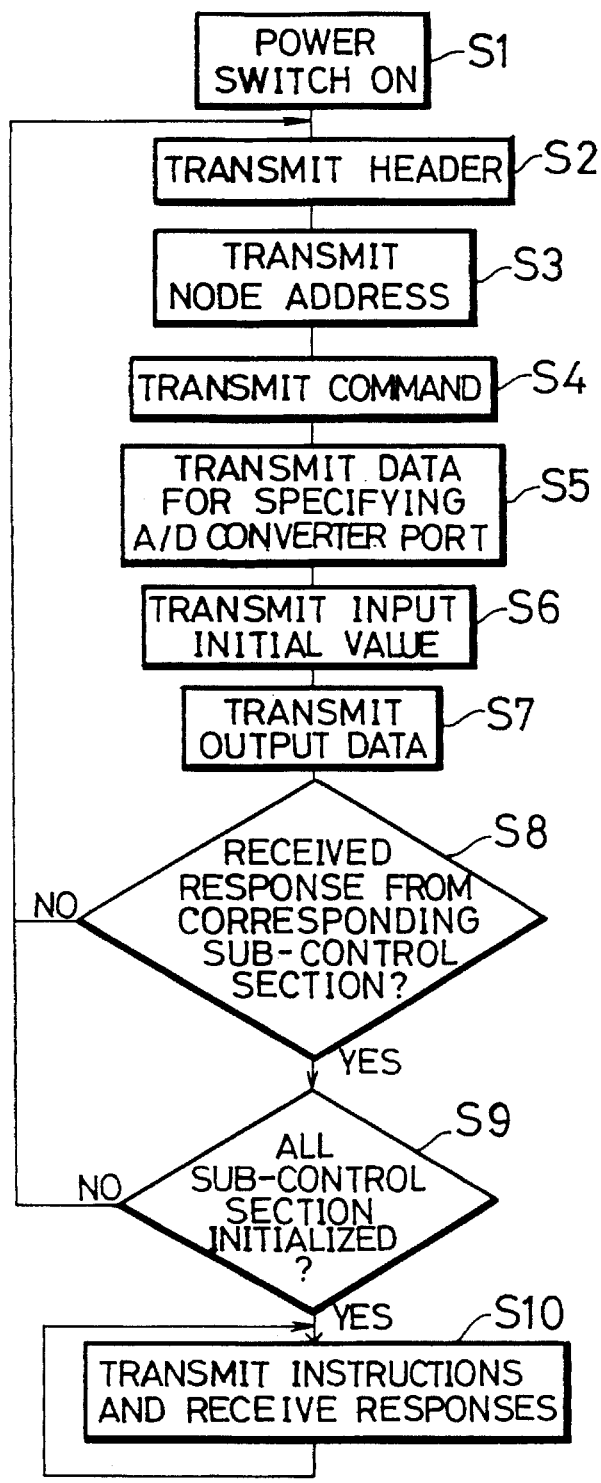

Next, controlling operations of the main control section 20 will be explained below with reference to the flow chart of FIG. 5. In the explanation, the microcomputer 27 includes four input ports $27b_0$, $27b_1$, $27b_2$, and $27b_3$, and four output ports $27c_4$, $27c_5$, $27c_6$, and $27c_7$. Further, the thermistors 8a are respectively connected to the input ports $27b_1$ and $27b_2$.

First, when the power switch or a reset switch (not shown) of the refrigerating and cooling device is turned ON (S 1), a signal indicating to start transmission is sent to a header (S 2). Then, a node address is sent (S 3). Here, if the node address of the sub-control section 25 is No. 0, it is defined, for example, as "000". Similarly, if he node address of the sub-control section 25 is No. 1, it is, for example, defined as "001". Here, the bit of the right end indicates a bit of the lowest priority.

Next, the input ports $27b_0$, $27b_1$, $27b_2$, and $27b_3$, and the output ports $27c_4$, $27c_5$, $27c_6$, and $27c_7$ in each of the sub-control sections 25 are to be set. More concretely, among the above input ports respectively specified by the node addresses, for the input ports $27b_1$ and $27b_2$, the A/D converter port is specified; and for other input ports $27b_0$, and $27b_3$, an initial value (0 or 1) to be input for initialization is specified. On the other hand, among the output ports $27c_4$, $27c_5$, $27c_6$, and $27c_7$, for the output ports with which the above various units are connected, an instruction is given for initializing the units.

When a command for instructing initializations is sent (S 4), datum of 4 bits "0110" is sent so as to specify the A/D converter port (S 5). Based on the datum "0110", the input ports $27b_1$ and $27b_2$ which correspond to "1" in the data are set as the A/D converter ports. Next, initial values (1 or 0) to be input for initialization are set for the input ports $27b_0$, $27b_1$, $27b_2$, and $27b_3$ (S 6). For example, in the case where a switch is connected to the input port $27b_0$, and nothing is connected to the input port $27b_3$, datum of 4 bits "0xx1" is sent. The datum "0xx1" indicates that an input of the switch when initializing is "1". Further, the input port $27b_3$ is pulled down. In addition "xx" in the datum indicates that in S 5, the input ports $27b_1$ and $27_2$ are the A/D converter ports, and thus the initial values to be input for them are not required.

Then, the main control section sends a signal to each of the output ports $27c_4$, $27c_5$, $27c_6$, and $27c_7$ so as to specify output data to be output for initialization (S 7). For example, when the units mentioned earlier are respectively connected to the output ports $27c_5$, $27c_6$, and $27c_7$, and datum of 4 bits "x101" is sent, the respective units which are connected to the output ports $27c_5$ and $27c_7$ which correspond to "1" in the data are turned ON. On the other hand, the unit which is connected to the output port $27c_6$ corresponding to "0" in the data is turned OFF.

As described, for example, when a command of 4 bits is transmitted, the message for initialization is composed of the following data of 19 bits in total: the command of 4 bits; datum of 3 bits specifying node address; datum of 4 bits specifying the A/D converter ports; datum of 4 bits indicating initial values; and output datum of 4 bits.

After sending the message for initialization, if the main control section 20 receives a response from the corresponding sub-control section 25 (S 8), it is determined whether or not initializations of all the sub-control sections 25 have been completed (S 9). On the other hand, if a response is not received from the corresponding sub-control section 25 in S 8, or if the initializations of all the sub-control sections 25 have not been completed in S 9, the sequence moves back to S2 and the operations in S 2–S 9 are repeated. Then, when the initializations of all the sub-control sections 25 have been completed in S 9, the main control section 20 transmits instruction signals to the respective sub-control sections 25, and receives the responses from the respective sub-control sections 25 (S 10). As described, by sending the message for initialization, the main control section 20 are enabled to transmits various instruction signals in S 10.

Figure 6:
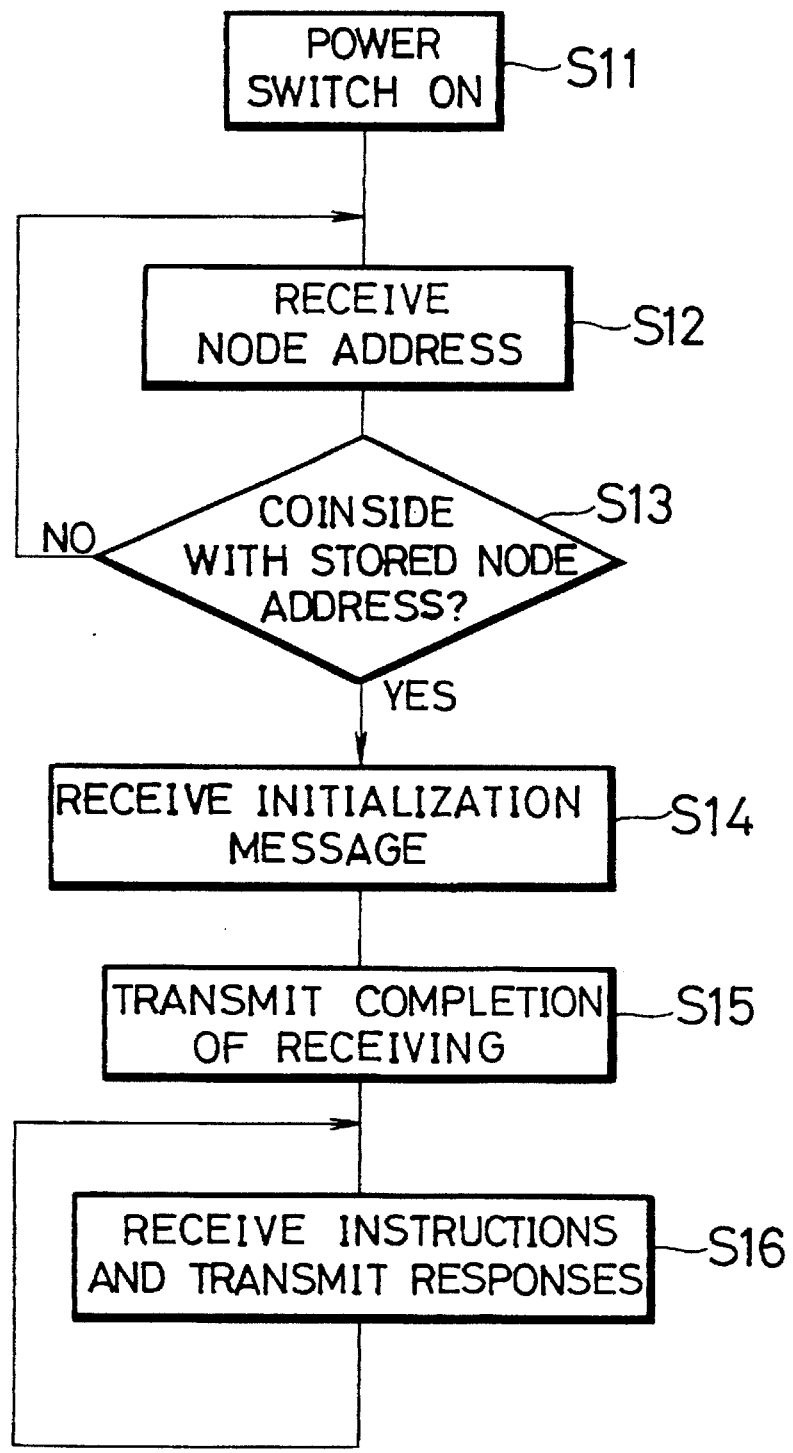

Next, the processes which the sub-control sections 25 receive the message for initialization will be explained with reference to the flow chart of FIG. 6.

First, when the power switch or a reset switch (not shown) of the refrigerating and cooling device is turned ON (S 11), the microcomputer of the sub-control section 25 recognizes its own node address based on voltage generated by the node address setting circuit 29, and stores it as its own node address. Then, when the sub-control section 25 receives a header and a node address from the main control section 20 (S 12), it is determined whether the received node address is the same as the stored node address (S 13). If these two node addresses are different, the sequence moves back to S 12, and the sub-control sections receive another header and node address. On the other hand, if they are the same, the sub-control section 25 receives a message for initialization including a command, data for specifying the A/D converter port, initialization data to be input, and output data (S 14), and sends a signal indicating that the receiving of the signal for initialization has been completed (response) to the main control section 20 (S 15), and then an initialization is carried out (S 16).

In S 16, if the sub-control section 25 receives in the input ports $27b_0$, $27b_1$ $27b_2$2, and $27c_3$ a signal which is different from the input initial value, the sub-control section 25 sends a signal indicating so to the main control section 20. On the other hand, the main control section 20 controls the input ports $27b_1$ and $27b_2$ which are specified as A/D converter ports to send a signal. Further, based on the signal from the input ports $27b_1$ and $27b_2$, the sub-control section 25 sends instruction signals to the respective input ports $27b_1$ and $27b_2$.

As described, the control means of the refrigerating and cooling device of the present embodiment is composed of the sub-control sections 25, the main control section 20, and the communication-use cable 36. The sub-control sections 25 are provided in the vicinity of the place where various units such as the electric fan 10, the electric damper 14, etc., in the casing 1, and receives a signal from the thermistors 8a. The main control section 20 controls the sub-control section 25. Further, the main control section 20 is connected to the sub-control sections 25 by the communication-use cable 36 so as to enable bidirectional communications between them. The above arrangement also permits a simplification of the structure and the compact size of the main control section 20 and the sub-control sections 25. The main control section 20 and the sub-control section 25 are electrically connected by the AC power feeder 35 and the AC power feeder 18. The main control section 20 is provided with the power circuit 21 for converting DC power into AC power. The AC power feeder 18, which is connected to the compressor 15, etc., is further connected to the main control section 20. Therefore, AC power is not supplied directly to the main control section 20 and the sub-control section 25 from the power source.

In the arrangement, because the number of the cables which connect the main control section 20 with various input units and output units such as thermistor will not increase, the process for routing the cables can be simplified, and the time required for the process can be made shorter in manufacturing the refrigerating and cooling device. Moreover, because the length of each cable can be made shorter, the breakdown of the refrigerating and cooling device due to the disconnection of the cables is not likely to occur. The present invention also permits to provide a refrigerating and cooling device which is prevented from the problems of an increase in the weight, reduction in the volume efficiency, an increase in the cost, etc. Furthermore, because the AC power feeder 18 can be made thinner, noise generated when controlling the various units can be reduced. Moreover, AC power is supplied from the main control section 20 through the AC power feeder 35, a power circuit is not required in the sub-control section 25, thereby providing a refrigerating and cooling device which is prevented from the reduction in the volume efficiency.

As described, the communication system in accordance with the present invention is designed for an electric device including a plurality of internal devices, and is arranged so as to comprise:

at least one sub-control means for controlling operations of the internal device, the sub-control means being placed in the vicinity of the internal device so as to be connected thereto;

main control means for controlling the electric device by controlling the sub-control means; and single communication line for connecting the main control means and the sub-control means so as to permit communications between them, and wherein the main control means includes:
first transmission means for transmitting a message to the sub-control means through the communication line;
first receiving means for receiving a message from the sub-control means through the communication line, and the sub-control means includes:
second transmission means for transmitting a message to the main control means through the communication line; and
second receiving means-for receiving a message from the main control means through the communication line.

In the above arrangement, because the number of wires connecting the main control means and a plurality of internal devices does not increase, when manufacturing the electric device, the process for routing wires can be simplified, and the time required for the process can be reduced. Moreover, because the length of the wires can be shortened, the possibility of the damage of the electric device due to the wires being disconnected can be reduced. Especially, when the refrigerator is adopted for the electric device, because the insulating material can be made thinner by reducing the number of wires, the volume efficiency thereof can be improved.

The communication system having the above arrangement may be arranged so as to comprise:

a pair of AC power feeders for feeding AC power from a AC power supply to the main control means and for feeding AC power from the AC power supply to the internal devices through the sub-control means; and a pair of DC power feeders for feeding DC power, which connects the main control means and the sub-control means, and wherein the main control means includes power converter means for converting AC power supplied from the AC power supply into DC power, and supplies the converted DC power to the sub-control means through the pair of AC power feeders.

As described, first DC power is supplied to each sub-control means from the power converter means of the main control means through the DC power feeders, and then supplied to the internal device connected to the sub-control means. In this arrangement, because power converter means for converting AC power to DC power is not required for each sub-control means, the simplification of the structure and the reduction in the size of the sub-control means can be achieved, thereby achieving the reduction in the size of the electric device. Especially, in the case of the refrigerator, the reduction in the size of the electric device permits an improvement in the volume efficiency of the refrigerator.

Further, the communication system in accordance with the present embodiment having the above arrangement may be arranged as follows:

The sub-control means includes a drive circuit for driving the internal device connected to the sub-control means, and a storage member for housing the sub-control means, and the drive circuit is formed on a surface of a radiating substrate, the back surface of the radiating substrate being exposed to a surface of the storage member.

In the above arrangement, heat generated in the drive circuit of the sub-control means can be easily released outside the casing. Thus, the operations in the drive circuit can be stabilized, and noise generated when the sub-control means controls the internal device can be prevented.

The communication system in accordance with the present embodiment having the above arrangement, may be arranged as follows:

the internal device of the electric device includes input units for inputting information regarding the electric device, and output units for respectively carrying out predetermined operations, the sub-control means includes an input port for inputting input information from the input Units, and an output port for outputting a control signal to the output units, and the main control means includes initialization instruction means for transmitting an initialization instruction to the sub-control means for initializing the input port and the output port when the power switch of the sub-control means is turned ON and when the sub-control means is reset.

In this arrangement, even if a plurality of input units and output units exist in the electric device, the simplification in the respective structures-and the reduction in the size of the main control means and the sub-control means can be achieved irrespectively of the number of the input and output units.

[EMBODIMENT 2]

The following descriptions will discuss the second embodiment of the present invention with reference to FIG. 8 through FIG. 13.

For convenience, members having the same function as in the first embodiment will be designated by the same code and their description will be omitted.

Figure 8:
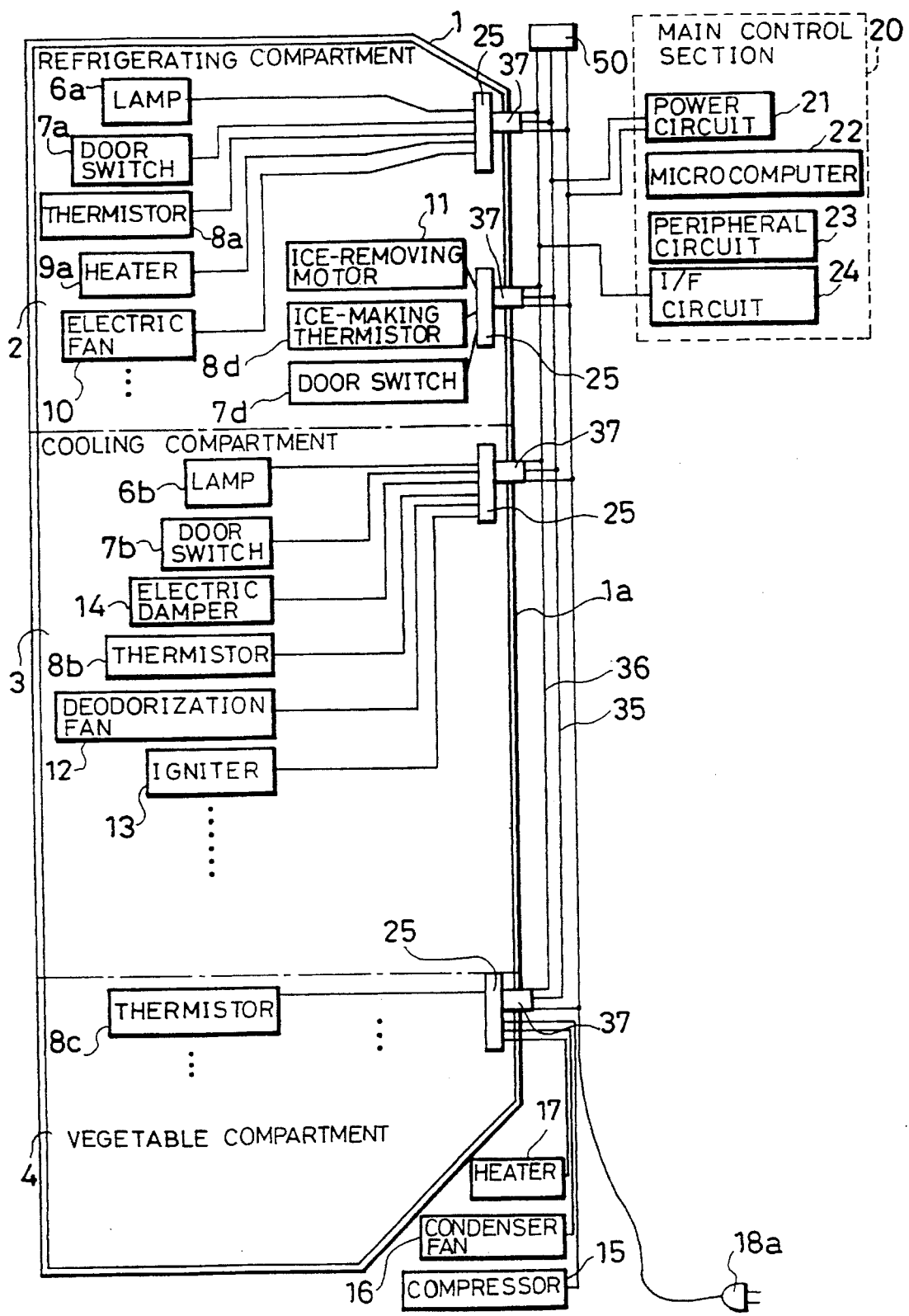

As shown in FIG. 8, in the refrigerating and cooling device of the present embodiment, one end of the communication-use cable 36, one end of the DC power feeder 35, and one end of the AC power feeder 18 are bundled, and are connected to a connector 50 (connection means). Further, the compressor 15, the condenser fan 16, and the heater 17 are connected to a sub-control section 25 provided in the vegetable compartment 4.

Figure 9:
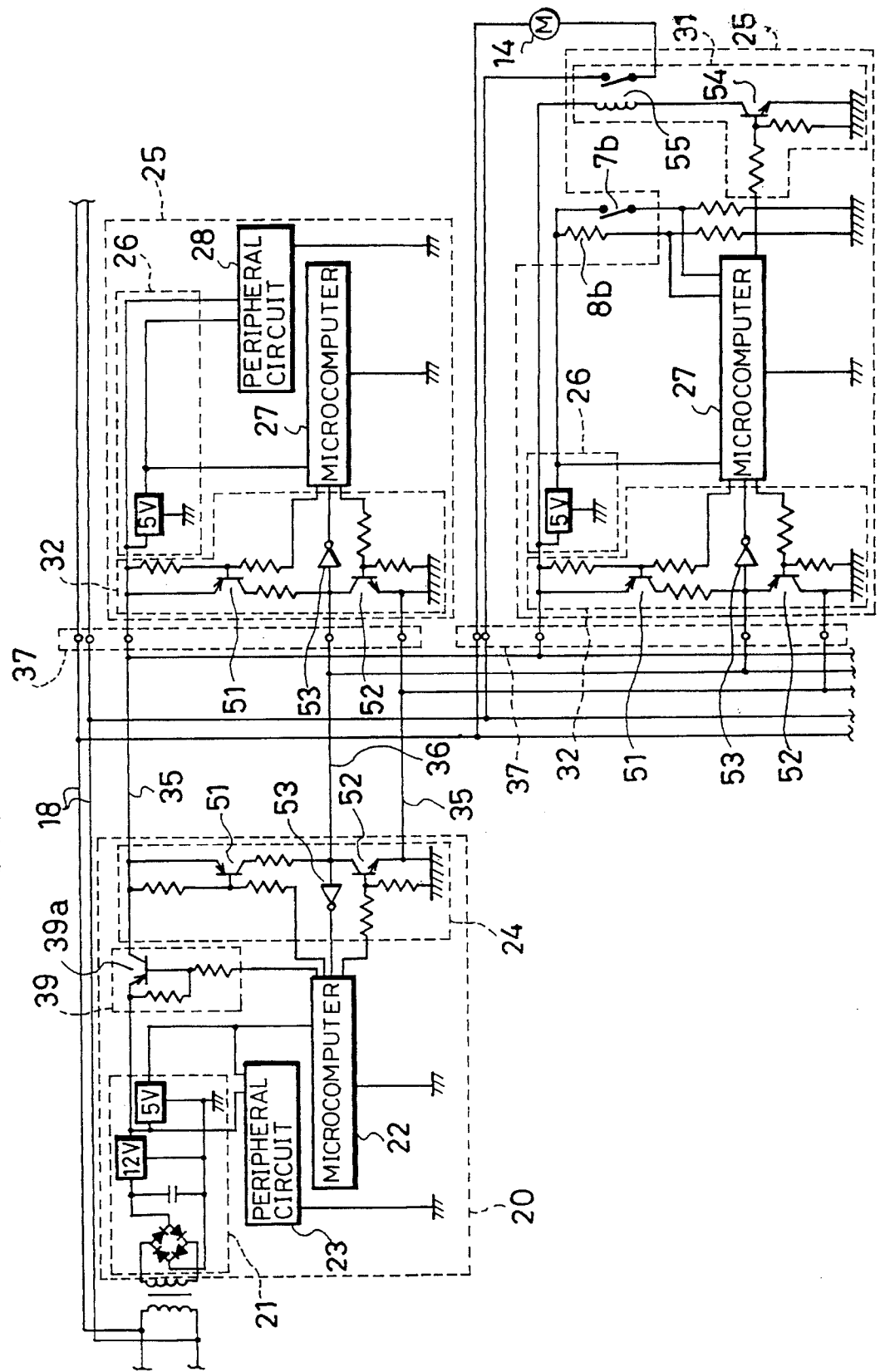

As shown in FIG. 9, the main control section 20 is electrically connected to the sub-control section 25 by the communication-use cable 36, the DC power feeder 35, and AC power feeder 18. In order to set the communication-use cable 36 at high level, the transistor of either the I/F circuit 24 of the main control section 20 or the I/F circuit 32 of the sub-control section 25 is to be turned ON. As a result, the voltage of the communication-use cable 36 is set, for example, at 12 V, and after maintaining the cable 36 in this state for a predetermined time, a signal "1" is generated. Further, with the ON state of the transistor 51, the transistor 52 of either the I/F circuit 24 or the I/F circuit 32 is turned ON. As a result, the voltage of the communication-use cable 36 is set at 0 level. After maintaining the cable 36 in this state for a predetermined time, a signal "0" is generated. Then, the signal is received through an inverter 53 of the I/F circuit 24 of the main control section and the I/F circuit 32 of the sub-control section 25.

Additionally, the main control section 20 is provided with a DC power supply controlling circuit 39 (DC power supply control means) for turning ON/OFF the sub-control section 25. Further, the sub-control section 25 drives the electric damper 14, etc., through the transistor 54 and a relay 55.

Figure 10:
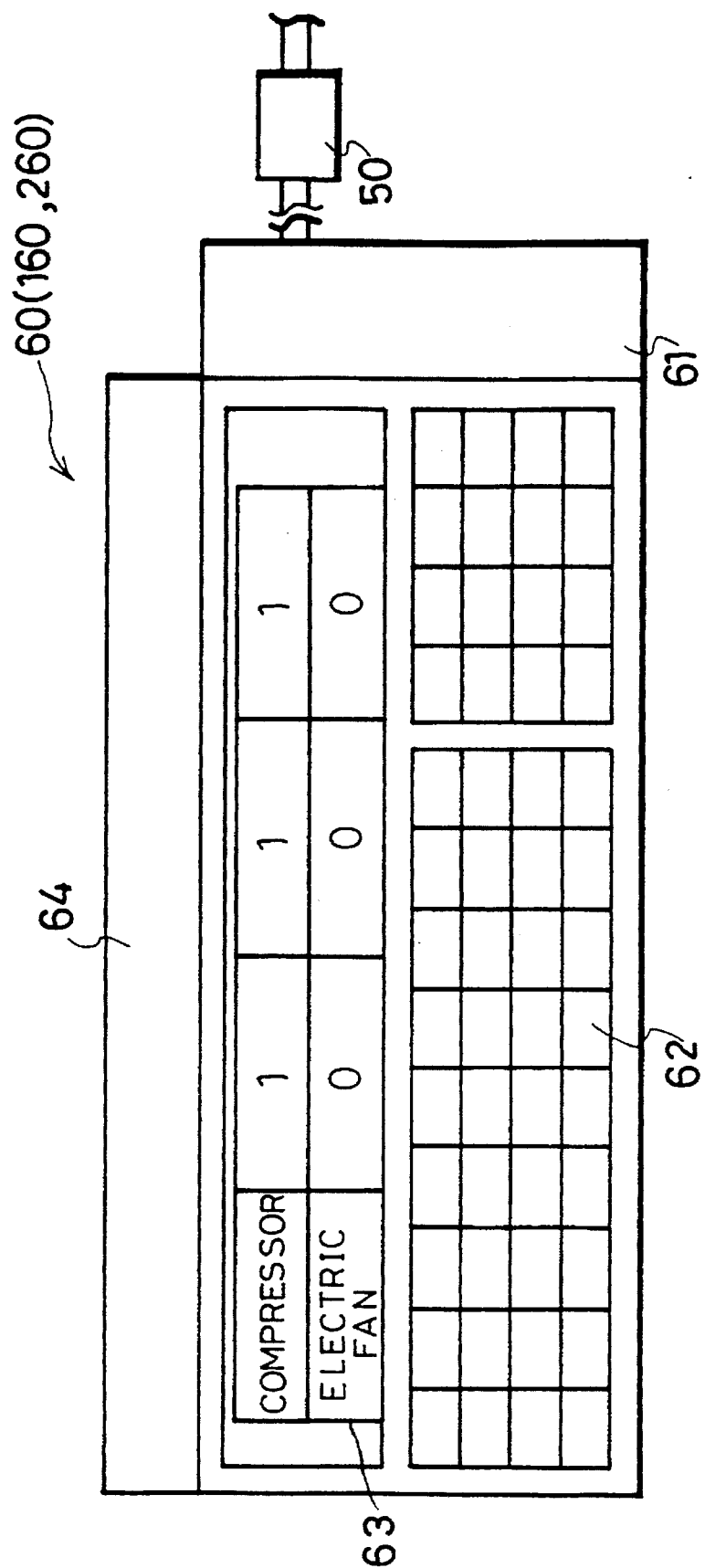

As shown in FIG. 10, a terminal unit 60 (first information processing means) is removably secured to the connector 50. The terminal unit 60 stores therein a microcomputer (not shown) composed of CPU, ROM, RAM, etc. The terminal unit 60 is also provided with a communication-use interface circuit 61 (hereinafter referred to as I/F circuit) for bidirectional communications with the main control section 20, a key board 62 for instructing the main control unit 20 to transmit various data, and a display 63 (display means) for displaying various data transmitted from the main control section 20, and a printer 64 (printing means) for printing the above data on a recording material (not shown).

ROM 303 (memory means) of the microcomputer 22 has a function as a recording resister which stores respective temperatures of the refrigerating compartment 2, the cold compartment 3, and the vegetable compartment 4 of the refrigerating and cooling device, and the respective states of various units being controlled by the main control section 20 and the sub-control section 25, and other information. The microcomputer 22 of the main control section 20 sets addresses beforehand for the output units such as the electric fan 10, the electric damper 14, and for input units such as the thermistor 8a. The microcomputer 22 is arranged so as to record in the RAM 303 various kinds of data, for example, the states of the above output units being controlled, and input information from the above input units, etc., according to the address set beforehand in every predetermined time, for example, an hour. In the present embodiment, the communication system is mainly composed of the main control section 20, the sub-control section 25, the communications cable 36, and the terminal units 60.

Other than the above, the refrigerating and cooling device of the present embodiment has the same functions and configurations as the refrigerating and cooling device of the first embodiment.

The following will explain a recording process of the present embodiment with reference to FIG. 11.

As shown in FIG. 11, the ON state or the opened state of the input units such as a switch is, for example, recorded as "1" (high level), and the OFF state or the closed state is, for example, recorded as "0" (low level). In the inputs units such as the thermistor 8a, datum of compartment temperature is recorded in 8 bits. In this datum of 8 bits, the bit of the highest priority (the bit on the left end) indicates a plus sign "0" or a minus sign "1" of the measured temperatures. The ROM 303 in the microcomputer 22 of the main control section 20 stores various data measured in the time points of: present; an hour before; and two hours before. Here, the interval of the time points for recording data is not limited to an hour. Similarly, the measured time points are not limited to three, and data of more than or less than three time points may be recorded as well.

Figure 12:
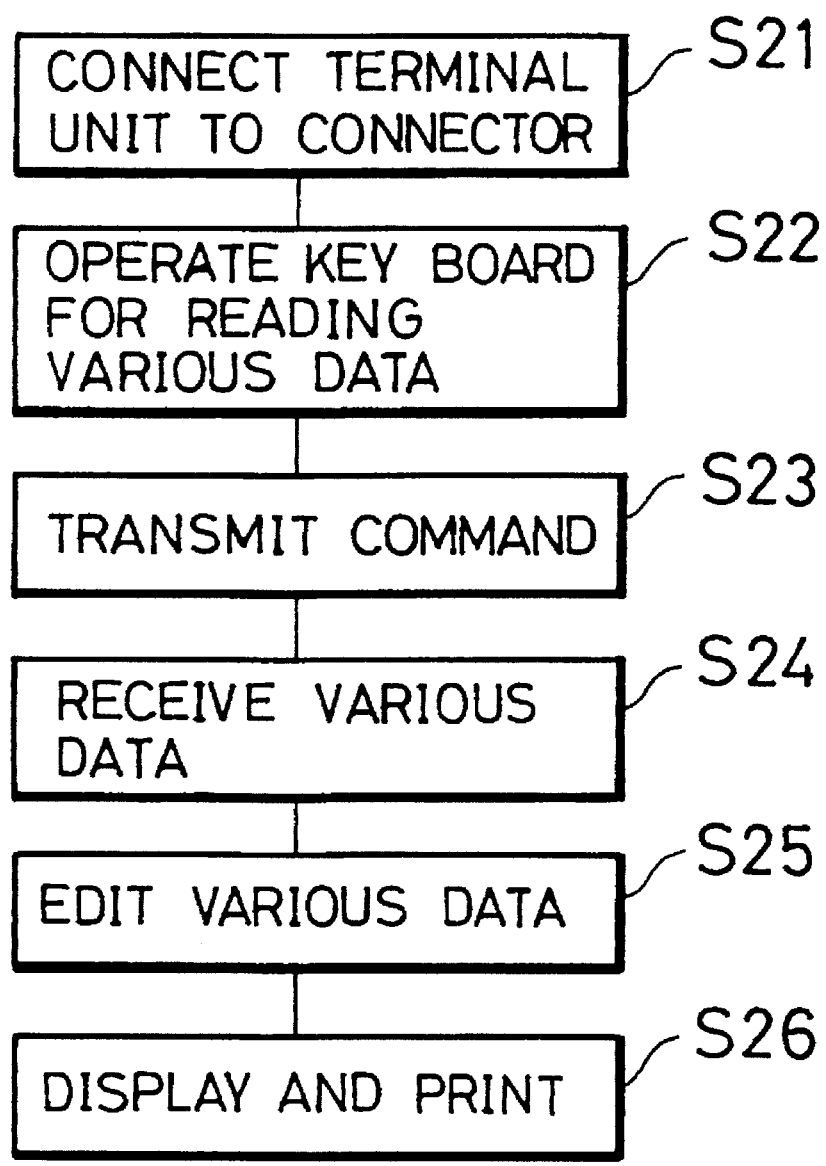

The following will explain the readout process in the terminal unit 60 of the above various kinds of data with reference to the flow chart of FIG. 12.

First, the terminal unit 60 is connected to the connector 50 (S 21). Then, a key board 62 is operated for reading various data (S 22). Based on the operations of the key board 62, the microcomputer of the terminal unit 60 transmits a header, node address, and a command to the main control unit 20 so as to instruct it to transmit various data (S 23). When the terminal unit 60 receives various data transmitted from the main control section 20 (S 24), the terminal unit 60 transmits a signal indicating that receiving of the data has been completed (response) to the main control section 20, and edits the data so as to display it on the display 63 (S 25). When the edit of the data has been completed, the various data is displayed on the display 63, and if necessary, it is printed on a recording material by the printer (S 26).

As described, the microcomputer of the terminal unit 60 to be connected to the refrigerating and cooling device of the present embodiment reads various data from the microcomputer 22 of the main control section 20 through the I/F circuit 61 of the terminal unit 60, and displays it on the display 63. Further, if necessary, the data is printed on a copying material (not shown) by a printer 64 as shown in FIG. 13. This arrangement enables the user of the terminal unit 60 to easily and promptly recognize the operating condition of the refrigerating and cooling device using the commutation system. The data is printed, for example, as shown in FIG. 13. Namely, the printed data shown in FIG. 13 indicates that the compressor 15 is continuously driven, the door switch 7a is always set ON, and the temperature in the refrigerating compartment 2 went up. Thus, by printing the above data, the user can easily recognize that the temperature in the refrigerating compartment 2 went up either because the door of the compartment 2 remains opened, or because the door switch 7a is broken.

As described, the communication system in accordance with the present embodiment designed for the electric device including a plurality of internal devices is arranged so as to comprise:

at least one sub-control means for controlling operations of the internal device, the sub-control means being placed in the vicinity of the corresponding internal device so as to be connected thereto;

main control means for controlling the electric device by controlling the sub-control means; and single communication line for connecting the main control means and the sub-control means so as to permit communications between them, and first information processing means provided outside the electric device, the first information processing means being connected to the communication line, wherein the main control means includes:
first transmission means for transmitting a message to the sub-control means through the communication line;

first receiving means for receiving a message from the sub-control means through the communication line, and the sub-control means includes:

second transmission means for transmitting a message to the main control means through the communication line; and second receiving means for receiving a message from the main control means through the communication line, and at least either one of the main control means and the sub-control means includes first memory means for storing information indicating the state of the internal device, and information indicating the state of the internal device having being controlled, and the first information processing means including display means for displaying information reads out the information stored in the first memory means by communicating through the communication line, and displays the information on the display means.

In this arrangement, because the first information processing means is provided, easily and promptly the state of the internal device of the electric device can be recognized, and respective operations in each internal device by the first information processing means can be easily carried out. Therefore, in the case where a trouble has occurred in the electric device of the user's side, because a serviceman in the user's place can be promptly check the cause of the damage without a great degree of disassembly of the electric device, the burden of the serviceman can be significantly reduced, thereby achieving the improvement in the serves offered by the serviceman by reducing the time required for repairing the electric device.

[EMBODIMENT 3]

Figure 14:
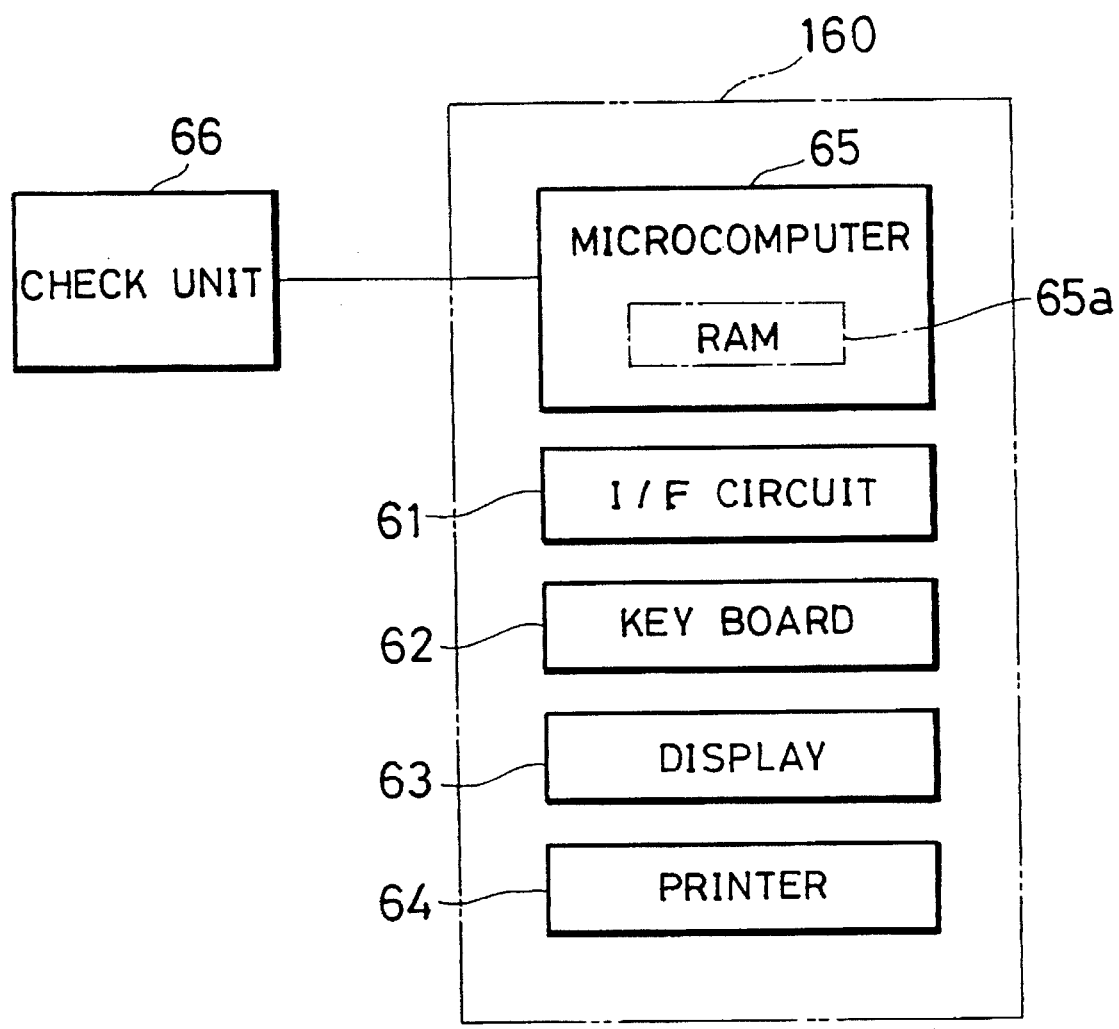

The third embodiment of the present invention will be explained with reference to FIGS. 10, 14 and 15.

For convenience, members having the same function as in the previous embodiments will be designated by the same code and their description will be omitted.

As shown in FIG. 10, a terminal unit 160 (second information processing means) used in the communication system of the refrigerating and cooling device of the present embodiment is connected to the connector 50 so as to be detachable. As shown in FIG. 14, the terminal unit 160 includes a microcomputer 65 wherein a RAM 65a (second memory means) is stored. The RAM 65a functions as a recording register for storing therein the respective temperatures of the refrigerating compartment 2, the cold compartment 3, and the vegetable compartment 4 of the refrigerating and cooling device, the respective states of the units being controlled by the main control section and the sub-control section 25.

The microcomputer 65 communicates with at least one of the main control section 20 and the sub-control section 25 of the refrigerating and cooling device through the communication-use cable 36 so as to collect various information, and stores the collected information in the RAM 65a as described below.

The microcomputer 65 of the terminal unit 160 sets respective addresses beforehand for the output units such as the electric fan 10, the electric damper 14, or the input units such as the thermistor 8a. Then, the microcomputer 65 records in the RAM 65a various kinds of information, for example, the respective states of the above output units being controlled, or input information from the above input units, etc., in every predetermined time, for example, every minute. The terminal unit 160 is arranged such that it can be connected to a check unit 66 (check means) provided with a computer composed of CPU, ROM, RAM, etc.

Other than the above, the terminal unit 160 of the present embodiment has the same functions and configurations as the terminal unit 60 of the second embodiment.

The check unit 66 reads out various data recorded in the RAM 65a of the microcomputer 65. For example, the check unit 66 computes the cooling and freezing abilities from the changes in the respective temperatures of the refrigerating compartment 2, the cold compartment 3, and the vegetable compartment 4 as time passes. Namely, the check unit 66 analyses the various data and determines the performance of the refrigerating and cooling device. In the present embodiment, the communication system is mainly composed of the main control section 20, the sub-control sections 25, the communication-use cable 36, and the terminal unit 160.

Other than the above, the refrigerating and cooling device of the present embodiment has the same functions and configurations as the refrigerating and cooling device of the second embodiment.

The terminal unit 160 is used for checking the operations and performances of the various units, and the thermistor 8a after assembling the refrigerating and cooling device. Therefore, the microcomputer 65 of the terminal unit 160 records various data in the RAM 65a, for example, in every minute so as to enable the following: checking of the operating efficiency of the compressor 15, determinations of the performance of the refrigerating and cooling device by the changes in the temperatures in the compartments 2, 3, and 4 as time passes, i.e., detection of the defective products. Additionally, the time interval which records the above data is not limited to a minute.

Figure 15:
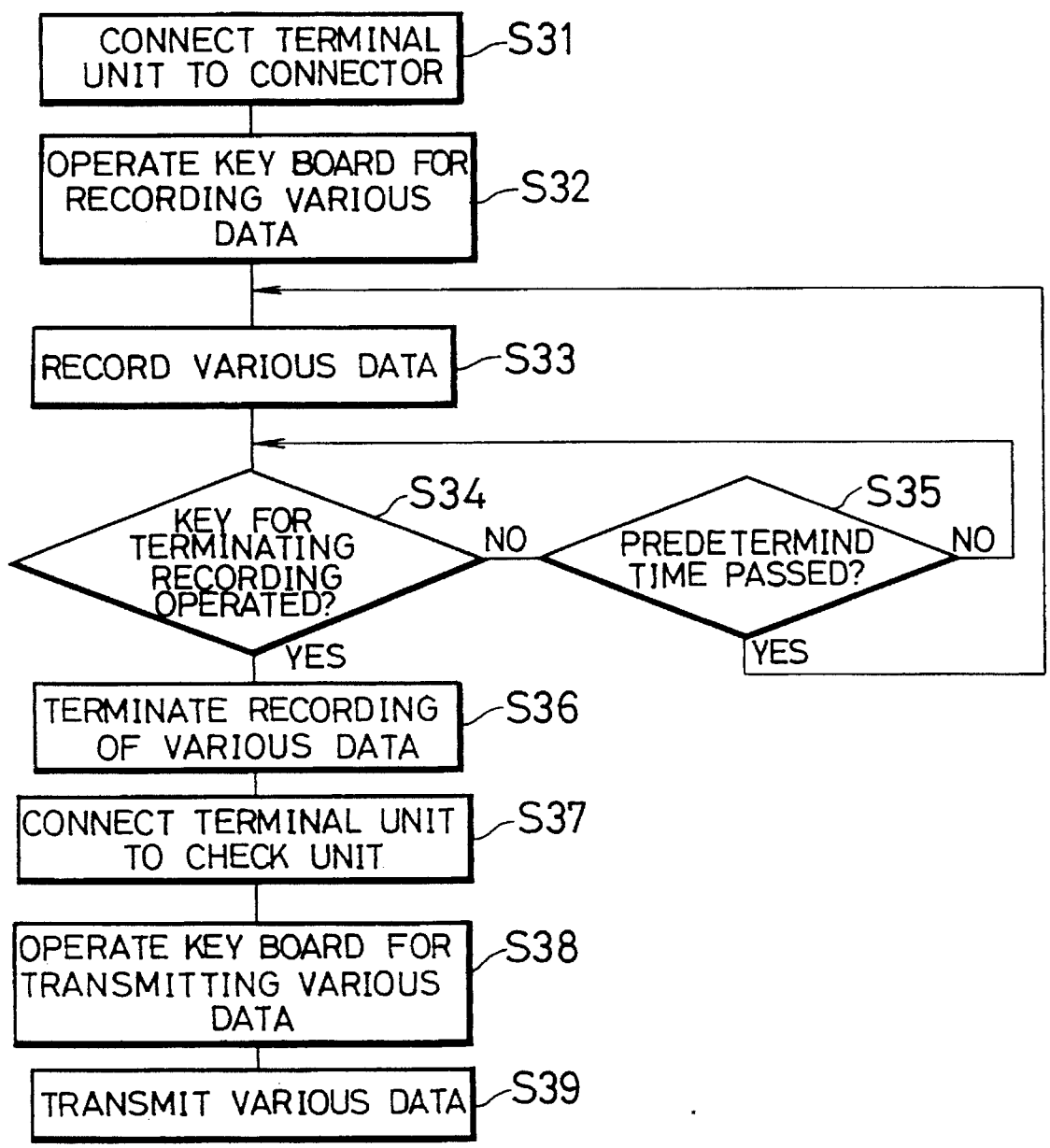

The following will explain the process for recording the above various data in the terminal unit 160 and the readout process of the recorded data by the check unit 66 with reference to the flow chart of FIG. 15.

First, the terminal unit 160 is connected to the connector 50 (S 31). Then, a key board 62 is operated for recording various data (S 32). Based on the operations of the key board 62, the microcomputer 65 of the terminal unit 160 records various data. in the RAM 65a (S 33). Here, the recording operation of the various data in the RAM 65a is continued in every minute unit a key for terminating recording is operated (S 34 and S 35). When the key for completing recording is operated after a predetermined time, the recording operating operation is terminated (S 36). Next, the terminal unit 160 is disconnected from the connector 50, and connected to the check unit 66 (S 37). Then, the terminal unit 160 operates the key board 62 for transmitting the various data to the check unit 66 (S 38), and the data is transmitted to the check unit 66 (S 39).

As described, the terminal unit 160 to be connected to the refrigerating and cooling device of the present embodiment permits reading out various data from the refrigerating and cooling device, and recording of the above data. Furthermore, by connecting the terminal unit 160 to the check unit 66, analysis of the above data is enabled. As a result, a user of the terminal Unit 160 can easily and promptly determines the performance of the refrigerating and cooling device from the results of the analysis using the communication system.

As described, the communication system in accordance with the present embodiment desired for an electric device including a plurality of internal devices is arranged so as to comprise:

at least one sub-control means for controlling operations of the internal device, the sub-control means being placed in the vicinity of the corresponding internal device so as to be connected thereto;

main control means for controlling the electric device by controlling the sub-control means; and single communication line for connecting the main control means and the sub-control means so as to permit communications between them; and second information processing means provided outside the electric device, the second information processing means being connected to the communication line, and wherein the main control means includes:

first transmission means for transmitting a message to the sub-control means through the communication line;

first receiving means for receiving a message from the sub-control means through the communication line, and the sub-control means includes:

second transmission means for transmitting a message to the main control means through the communication line; and second receiving means for receiving a message from the main control means through the communication line, and the second information processing means including second memory means for storing information communicates with at least either one of the main control means and the sub-control means through the communication line so as to collect information indicating the state of the internal device and the information indicating the state of the internal device having being controlled, and stores the collected information in the second memory means.

In this arrangement, because the second information processing means is provided, easily and promptly the state of the internal device of the electric device can be recognized, and respective operations in each internal device by the first information processing means can be easily carried out. Therefore, in the case where trouble has occurred in the electric device of the user's side, because a serviceman in the user's place can be promptly check the cause of the damage without a great degree of disassembly of the electric device, the burden of the serviceman can be significantly reduced, thereby achieving the improvement in the serves offered by the serviceman by reducing the time required for repairing the electric device.

The communication system in accordance with the present embodiment having -the above arrangement may further comprise:

check means for checking the performance of the electric device by analyzing the information read out from the second memory means, the check means being connected to the second information processing means.

In the above arrangement, for example, the second information processing means may be connected to the electric device manufactured in the manufacturing factory for a predetermined time, and after collecting the information indicating the state of the internal device, the second information processing means analyze the collected information by the check means. Because this enables a simplification of the performance test of the electric device, the burden of workers in the factory can be reduced, thereby achieving the improvement in the manufacturing processes.

[EMBODIMENT 4]

Figure 16:
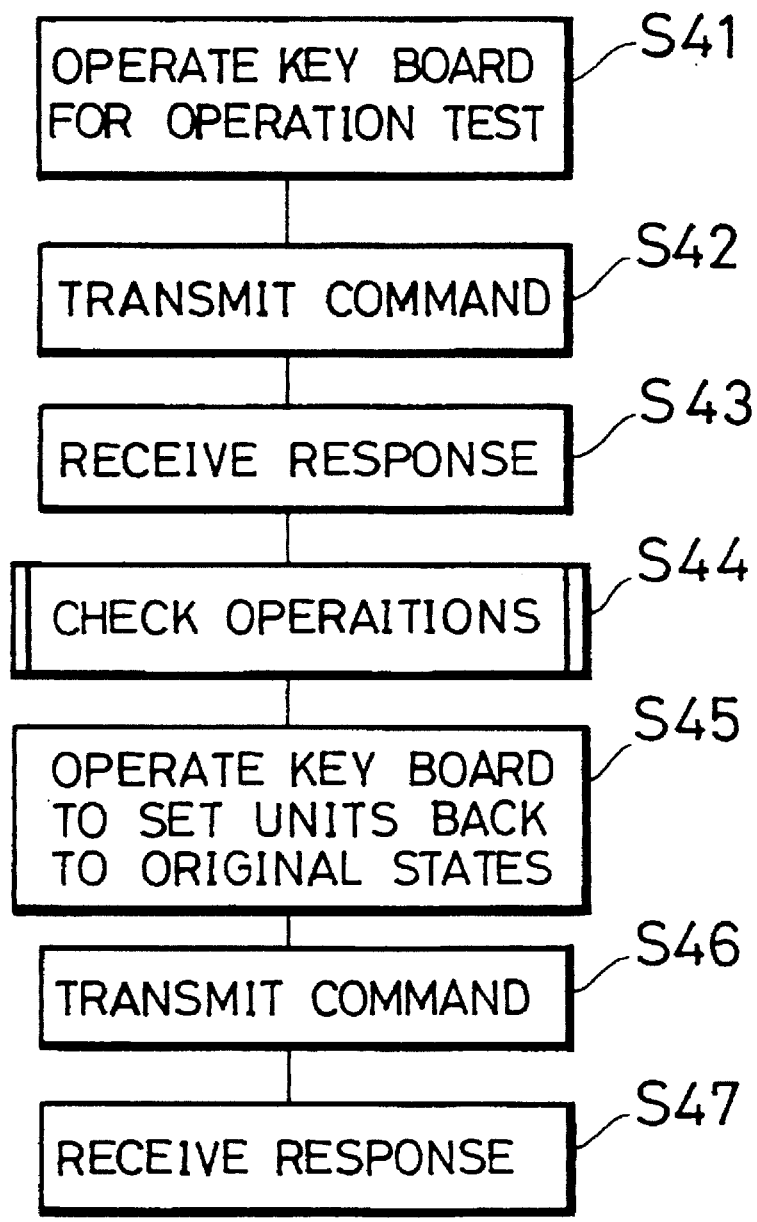

The following description will discuss the fourth embodiment of the present invention with reference to FIGS. 10 and 16.

For convenience, members having the same functions and configurations as in the aforementioned embodiments will be designated by the same code and their description will be omitted.

As shown in FIG. 10, a terminal unit 260 (third information processing means) used in the communication system of the refrigerating and cooling device of the present embodiment is connected to the connector 50 so as to be detachable. By operating a key board 62 (input means), the terminal unit 260 controls the operations of various units of the refrigerating and cooling device. Namely, the performance tests of the above units are enabled by the terminal unit 260.

Other than the above, the terminal unit 260 of the present embodiment has the same functions and configurations as the terminal unit 60 of the second embodiment.

In the present embodiment, the communication system is mainly composed of the main control section 20, the sub-control sections 25, the communication-use cable 36, and the terminal unit 260.

Other than the above, the refrigerating and cooling device of the present embodiment has the same functions and configurations as the refrigerating and cooling device of the third embodiment.

Next, the process for the performance test of various units of the refrigerating and cooling device will be explained below with reference to the flow chart of FIG. 16.

First, the terminal unit 260 is connected to the connector 50, and the key board 62 is operated for the performance test of the various units (S 41). For example, when the performance test of the electric damper 14 is to be carried out, the node address for the sub-control section 25 to which the electric damper 14 is connected, the address of the electric damper 14 set beforehand, the content of the operations to be carried out by the electric damper 14 (i.e., change either from the opened state to the closed state or from the closed state to the opened state) are inputted in this order by operating the key board 62. Then, the microcomputer 65 of the terminal unit 260 transmits the header, the node address, and the command to the corresponding main control section 20 by operating the key board 62 so as to instruct the corresponding sub-control section 25 to carry out the above performance test (S 42). Then, the microcomputer 65 receives the response message transmitted from the main control section 20 (S 43).

Next, the user of the terminal unit 260 visually checks whether or not the above processes are carried out properly (S 44). Then, the user operates the key board 62 so as to set back the various units respectively to their original states before the performance tests are carried out (S 45). Here, the key board 62 is operated as described in S 41. Based on the operations of the key board 62, the microcomputer 65 of the terminal unit 260 transmits the header, the node address, and the command to the main control section 20 by operating the key board 62 so as to instruct the sub-control section 25 to terminate the test performance (S 46). Then, the microcomputer 65 receives the response message from the main control section 20 (S 47).

As described, the terminal unit 260 to be connected to the refrigerating and cooling device of the present embodiment permits test performances of various units of the refrigerating and cooling device. Therefore, the user of the terminal unit 60 can easily confirm the operations of the refrigerating and cooling device using the communication system.

As described, the communication system in accordance with the present embodiment designed for the electric device including a plurality of internal devices is arranged so as to comprise:

at least one sub-control means for controlling operations of the internal device, the sub-control means being placed in the vicinity of the corresponding internal device so as to be connected thereto;

main control means for controlling the electric device by controlling the sub-control means;

single communication line for connecting the main control means and the sub-control means so as to permit communications between them; and third information processing means provided outside the electric device, the second information processing means being connected to the communication line, and wherein the main control means includes:

first transmission means for transmitting a message to the sub-control means through the communication line;

first receiving means for receiving a message from the sub-control means through the communication line, and the sub-control means includes:

second transmission means for transmitting a message to the main control means through the communication line; and second receiving means for receiving a message from the main control means through the communication line, and the third information processing means includes:

display means for displaying information; and input means for inputting data for operating the internal device in the electric device, and the third information processing means communicates with at least either one of the main control means and the sub-control means through the communication line so as to instruct it to carry out a performance test of the internal device based on the input data from the input means, and the third information processing means collects information indicating the results of the performance test, and displays the collected information on the display means.

In the above arrangement, by operating the input means of the third information processing means, the performance test of each internal device in the electric device is enabled. Further, because the results of the performance test are displayed on the display means of the third information processing means, by looking at the display means of the third information processing means, the results of the performance test can be easily confirmed.

Therefore, when a serviceman carries out a maintenance operation of the electric device in the user's place, using the third information processing means, easily and promptly the performance test of each internal device in the electric device can be carried out. Therefore, the burden of the serviceman can be significantly reduced, and the improvement in the serves offered by the serviceman can be achieved. Furthermore, by connecting the third information processing means to the electric device manufactured in the manufacturing factory, the performance test of each internal device in the electric device can be easily carried out. Because this enables a simplification of the performance test of the electric device, the burden of workers in the factory can be reduced, thereby achieving the improvement in the manufacturing processes.

[EMBODIMENT 5]

Figure 17:
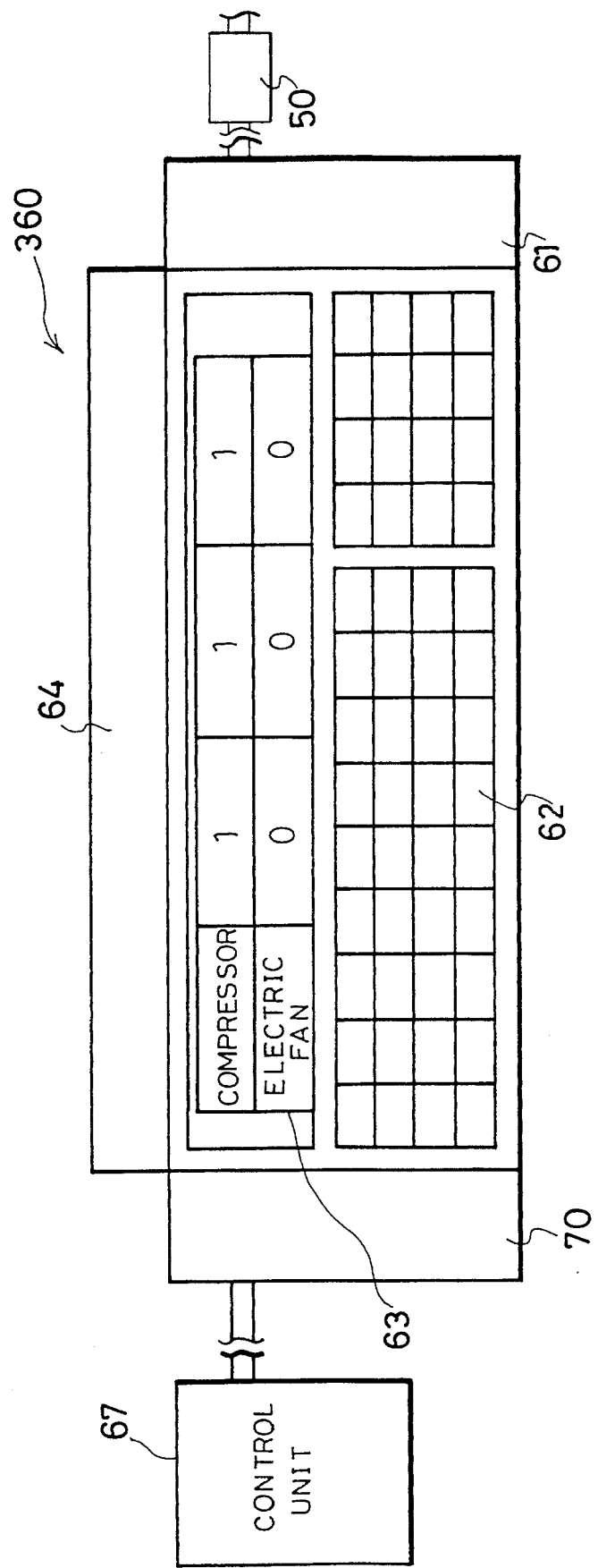
Figure 18:
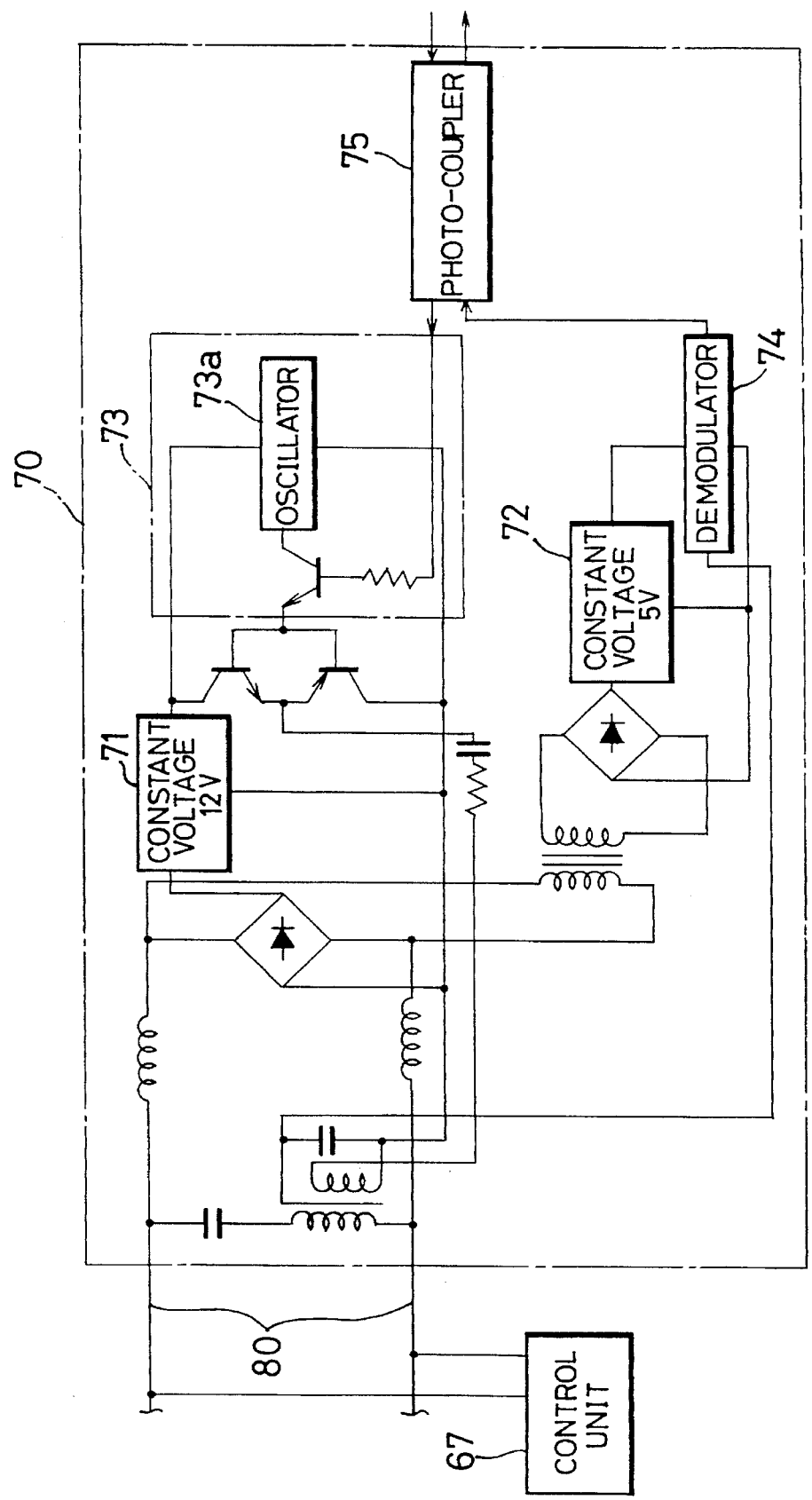

The following description will discuss the fifth embodiment of the present invention with reference to FIGS. 17 and 18.

For convenience, members having the same functions and configurations as in the previous embodiments will be designated by the same code and their description will be omitted.

As shown in FIG. 17, a terminal unit 360 (fourth information processing means) used in the communication system of the refrigerating and cooling device of the present embodiment is connected to the connector 50 so as to be detachable. The terminal unit 360 is provided with a communication use interface circuit (hereinafter referred to as I/F circuit) 70 for the bidirectional communications with a control unit 67 (manufacture control means) for controlling the manufacturing processes of the refrigerating and cooling devices by a computer as shown in FIG. 17. The I/F circuit 70 is provided between a pair of commercial use AC power feeders 80 for feeding power to the control unit 67 and the microcomputer 65 of the terminal unit 360. The I/F circuit 70 is a modem mainly composed of constant voltage circuits 71 and 72, a modulator 73 including an oscillator 73a, a demodulator 74, and a photo coupler 75.

Other than the above, the terminal unit 360 of the present embodiment has the same functions and the configurations as the terminal unit 60 of the fourth embodiment.

The demodulator 74 includes an amplitude circuit, a waveform shaping circuit, a lowpass filter, etc. The oscillator 73a oscillates, for example, a pulse of 50 kHz. The photo coupler 75 serves to electrically insulate the commercial use AC power feeders 80 and the microcomputer 65 of the terminal unit 360. The I/F circuit 70 modulates or demodulates a carrier signal of a base band transmitted from the I/F circuit 61 of the terminal unit 360, which is, for example, a 0/1 signal of AC current of 40 kHz. The I/F circuit 70 transmits the signal to the control unit 67 through the commercial use AC power feeders 80. Namely, the I/F circuit 70 carries out a so-called power feeder transport communication.

In the present embodiment, the communication system is mainly composed of the main control unit 20, the sub-control sections 25, communication-use cable 36, the terminal unit 360, and the control unit 67.

Other than the above, the refrigerating and cooling device of the present embodiment has the same functions and configurations as the refrigerating and cooling device of the forth embodiment.

The carrier signal serves to transmit various data of various units in the refrigerating and cooling device to the control unit 67. Further, the control unit 67 enables bidirectional communications with a plurality of terminal units 360 respectively connected to a plurality of the refrigerating and cooling devices, for example, by polling/selecting. Therefore, a batch control of the manufacturing processes of a plurality of refrigerating and cooling devices is enabled.

As described, the terminal unit 360 to be connected to the refrigerating and cooling device of the present embodiment transmits a carrier signal to the control unit 67 through the commercial use AC power feeders 80. Namely, the terminal unit 360 carries out the power feeder transport communication. Therefore, a cable which is made for communication-use only is not required between the terminal unit 360 and the control unit 67. Moreover, the control unit 67 permits various data of the various units of the refrigerating and cooling device to be read out together. Because the control unit 67 can read out the above various data using the communication system through the terminal unit 360, and can analyze the data, the manufacturing process of the refrigerating and cooling device can be controlled based of the data. As a result, the efficient manufacturing process of the refrigerating and cooling devices can be achieved.

As described, the communication system in accordance with the present embodiment designed for the electric device including a plurality of internal devices is arranged so as to comprise:

at least one sub-control means for controlling operations of the internal device, the sub-control means being placed in the vicinity of the corresponding internal device so as to be connected thereto;

main control means for controlling the electric device by controlling the sub-control means;

single communication line for connecting the main control means and the sub-control means so as to permit communications between them;

fourth information processing means provided outside the electric device, the fourth information processing means being connected to the communication line for communicating with at least either one of the main control means and the sub-control means through the communication line so as to collect information indicating the state of the internal device and information indicating the state of the internal device having being controlled; and control means for controlling manufacturing processes of a plurality of electric devices based on the information collected respectively through a plurality of the fourth information processing means, the manufacture control means being connected to a plurality of the fourth information processing means which are respectively connected to a plurality of electric devices, and wherein the main control means includes:

first transmission means for transmitting a message to the sub-control means through the communication line;

first receiving means for receiving a message from the sub-control means through the communication line, and the sub-control means includes:

second transmission means for transmitting a message to the main control means through the communication line; and second receiving means for receiving a message from the main control means through the communication line.

As described, by connecting the manufacture control means and a plurality of electric devices on line by a plurality of fourth information processing means, performance tests of a plurality of electric devices manufactured in the manufacturing factory can be carried out efficiently by single manufacture control means. Because this permits the reduction in the burden of the workers who carry out the performance tests of the electric devices, and the improved efficiency in the manufacturing processes can be achieved.

The communication system having the above arrangement may be arranged as follows:

A plurality of fourth information processing means and the control means are connected by AC power feeders so as to enable power feeder transport communications between them.

This permits a reduction in the required number of components by eliminating the cable made for communication-use only between the terminal unit and each fourth information processing means.

[EMBODIMENT 6]

Figure 19:
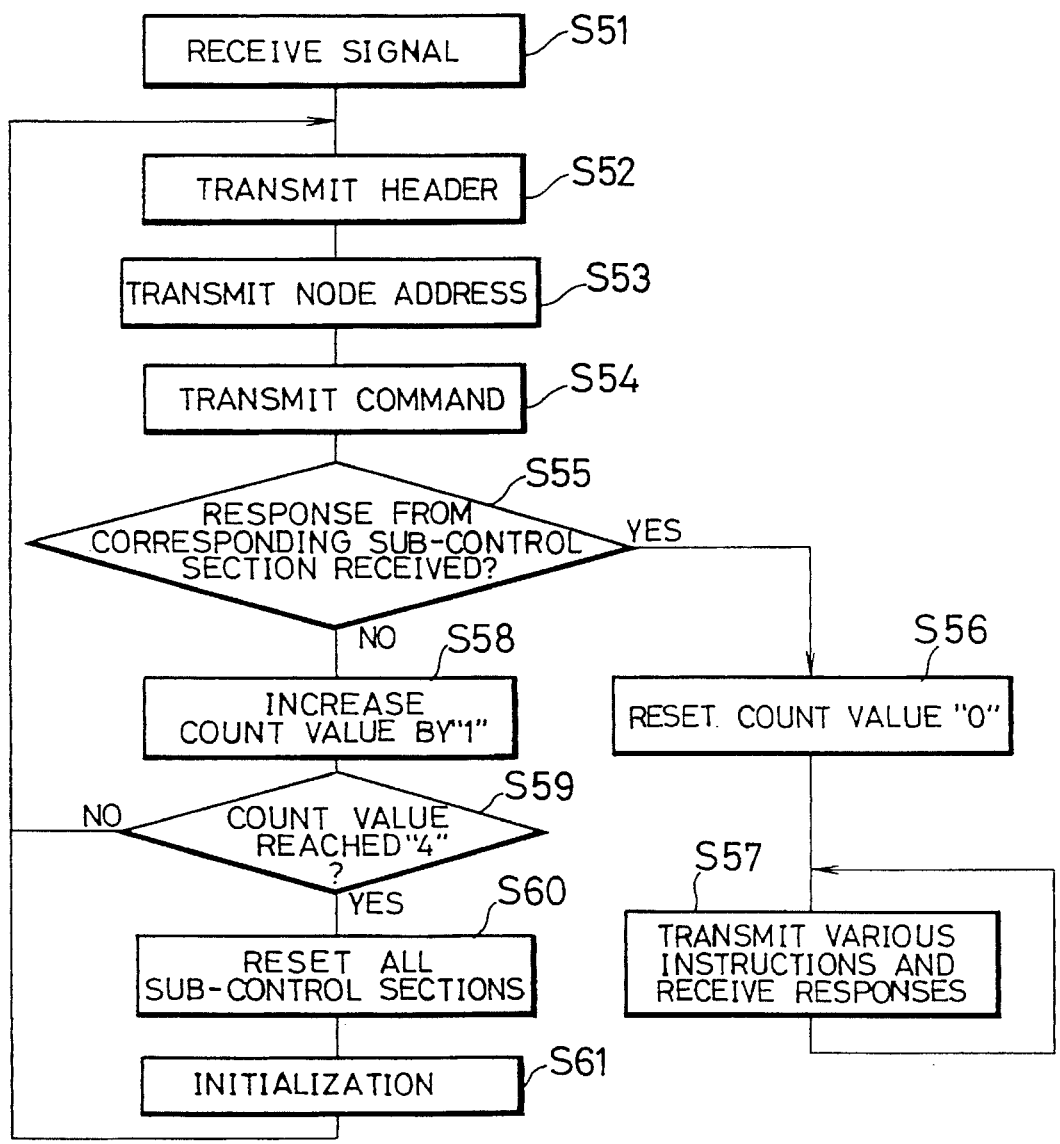

The following descriptions will discuss the sixth embodiment of the present invention with reference to FIG. 9 and FIG. 19.

For convenience, members having the same functions and configurations as in the first and the second embodiments will be designated by the same code and their descriptions will be omitted.

In the present embodiment, the main control section 20 of the communication system of the refrigerating and cooling device is provided with a counter in the microcomputer 22, which is composed of a control timer (a so-called "watch dog timer") for preventing the main control section 20 from being hung-up.

The microcomputer 22 of the main control section 20 includes the following means each being composed of a CPU 301 (see FIG. 7) which executes various programs stored in a ROM 302: response detection means for detecting whether nor not a response message is received from the sub-control section 25 after transmitting a message to the sub-control section 25; and the first initialization means for initializing all the sub-control sections 25 when the response detection means detects successively a predetermined number of times that the response message from the sub-control section has not been received.

As shown in FIG. 9, the main control section 20 is provided with the DC power supply controlling circuit 39 (DC power supply controlling means) for initializing the sub-control sections 25. The microcomputer 22 of the main control section 20 checks whether or not the response message is received from the polled sub-control section 25 when the main control section 20 bidirectionally communicates with a plurality of the sub-control sections 25, for example, by polling/selecting. If the response message is not received, the counter counts the number of times detected that the response message from the sub-control section 25 is not received.

The microcomputer 22 of the main control section 20 is arranged such that if the number of times detected that the response message from the sub-control section 25 has not been received, for example, reaches 4, it is determined either trouble or a run-away has occurred in the sub-control section 25. Then, all the sub-control sections 25 are initialized by the microcomputer of the main control means 20.

The DC power controlling circuit 39 is a so-called "power ON/clear circuit", and is arranged such that by setting a transistor 39a (switching means) of the circuit 39 to the OFF state for a second, DC power to be fed to the sub-control sections 25 through the DC power feeder 35 is temporarily set at 0 V. As a result, all the sub-control sections 25 are turned OFF. Thereafter, the microcomputer 22 of the main control section 20 turns ON the transistor 39a so that DC voltage is again supplied to each sub-control section 25, thereby resetting each sub-control section 25. Thereafter, each sub-control section 25 is initialized again by the microcomputer 22 of the main control section 20.

In the present embodiment, the main control section 20, the sub-control sections 25, and the communication-use cable 36 are the main components of the communication system.

Other than the above, the refrigerating and cooling device of the present embodiment has the same functions and configurations as the refrigerating and cooling device of the fifth embodiment.

Next, the control processes of the main control unit 20 will be explained with reference to the flow chart of FIG. 19.

First, when the main control section 20 receives input information from the input unit such as a thermistor 8a, etc., from the sub-control section 25 (S 51), a message including the header, the node address, and the command is transmitted to the corresponding sub-control section 25 (S 52–S 54). After transmitting the message, if the response message is received from the corresponding sub-control section 25 (S 55), the count value of the counter is reset to "0" (S 56). Then, the main control section 20 transmits various instructions to the sub-control section 25, and also receives response messages from the sub-control section (S 57).

On the other hand, if the response message is not received from the corresponding sub-control section 25 in S 55, the count value of the counter increases by 1 (S 58). Here, if the count value is less than 4 (S 59), the sequence moves to S 52, and the above processes in S 52 S–S 59 are repeated. Then, if the count value reaches 4 in S 59, i.e., when it is detected successively 4 times that the response message has not been received from the sub-control section 25, it is determined that trouble has occurred in the sub-control section 25, and all the sub-control sections 25 are reset by the DC power control circuit 39 (S 60) so as to initialize each of the sub-control sections 25 once again (S 61), and the sequence moves back to S 52. In addition, the initializing process in S 61 has been described in the second embodiment, thus the explanations thereof shall be omitted here.

As described, the communication system in accordance with the present invention is designed for an electric device including a plurality of internal devices, and is arranged so as to comprise:

at least one sub-control means for controlling operations of the internal device, the sub-control means being placed in the vicinity of the corresponding internal device so as to be connected thereto;

main control means for controlling the electric device by controlling the sub-control means; and a single communication line for connecting the main control means and the sub-control means so as to permit communications between them, and wherein the main control means includes:

first transmission means for transmitting a message to the sub-control means through the communication line;

first receiving means for receiving a message from the sub-control means through the communication line, and the sub-control means includes:

second transmission means for transmitting a message to the main control means through the communication line; and second receiving means for receiving a message from the main control means through the communication line, and the second transmission means of the sub-control means includes:

second response means for transmitting a response message to the main control means when a message is received therefrom, and the main control means includes:

response detection means for detecting whether or not the response message from the sub-control means is received after transmitting a message to the sub-control means; and first initialization means for initializing all of the sub-control means when the response detection means detects successively a predetermined number of times that the response message from the sub-control means has not been received.

In the above arrangement, the communication system can be made more reliable. More concretely, in response to a message transmitted from the main control means, if a response message is not received from the corresponding sub-control means, the cause may be a run-away occurring in the sub-control means. According to the above arrangement, because the first initialization means is provided in the main control means, all the sub-control means are initialized in the above case. Therefore, the sub-control means wherein a run-away has occurred can be set back to its normal condition; and thereafter, the communications between the main control means and the sub-control means can be carried out properly.

[EMBODIMENT 7]

The following description will discuss the seventh embodiment of the present invention with reference to FIGS. 20 through 26.

For convenience, members having the same functions and configurations as in the figures used in the first embodiment will be designated by the same code and their descriptions will be omitted. To distinguish respective sub-control sections 25, the sub-control sections 25 provided in the refrigerating compartment 2 are designated as the sub-control sections 25a and 25b, the sub-control section provided in the cold compartment 3 is designated as the sub-control section 25c, and the sub-control section in the vegetable compartment 4 is designated as 25d.

In communication system of the first embodiment adopted in the refrigerating and cooling device, when collision occurs among the messages, all the control sections 20 and 25 for transmitting messages are set in the stop state for a predetermined time before restarting the transmission. Therefore, in the arrangement of the first embodiment, whenever a collision occurs among the messages, the control operation will be delayed.

In the case where communications are controlled only by the polling of the main control section 20, for example, when the state of the input unit being connected to the sub-control section 25 has changed, the sub-control section 25 cannot send this information to the main control section 20 unit it receives a transmission request from the main control section 20. Therefore, when the state of the input unit has changed, a large delay may occur for controlling the output unit based on the change.

Moreover, in the case of adopting a bidirectional communication system (a so-called contention system), which enables transmissions from each sub-control section 25 to the main control section 20, when states of a plurality of input units respectively connected to a plurality of sub-control sections 25 have changed, a plurality of messages may be transmitted respectively from a plurality of sub-control sections 25 at one time, and collisions among the messages may occur. Therefore, the transmission of the message given a higher priority such as a message regarding the urgent control may be delayed, thereby presenting the problem of reducing the performance of the refrigerating and cooling device.

Figure 20:
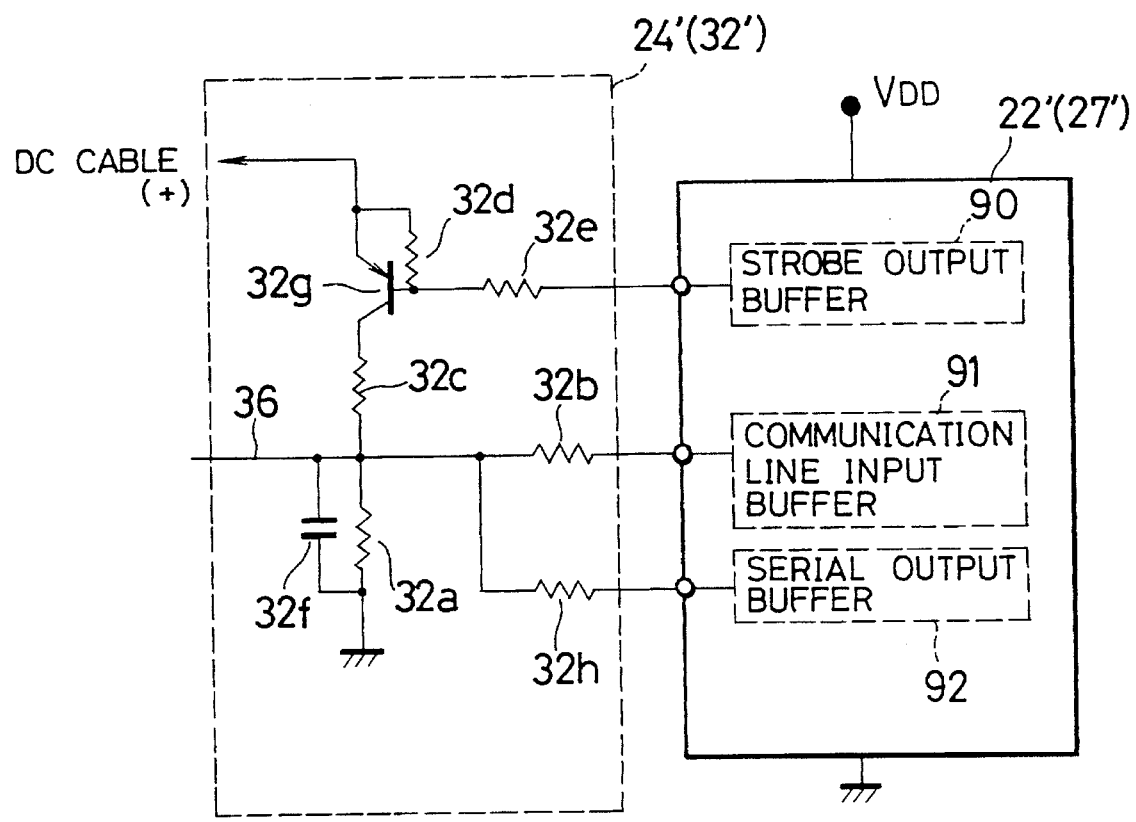

Therefore, the communication system of the present embodiment adopted in the present embodiment enables the elimination of the possibility of the controlling process being delayed due to the collisions among the messages in the following arrangement:

Other than a microcomputer 22' and an I/F circuit 24' of the main control section 20, and a microcomputer 27' and an I/F circuit 32' of the sub-control section 25 shown in FIG. 20, a refrigerating and cooling device of the present embodiment has the same configurations as the first embodiment.

As shown in FIG. 7, the microcomputer 22' of the main control section 20, and the microcomputer 27' of the sub-control section 25 are mainly composed of CPU 301, ROM 302, and the RAM 303. This basic arrangement is generally known. The ROM 302 stores various programs to be executed by the CPU 301. Further, the RAM 303 stores various data used when the CPU 301 executes the various programs stored in the ROM 302.

Additionally, the following means are composed of the CPU 301 which executes various programs stored in the ROM 302 in the microcomputer 22' of the main control section 20:

first mark transmission means for transmitting a mark indicating that a message transmission to each sub-control section 25 has started;

first state detection means for detecting the state of the communication-use cable 36;

first wait means for setting the main control section 20 in the wait state for transmitting a message when it is detected that the state of the communication-use cable 36 does not correspond to the mark while the mark is being transmitted;

first transmission permitting means for permitting the transmission of the message when it is detected that a null state in the communication-use cable 36 lasts for a predetermined time (first period);

polling means for transmitting a transmission request signal for requesting each sub-control means 25 for transmitting input information of the input unit by polling; and control message transmission means for transmitting a message to the sub-control section 25 for controlling the output unit based on the message including the input information from the sub-control section 25 after receiving the message.

Similarly, the following means are composed of the CPU 301 which executes various programs stored in the ROM 302 in the microcomputer 27' of the sub-control section 25:

second mark transmission means for transmitting a mark indicating that a message transmission to the main control section 20 has started;

second state detection means for detecting the state of the communication-use cable 36;

second wait means for setting the sub-control section 25 in the wait state for transmitting a message when it is detected that the state of the communication-use cable 36 does not correspond to the mark while transmitting the mark;

second transmission permitting means for permitting the transmission of the message when it is detected that a null state in the communication-use cable 36 lasts for a predetermined time (second period); and input information transmission means for transmitting a message including input information of the input unit to the main control section 20 when the transmission of the message is permitted by the second transmission permitting means after receiving a transmission request signal from the main control section 20.

As shown in FIG. 20, the microcomputer 22' of the main control section 20 includes a strobe output buffer 90, a communication line input buffer 91, and a serial output buffer 92. The strobe output buffer 90 is provided for outputting a strobe signal to the I/F circuit 24'. The communication line input buffer 91 is provided for inputting a signal received through the communication-use cable 36. The serial output buffer 92 is provided for outputting a signal to be transmitted through the communication-use cable 36. Similarly, the microcomputer 27' of each sub-control section 25 includes the strobe output buffer 90 for outputting a strobe signal to the I/F circuit 32', the communication line input buffer 91, and the serial output buffer 92. The strobe output buffer 90 is arranged so as to be maintained in the ON state when a transmission is carried out, and to be maintained in the OFF state when a transmission is not carried out.

In the present embodiment, a resistor 32h is provided in the I/F circuit 24' of the main control section 20, and in the I/F circuit 32' of the sub-control section 25. One end of the resistor 32h is connected to the communication-use cable 36, and the other end thereof is connected to the serial output buffer 92. Other than the above, the I/F circuit 24', and the I/F circuit 32' have the same configurations as the I/F circuit 32 (see FIG. 4) of the first embodiment. In the present embodiment, the I/F circuit 24' and the I/F circuit 32' are arranged such that a base of the transistor 32g is connected to the strobe output buffer 90 through a resistor 32e, and the communication-use cable 36 is connected to the communication line input buffer 91 through the resistor 32b.

The strobe output buffer 90 is set in the ON-state when a transmission is carried out, and it is set in the OFF-state when a transmission is not carried out. On the other hand, when a transmitting operation is not carried out, the communication-use cable 36 is set at low level since it is pulled down by a resistor 32a. When a transmission is to be carried out, the strobe output buffer 90 composed of a Nch open drain is turned ON so as to turn ON the transistor 32g, thereby setting the communication-use cable 36 at high level. As a result, the microcomputer 22' of the main control section 20 and the microcomputer 27' of the sub-control section 25 are permitted to transmit respectively through the I/F circuit 24', and the I/F circuit 32'.

In the state where a transmission is permitted, if the serial output buffer 92 composed of Nch open drain is turned ON, the communication-use cable 36 is set at low level. Therefore, by maintaining the ON-state of the strobe output buffer 90, and by turning ON/OFF the serial output buffer 92, a signal is permitted to transmit to the communication-use cable 36.

A signal transmitted through the communication-use cable 36 is carried out by reading an input level of the commutation line input buffer 91.

Figure 21:
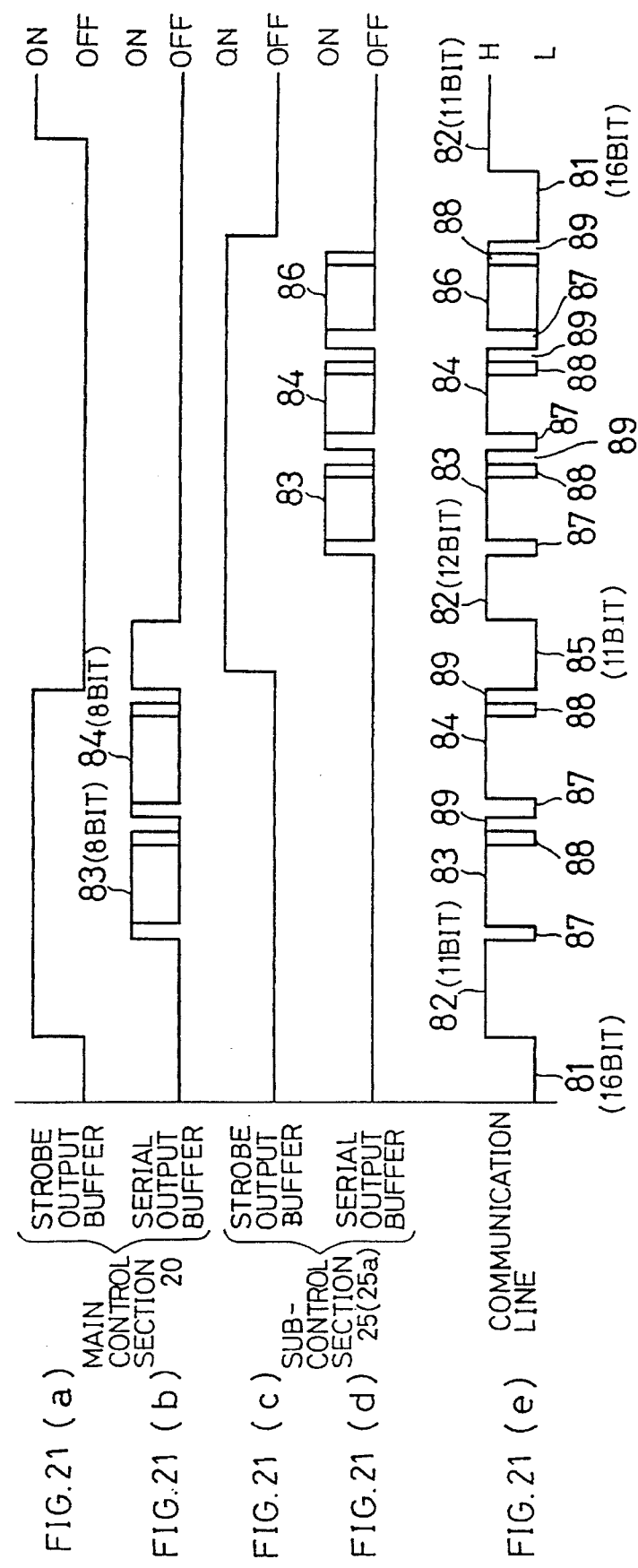

FIG. 21(*a*) through FIG. 21(*e*) are timing charts which respectively explain the communication processes of the main control section 20 when polling is carried out. When polling, a message to be transmitted from the main control section 20 to the sub-control section 25 includes a mark 82, a node address 83, and a command 84. In response to the received the message, the sub-control section 25 transmits a message composed of a mark 82, a node address 83, a command 84, and a datum 86 to the main control section 20 with a space 85.

Figure 22:
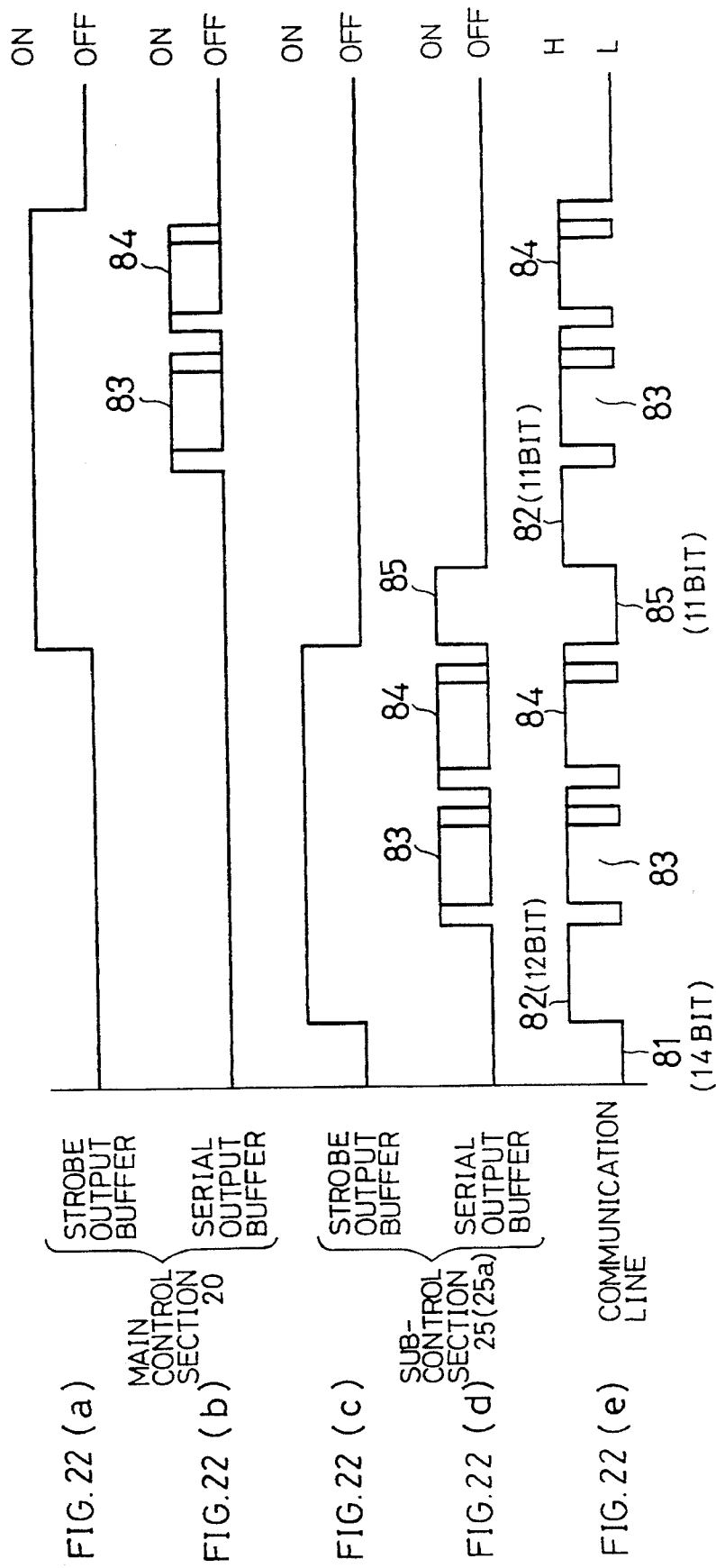

FIG. 22 is a timing chart which explains the communication processes of the sub-control section 25. When calling out, a message to be transmitted from the sub-control section 25 to the main control section 20 includes a mark 82, a node address 83, and a command 84. In response to the received message, the main control section 20 transmits a message composed of a mark 82, a node address 83, and a command 84 to the sub-control section 25 with the space 85.

The mark 82 is transmitted as a header of the message, and the length of the mark 82 is set as follows in consideration of the frequencies and importances of communications, and also for avoiding collisions of the message.

In order to shorten the time required for communicating, the length of the mark 82 in the message transmitted from the main control section 20 is set at the shortest length because the frequencies of communication using the main control section 20 are high. In the present embodiment, the length of the mark 82 is set 11 bits.

As shown in FIG. 1, the door switch 7a of the refrigerating compartment 2 is connected to the sub-control section 25a. Because the sub-control section 25a is often used in the communications, the length of the mark 82 in the message transmitted therefrom is set at the second shortest length next to the one in the message transmitted from the main control section 20. In the present embodiment, the length of the mark 82 in the message transmitted from the sub-control section 25a is set 12 bits.

The lengths of marks 82 in the messages transmitted from the sub-control sections 25b, 25c, and 25d, are set respectively 13 bits, 14 bits, and 15 bits. Namely, the lengths of the marks 82 in the messages transmitted from the control sections 20, 25a, 25b, 25c, and 25d are set all different from one another.

When transmitting the node address 83, the command 84, and the datum 86 included in the message, a start bit 88, a parity bit 88, and a stop bit 89 are respectively added. The start bit 87 is a low level signal of 1 bit. On the other hand, the stop bit 89 is a high level signal of 1 bit.

When a message is transmitted from the main control section 20 to the sub-control section 25, a node address which specifies the sub-control section 25 (receiving end of the message) is added, and a node address for the main control section 20 (transmitting end of the message) is not added. On the other hand, when a message is transmitted from the sub-control section 25 to the main control section 20, a node address which specifies the sub-control section 25 (transmitting end of the message) is added, and the node address for the main control section 20 (receiving end of the message) is not added.

As shown in FIG. 21(a) through FIG. 21(e), when polling is carried out, a mark 82 of 11 bits is always transmitted from the main control section 20. Next, the start bit 87 is transmitted. Then, after the node address 83 of 8 bits is transmitted, a parity bit 88 and a stop bit 89 are transmitted in this order. Next, the start bit 87 is transmitted. Then, after the command of 8 bits is transmitted, the parity bit 88 and the stop bit 89 are transmitted in this order. Lastly, a space 85 of 11 bits that is a tail of the message is transmitted.

The sub-control section 25 (receiving end) recognizes the end of the massage by confirming the space 85 has been received. While receiving the space 85 of 11 bits (tail of the message), the sub-control section 25 carries out a process based on the received command 84, and prepares for transmitting a response message to the main control section 20.

After the transmission of the space 85 from the main control section 20 has been completed, the sub-control section 25, which has received the message, immediately transmits a response message to the main control section 20. In the explanation, the sub-control section 25 which has received a message is designated as 25a. After receiving the space 85 of 11 bits, first, the sub-control section 25a transmits the mark 82 of 12 bits. Next, the sub-control section 25a transmits the start bit 87. Then, after transmitting the node address 83 which specifies the sub-control section 25a as a transmitting end, the sub-control section 25a transmits the parity bit 88 and the stop bit 89 in this order. Next, the sub-control section 25a transmits the start bit 87. After transmitting the command 84, the sub-control section 25a transmits the parity bit 88 and the stop bit 89 in this order. The command 84 to be transmitted includes a NAK code which indicates that the previous command 84 transmitted from the main control section 20 has not been received properly, or a ACK code which indicates that the previous command 84 transmitted from the main control section 20 has been received properly. Next, the sub-control section 25a transmits the start bit 87. After transmitting the datum 86, the sub-control section 25a transmits the parity bit 88 and the stop bit 89 in this order. For example, in the case where the command 84 received from the main control section 20 is an A/D request, the datum 86 to be transmitted includes an A/D value of a specified A/D converter port 27a.

As shown in FIG. 22(a) through FIG. 22(e), when calling out from the sub-control section 25, a message to be transmitted from the sub-control section 25 to the main control section 20 includes the mark 82, the node address 83, and the command 84. On the other hand, the response message from the main control section 20 which has received the message includes the mark 82, the node address 83, and the command 84. In the figure, the sub-control section 25 is designated as a sub-control section 25a, and the length of the mark 82 to be transmitted from the sub-control section 25 is 12 bits.

The command 84 in the message called out from the sub-control section 25 includes datum corresponding to a change in a signal value of the input unit such as the thermistor 8a to be connected to the sub-control section 25. Hereinafter, the message which includes the above datum is referred to as an input transferred message.

The command 84 in the message to be transmitted from the main control section 20 in response to the received input transferred message includes the ACK code or the NAK code. When the main control section 20 controls the output unit such as the electric fan 10, based on the received input transferred message from the sub-control section 25, the main control section 20 transmits a message to the sub-control section 25, the message including the mark 82, the node address 83 for specifying the sub-control section 25 connected to the output unit to be controlled, and the command 84 for controlling the output unit. Then, the sub-control section 25 connected to the output unit to be controlled controls the output unit based on the command 84 in the message received from the main control section 20.

As the described, the main control section 20 can collects and controls information in each sub-control section 25 by polling, and calling out from each sub-control section 25. Furthermore, when necessary, the main control section 20 can control an output unit of each sub-control section 25. As a result, the communication system can be driven by communication control.

Next, the communication processes of the main control section 20 will be explained with reference to the flow chart of FIG. 23.

When a power switch is turned ON, or reset, the main control section 20 transmits a message wherein an initialization instruction is included in the command 84 to each sub-control section 25 (S 71). Then, the main control section 20 instructs each sub-control section 25 to initialize an A/D converter port 27a and an output port 27c, and by receiving a response message from each sub-control section, the response message including datum 86 which indicates that an initialization has been completed (S 72), the main control section 20 confirms that communications with each sub-control section 25 are permitted.

The main control section 20 transmits a message including an initialization instruction to all the sub-control sections 25, and after receiving response messages from all the sub-control sections 25 (S 72), the following processes are carried out for reading a signal value of the input unit connected to each sub-control section 25: A polling for requesting each sub-control section 25 to transmit a value of the input port 27b (hereinafter referred to as an input request) to the main control section 20, and a polling for requesting each sub-control section 25 to transmit input information from the input unit after converting from an analog value to a digital value (hereinafter referred to as an A/D request) to the main control section 20 (S 73). As shown in FIG. 21(e), when a null-state 81 of the communication-use cable 36 lasts for 16 bits (TMm), the polling is to be started with a rise of the mark 82. The main control section 20 is permitted to receive an input transferred message from the sub-control section 25 which has received a polling signal once from the main control section 20 (S 74). The above processes in S 73 and S 74 are carried out for all the sub-control sections 25 (S 75).

Next, the main control section 20 determines whether or not the input transferred message from the sub-control section 25 has been received (S 76). When the main control section 20 receives the input transferred message, the main control section 20 transmits a normal response message wherein the ACK code is included in the command 84 to the sub-control section 25 (transmitting end of the input transferred message) (S 77). The main control section 20 analyzes the command 84 in the received input transferred message, and determines whether or not the control of the output unit is required (S 78). If so in S 78, the main control section 20 transmits an output request message including the command 84 for controlling the output unit to the sub-control section 25 which is connected to the output unit required to be controlled (S 79).

For example, when the door of the refrigerating compartment 2 is opened, and a signal value of the door switch 7a connected to the sub-control section 25a has changed, the sub-control section 25a transmits an input transferred message in response to the change to the main control section 20, and the main control section 20 receives the input transferred message is received. Based on the received input transferred message, first, the main control section 20 transmits a normal response message wherein the ACK code is included in the command 84 to the sub-control section 25a. Then, the main control section 20 transmits a message to the sub-control section 25c, the message including an output request for controlling the output port 27c so as to and to stop the electric damper 14. In the meantime, the main control section 20 transmits a message to the sub-control section 25a, the message including the output request for controlling the output port 27c so as to lighten the lamp 6a stop the electric fan 10. When the corresponding sub-control section 25 receives the message including the output request, it transmits the response message to the main control section 20. Then, the main control section 20 receives the response messages (S 80). Thereafter, the sequence goes back to S 78, and the main control section 20 determines whether or not the transmission of the output request is required based on the received response message.

On the other hand, if the transmission of the output request is not required in S 78, in order to read new data, the main control section 20 sends again a polling signal including the input request and/or the A/D request, and receives the response message transmitted in response to the polling signal (S 81 and S 82). In the meantime, the sequence goes back to S 76, and the processes after S 76 are repeated.

If the main control section 20 has not received the input transferred message from the sub-control section 25 in S 76, the main control section 20 analyzes the messages received from the sub-control section 25 by the polling previously carried out (S 83). Then, based on the result of the analysis, the main control section 20 determines whether or nor the control of the output unit is required (S 78). Thereafter, the processes for controlling the output unit are repeated based on the information collected by polling as explained above.

As described, the main control section 20 normally controls each output unit by sending a polling signal including the input request and/or the A/D request to the each sub-control section 25. However, when the main control section 20 receives an input transferred message transmitted from the sub-control section 25 respectively of the polling signal, the main control section 20 gives priority to the process for controlling the corresponding output unit (to be described later).

Figure 24:
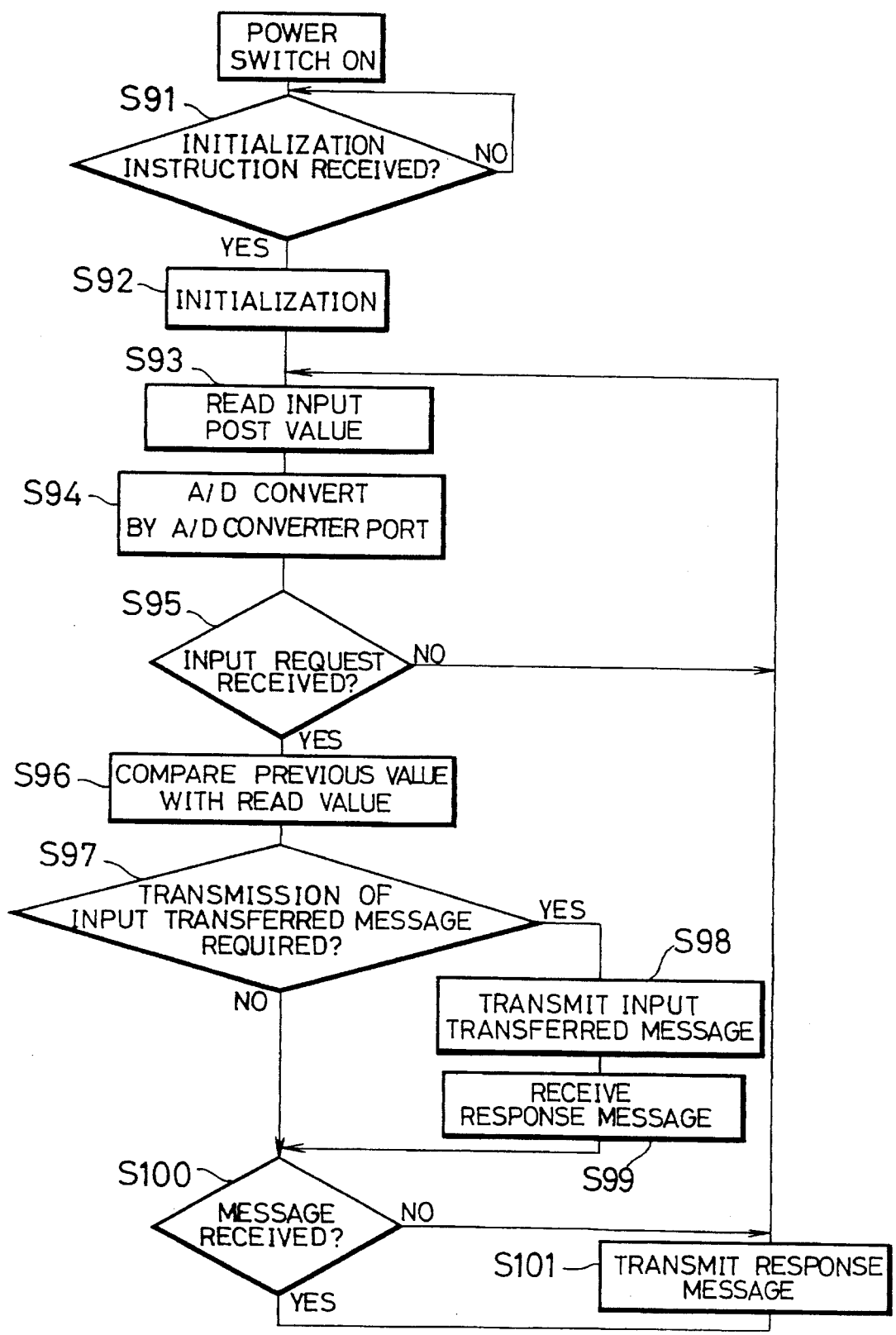
Figure 25:
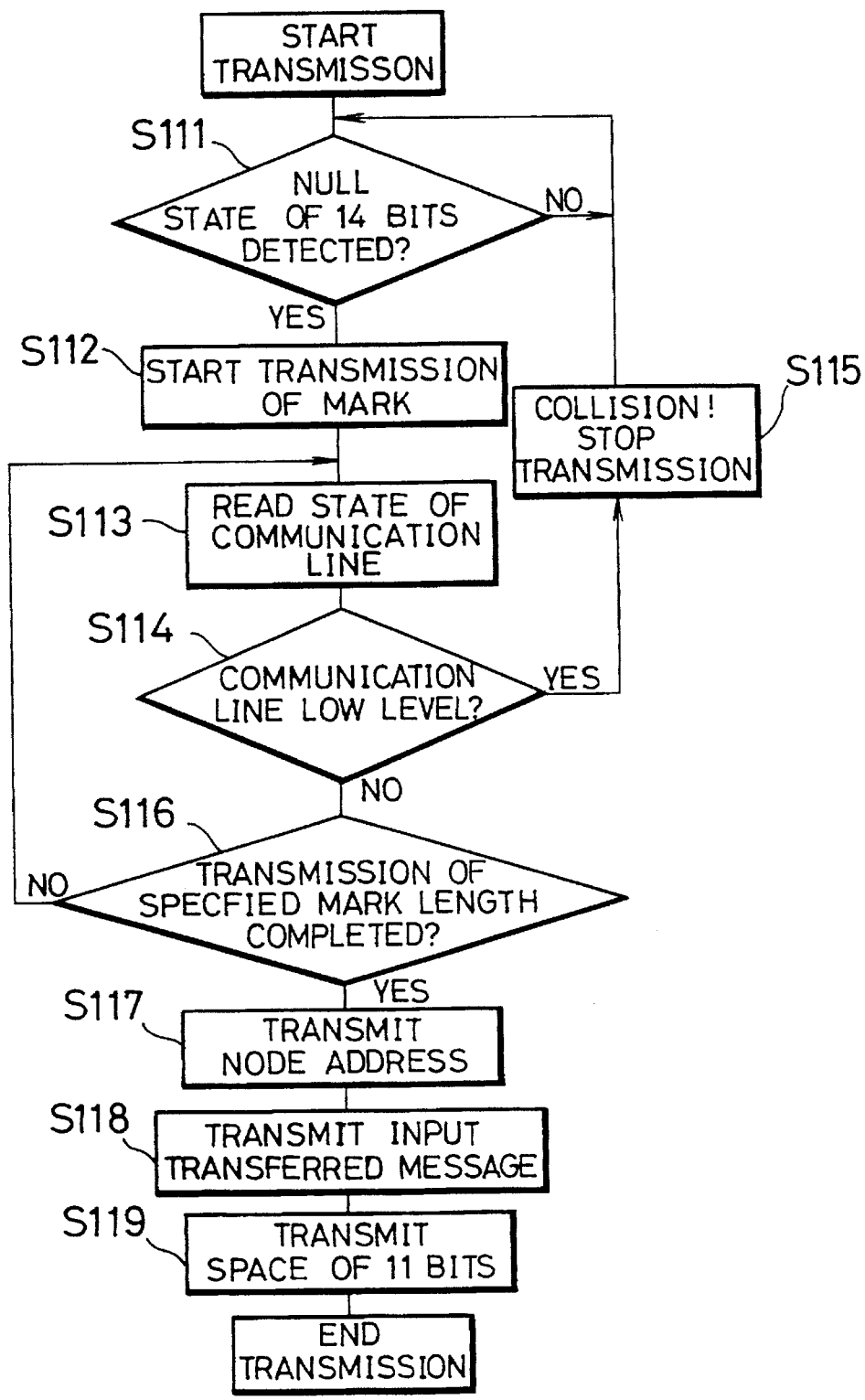
Figure 26:
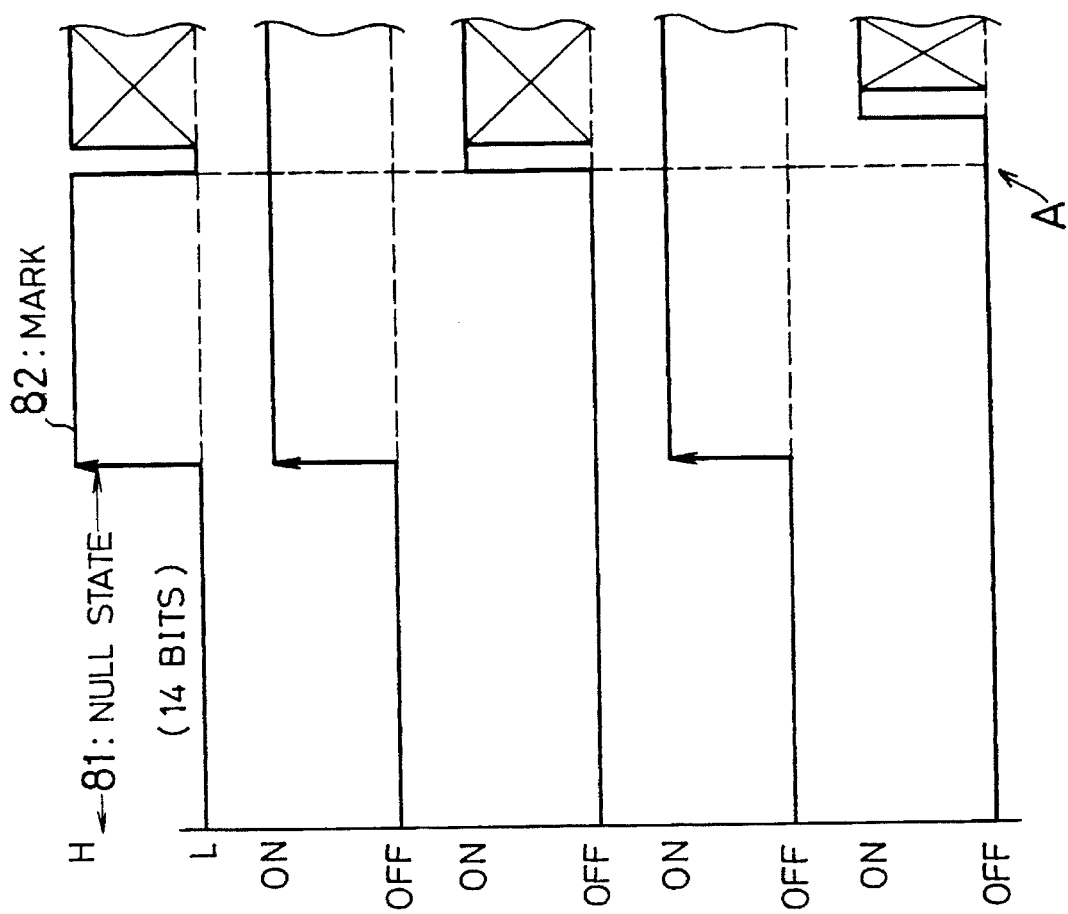

Next, the communication processes of each sub-control section 25 will be explained with reference to the flow chart of FIG. 24.

The communication processes of each sub-control section 25 are carried out in response to the described communication processes of the main control section 20.

When the power switch is turned ON, or reset, the sub-control section 25 is set in the wait state for receiving the message wherein initialization instruction is included in the command 84 from the main control section 20 (S 91). Then, after receiving the message, the sub-control section 25 initializes the A/D converter port 27a and the output port 27c based on the received message (S 92). Next, the sub-control section 25 reads a signal from the input port 27b in order to collect information regarding the input unit connected thereto (S 93). Then, the process for the A/D conversion is carried out by the A/D converter port 27a (S 94). Until receiving the input request by the polling from the main control section 20, the sub-control section 25 is set in the wait state for receiving the input request (S 95), and the processes in S 93 and S 94 are repeated.

When the input request is received by the polling from the main control section 20 in S 95, the read value of the input unit obtained through the processes in S 93 and S 94 is compared with the previous input value (S 96). Based on the result of the comparison, the sub-control section 25 determines whether or not the transmission of the input transferred message is required to the main control section 20 (S 97). If the above two input values are different, and it is determined that some problem arises in the input unit, the sub-control section 25 transmits the input transferred message to the main control section 20 (S 98). In response to the input transferred message, the main control section 20 transmits the response message, and the sub-control section 25 receives the response message (S 99). Then, it is determined whether or not the command 84 for controlling the output unit has been received from the main control section 20 (S 100).

In S 100, if the message for controlling the output unit has been received from the main control section 20, based on the received message, the sub-control section 25 controls the corresponding output unit. In the meantime, the sub-control section 25 transmits a response message to the main control section 20 (S 101). Thereafter, the sequence goes back to S 93, and the sub-control section 25 reads again the value of the input unit connected thereto, and the processes after S 93 are repeated. On the other hand, if the message for controlling the output unit has not been not received from the main control section 20 in S 100, the sequence directly goes back to S 93, and the sub-control section 25 reads again the value of the input unit connected thereto, and the processes after S 93 are repeated.

If in S 97 the read value of the input unit is the same as the previous value, and it is determined that the transmission of the input transferred message is not required, the sequence skips to S 100, and the processes in and after S 100 are carried out as described above.

As shown in FIG. 22(e), when the sub-control section 25 transmits the input transferred message to the main control section 20 in S 98, it is arranged such that when the null state of the communication-use cable 36 lasts for 14 bits (TMs), the sub-control section 25 rises the mark 82, thereby starting the transmission of the input transferred message.

As described, in the case of polling from the main control section 20, when the null state 81 of the communication-use cable 36 lasts for 16 bits (TMm), the main control section 20 raises the mark 82 so as to start the transmission as shown in FIG. 21(e). On the other hand, in the case of transmitting the input transferred message from each sub-control section 25, when the null state 81 of the communication-use cable 36 lasts for 14 bits (TMs), the sub-control section 25 raises the mark 82 so as to start the transmission of the input transferred message. In the above arrangement, even while the polling from the main control section 20 is repeated, the sub-control section 25 can transmit the input transferred message to the main control section 20.

FIG. 26(a) through FIG. 26(b) explain the case where the sub-control section 25a and the sub-control section 25c start respective transmissions at the same time. Referring to the figure, the process for starting the transmission from the sub-control sections 25 will be explained below with reference to the flow chart of FIG. 25.

FIG. 26(a) shows the state of the communication-use cable 36, and FIG. 26(b) and FIG. 26(c) show respective states of the strobe output buffer 90 and the serial output buffer 92 (see FIG. 20) of the sub-control section 25a. On the other hand, FIG. 26(d) and FIG. 26(e) in the figure show respective states of the strobe output buffer 90 and the serial output buffer 92 of the sub-control section 25c.

As shown in FIG. 26(b) and FIG. 26(d), it is assumed that the sub-control section 25a and the sub-control section 25c start the respective transmissions of the input transferred message at the same time. In this case, first, the sub-control sections 25a and 25c respectively read the state of the communication-use cable 36 from the communication line input buffer 91 (see FIG. 20) so as to confirm that the communication-use cable 36 is set at low level (in the null state 81), before starting the transmission of the input transferred message. As described, when the null state of the communication-use cable 36 lasts for 14 bits, the transmission of the input transferred message is permitted. Therefore, when the sub-control sections 25a and 25c confirm that the null state 81 of the communication-use cable 36 lasts for 14 bits (S 111), the sub-control sections 25a and 25c respectively turn ON the strobe output buffers 90 so as to raise the mark 82 (S 112).

Then, the sub-control sections 25a and 25c respectively read the state of the communication-use cable 36 from the communication line input buffers 91 by transmitting the marks 82 (S 113). While the marks 82 are being transmitted, the strobe output buffers 90 are set ON so as to set the communication cable 36 at high level. In spite of this, if the communication cable 36 is at low level, it is determined that a collision among the messages occur. On the other hand, when the communication-use cable 36 is at high level, it is determined that no collision has occurred among messages.

In the above case, at the timing designated by A in FIG. 26(a) through FIG. 26(b), the sub-control section 25a completes the transmission of the mark 82 of 12 bits. Then, the sub-control section 25a turns ON the serial output buffer 92 so as to set the communication-use cable 36 for transmitting the start bit 87 of low level. On the other hand, at the timing A, the mark 82, of 14 bits is being transmitted by the sub-control section 25c, and it reads the state of the communication-use cable 36 (S 113). As a result, the sub-control section 25c confirms that the communication-use cable 36 is at low level although the serial output buffer 92 is set OFF (S 114). Therefore, the sub-control section 25c detects that the collision has occurred among the message transmitted therefrom and the messages transmitted from other sub-control sections 25 in the communication-use cable 36, and immediately stops the transmission of the message (S 115). Then, the sub-control section 25c is set in the wait state until the null state 81 of the communication-use cable 36 lasts for 14 bits (S 111). Namely, the communication-use cable 36 is set wired OR by the resistor 32c in each sub-control section 25 as shown in FIG. 20.

On the other hand, the sub-control section 25a which has completed the transmission of the mark 82 of the specified length without detecting the collision among the messages transmitted therefrom and the messages transmitted from other sub-control sections 25 (S 116), can continue the transmission of the message (S 117, S 118, and S 119). Therefore, for a plurality of sub-control sections 25 to be connected to the communication-use cable 36, by setting the respective lengths of the marks 82 to be different from one another, the collision among the messages can be detected while the marks 82 are being transmitted.

In the above example shown in FIG. 26(a) through FIG. 26(e), the sub-control section 25c which transmits the mark 82 with the length longer than that of the mark 82 transmitted from the sub-control section 25a is set in the wait state for transmitting the input transferred message in order to avoid the occurrence of the collision between the input transferred messages, the transmission of the input transferred message from the sub-control section 25a is given priority over that from the sub-control section 25c. In this way, the more important the sub-control section 25 is for controlling the refrigerating and cooling device, the higher priority is given to transmit the input transferred message to the main control section 20 by setting the length of the mark 82 in the message shorter. In the experiment, when the control of the refrigerating and cooling device was carried out in the above processes, the optimal communication speed was in the range of 300–2400 pbs.

The priority in transmitting the message set by the length of the mark 82 is applicable to the main control section 20 as well.

Additionally, in the embodiment, an explanation has been given through the case where the communication control is carried out for the refrigerating and cooling device. However, the objective of the present invention is not limited to the refrigerating and cooling device. The communication system of the present invention is applicable to the communication system as a whole wherein messages are transmitted and received through a single communication line among a plurality of terminals for any kinds of domestic electric devices. The arrangement of the message and the length of the bit are not limited to those used in the present embodiment.

As described, the communication system in accordance with the present invention is designed for an electric device including a plurality of internal devices, and is arranged so as to comprise:

at least one sub-control means for controlling operations of the internal device, the sub-control means being placed in the vicinity of the internal device so as to be connected thereto;

main control means for controlling the electric device by controlling the sub-control means; and single communication line for connecting the main control means and the sub-control means so as to permit communications between them, and wherein the main control means includes:
first transmission means for transmitting a message to the sub-control means through the communication line;
first receiving means for receiving a message from the sub-control means through the communication line, and the sub-control means includes:
second transmission means for transmitting a message to the main control means through the communication line; and second receiving means for receiving a message from the main control means through the communication line, and the first transmission means of the main control means includes first mark transmission means for transmitting a mark indicating that a message transmission to the sub-control means has started;

the first receiving means of the main control means includes first state detection means for detecting the state of the communication line;

the main control means includes first wait means for setting the main control means in the wait state for transmitting a message when the first state detection means detects that the state of the communication line does not correspond to a mark while the mark is being transmitted from the first mark transmission means;

the second transmission means of the sub-control means includes second mark transmission means for transmitting a mark indicating that a message transmission to the main control means has started;

the second receiving means of the sub-control means includes second state detection means for detecting the state of the communication line; and the sub-control means includes second wait means for setting the sub-control means in the wait state for transmitting a message when the second state detection detects that the state of the communication line does not correspond to a mark while the mark is being transmitted from the second mark transmission means.

In the above arrangement, both the main control means and the sub-control means can detect if the collision has occurred among the messages while the mark which indicates that the message transmission has started is being transmitted. More concretely, when the main control means detects that the collision has occurred among the messages while the mark is being transmitted (i.e., when the first state detection means detects that the state of the communication line does not correspond to the mark while the mark is being transmitted by the first mark transmission means), the main control means immediately stops the transmission of the message, and it is set in the wait state. Similarly, when each sub-control means detects that the collision has occurred among messages while the mark is being transmitted (i.e., when the second state detection means detects that the state of the communication line does not correspond to the mark), the sub-control section immediately stops the transmission of the message, and it is set in the wait state. Therefore, among the control means from which the messages are being transmitted, the control means which detects the collision among the messages first stops the transmission of the message while mark is being transmitted, in order to prevent the message transmissions from other control means from being disturbed. As a result, the possibility of the controlling operations being delayed due to the collision among the messages can be eliminated.

The communication system of the present embodiment having the above arrangement may be arranged such that length of the marks are set all different among the mark transmitted by the first mark transmission means of the main control means and the marks transmitted by the second mark transmission means of the sub-control means, and that the lengths of the marks are set in order according to the priority of the control means which transmit messages set beforehand, the order being such that the higher the priority of the control means, the shorter the mark's length is.

In the above arrangement, the transmission of the message through the communication line is given priority in order according the importances of the control means. Thus, the main control means is given higher priority over the sub-control means. Further, among the sub-control means, the priority is set according the importances of the input units being connected thereto for inputting the information for controlling the output units. This arrangement enables the main control means to promptly receive the important information and to promptly control the output unit based on the information.

The communication system of the present embodiment having the above arrangement may be arranged such that the first transmission means of the main control means includes first transmission permitting means for permitting the transmission of a message when the first state detection means detects that a null state where communications are not carried out through the communication line has last for a first time period and that the second transmission means of the sub-control means includes second transmission permitting means for permitting the transmission of a message when the second state detection means detects that a null state where communications are not carried out through the communication line has last for a second time period set different from the first time period.

In the above arrangement, because the respective timings which the main control means and the sub-control means start transmissions can be set different, thereby eliminating the problem that collision may occur among the messages.

The communication of the present embodiment having the above arrangement is arranged such that the internal device of the electric device includes input units for inputting information regarding the electric device; said first transmission means of said main control means includes polling means for transmitting a transmission request signal for requesting each of said sub-control means by polling to transmit input information from the input unit to said main control means when the transmission of the message is permitted by said first transmission permitting means; said second transmission means of said sub-control means includes input information transmission means for transmitting a massage including the input information from the input unit when the transmission of the message is permitted by said second transmission permitting means after receiving the transmission request signal from said main control means; and the second time period is set shorter than the first time period.

In the above arrangement, even while the polling from the main control means is repeated, the sub-control means can transmit the input transferred message to the main control means. Thus, the main control means can promptly control the internal devices in response to the change in the input information from the input unit.

The communication system of the present embodiment having the arrangement may be arranged so as to comprise:

the main control means includes:
  receiving end address addition means for adding identifying information for identifying a receiving end sub-control section in a message to be transmitted thereto, and
  transmitting end identifying means for identifying the transmitting end sub-control means based on the identifying information in the message received therefrom, and the sub-control section includes:
  identifying information recognition means for recognizing its own identifying information;

receiving end recognition means for recognizing itself as a receiving end by comparing the identifying information in the received message with its own identifying information; and transmitting end address addition means for adding its own identifying information into a message to be transmitted to the main control means, and the message transmitted from the main control means does not include information specifying a transmitting end, and the message transmitted from the sub-control means does not include information specifying a receiving end.

In the above arrangement, because the lengths of the message transmitted from the main control means and the sub-control means can be made shorter, high speed communications are enabled.

[EMBODIMENT 8]

The following descriptions will discuss the eighth embodiment of the present invention with reference to FIGS. 28 through 33.

For convenience, members having the same functions and configurations as in the previous embodiments will be designated by the same code and their descriptions shall be omitted.

Figure 27:
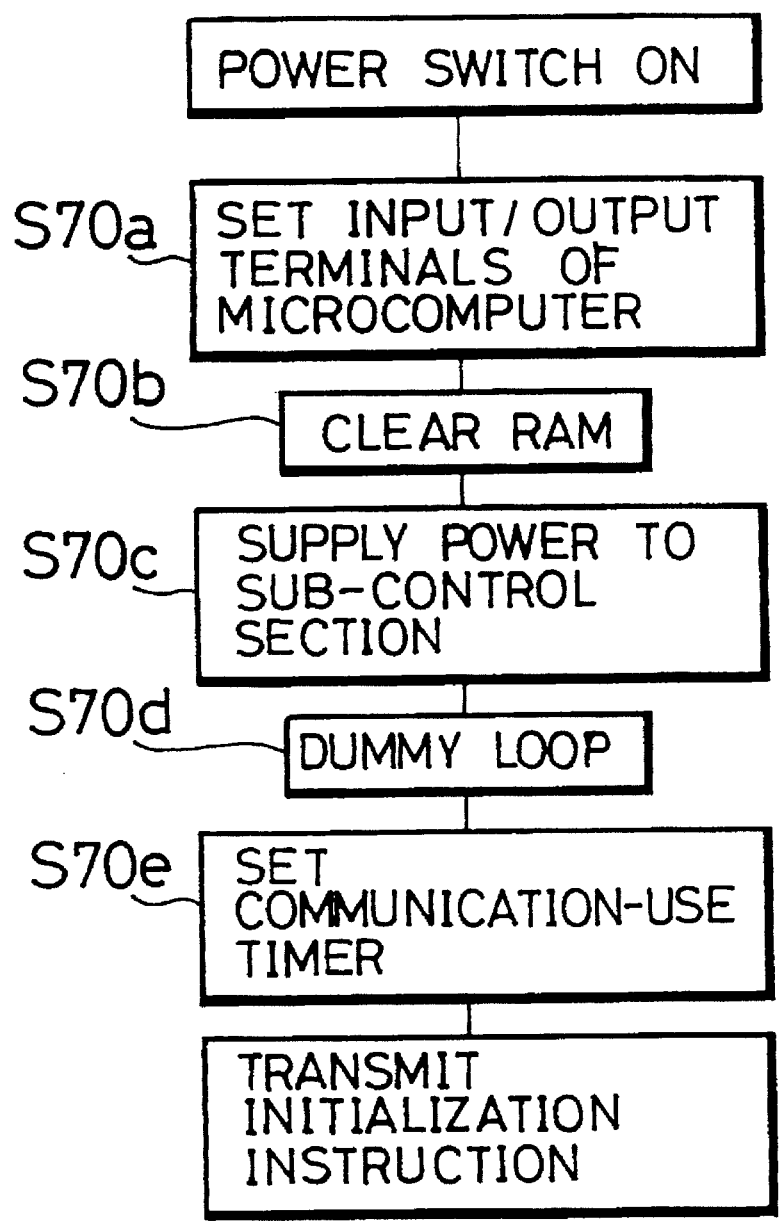

In the seventh embodiment, after the power switch of a refrigerating and cooling device is turned ON, the following processes are carried out before transmitting a message:

As shown in FIG. 27, the main control section 20 initializes its own microcomputer 22. More concretely, after output and input terminals are set (S 70a), and the RAM is cleared (S 70b). Then, the main control section 20 supplies power to each sub-control section 25 (S 70c). After the power is supplied to each sub-control section 25, the sub-control section 25 initializes its own microcomputer 27; on the other hand, the main control section 20 goes around the dummy loop until the sub-control 25 section completes the initialization of the microcomputer 27 (S 70d). Namely, the main control section 20 is set in the wait state unit a transmission of a message including an initialization instruction to the sub-control section 25 is permitted. Thereafter, the main control section 20 sets the communication-use timer (S 70e), and the communication processes shown in FIG. 23 are started.

Additionally, in the developing stage of the software of the microcomputer 22 of the main control section 20, the time required for initializing the microcomputer 27 of each sub-control section 25 is difficult to be predicted. Therefore, the main control section 20 is required to have sufficient time margin in order to ensure the initialization of the microcomputer 27 of each sub-control section 25 has been completed before starting a transmission. This cause the problem of wasting time after turning ON the Power of the refrigerating and cooling device until the main control section 20 starts a message transmission.

In order to counteract the above problem, the refrigerating and cooling device of the present embodiment is arranged such that the transmission from the main control section 20 is started directly after the initialization of the sub-control section 25 is completed as will be described later.

In the seventh embodiment, when each sub-control section 25 is required to carry out a process which has a priority over a communication process (busy state), if it is interrupted by the message transmitted from the main control section 20 (communication process), the process which has a priority over the communication process may not be delayed.

In order to counteract the adobe problem, the refrigerating and cooling device of the present embodiment is arranged such that when the sub-control section 25 is in a busy state, communicate through the communication-use cable 36 is prohibited in order to surely carry out the process which has a priority over the communication process.

The refrigerating and cooling device of the sixth embodiment is arranged such that while a polling signal is being transmitted from the main control section 20, if the number times detected that the response signal has not been received from the sub-control section 25 reaches a predetermined number (for example, four times), the main control section 20 determines that some problem, or a run-away has occurred, and resets all the sub-control sections 25.

In the above arrangement, for example, when the microcomputer 27 of the sub-control section 25 is reset in the middle of the process due to the noise being generated, etc., after initializing the microcomputer 27, the sub-control section 25 is set in a wait-state for receiving the message including the initialization instruction from the main control section 20. In this state, the sub-control section 25 does not transmit the response message except the message including the initialization instruction transmitted from the main control section 20, and therefore the number of times detected that the response message has not been received may reach the predetermined number. This means that although a run away has not been occurred in the corresponding sub-control section 25, the main control section main control section 20 may reset all the sub-control sections 25 including the sub-control means 25 which have been operated properly.

The response message is not transmitted from the sub-control section 25 not only when a run away has occurred in the sub-control section 25, but also when the microcomputer 27 is suddenly reset.

In order to counteract the above problem, the refrigerating and cooling device of the present embodiment is arranged such that when it is detected that the response message has not been received from the sub-control section 25, if the cause is not a run-away occurring in the sub-control section 25, the sub-control section 25 from which the response message has not been transmitted will be enabled to carry out proper operation without resetting all the sub-control sections 25.

Figure 28:
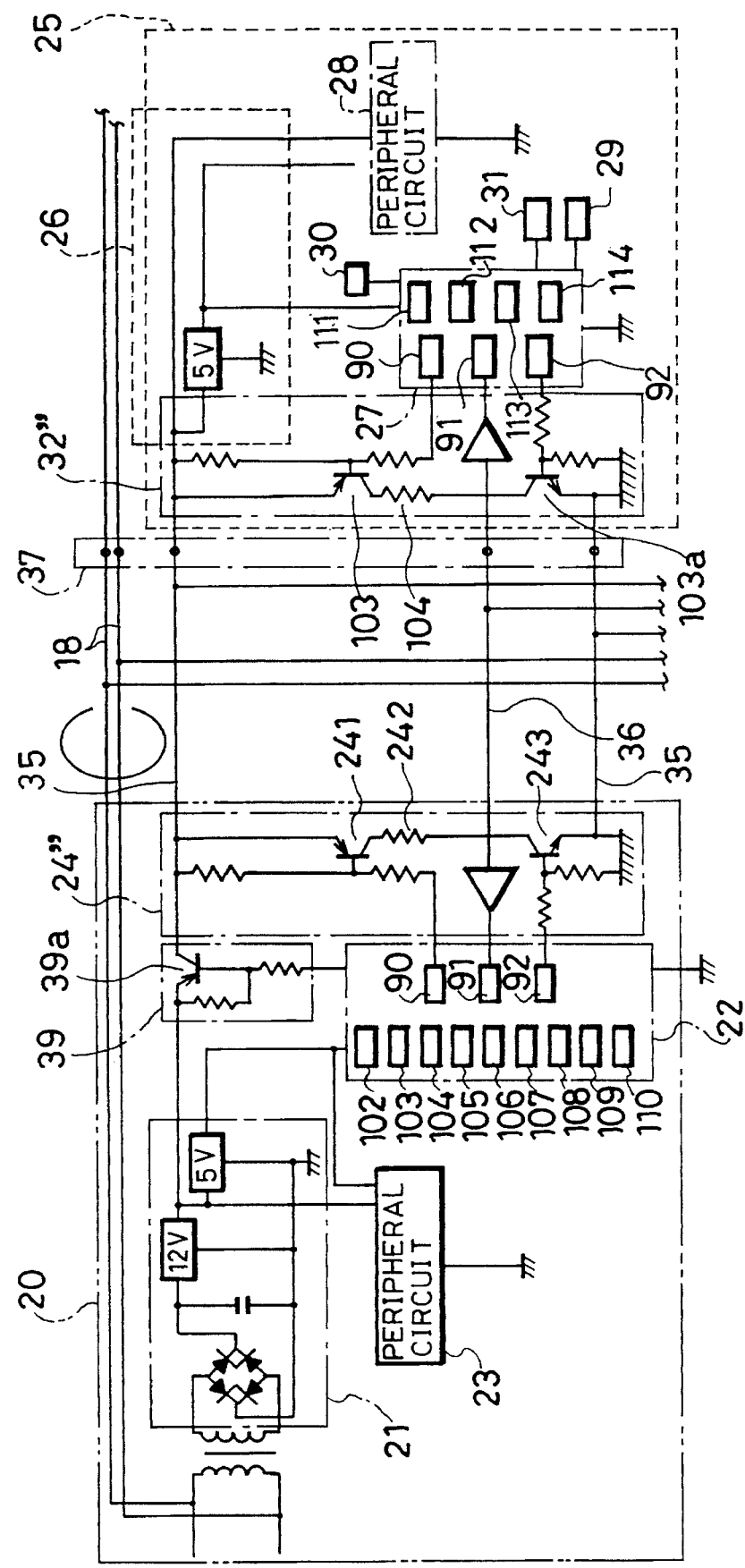
Figure 29:
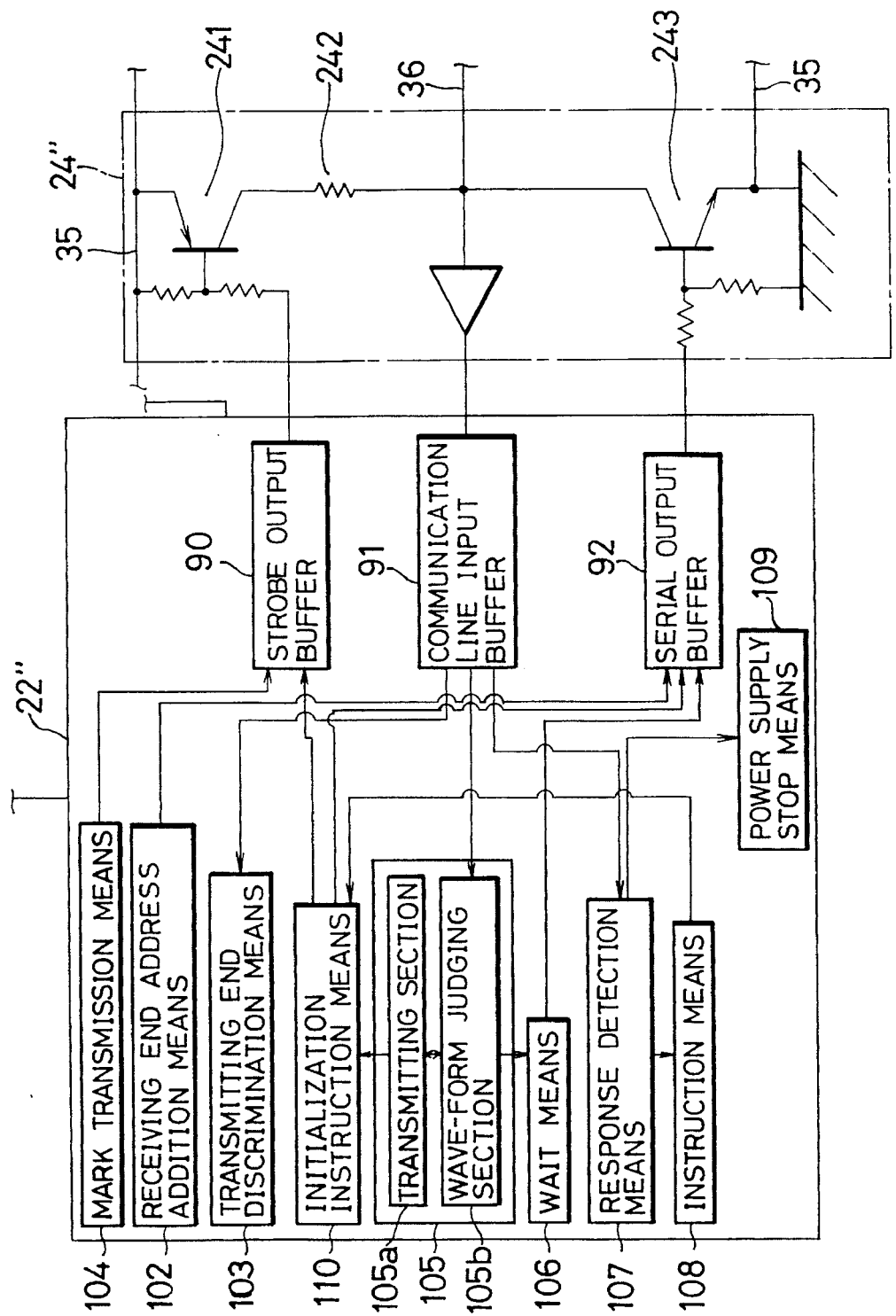
Figure 30:
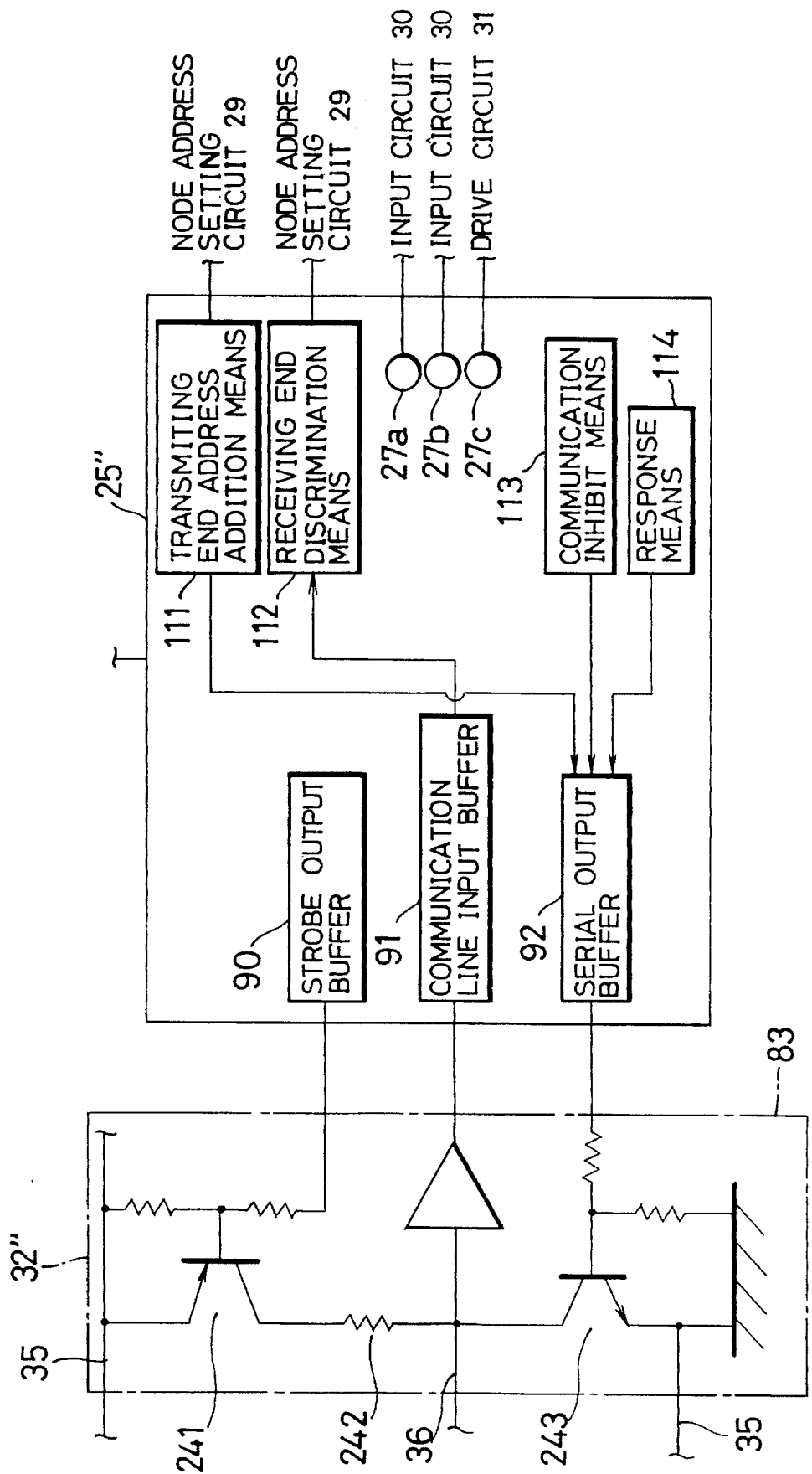

The refrigerating and cooling device of the present embodiment is provided with a microcomputer 22" and an I/F circuit 24" of the main control section 20 (see FIGS. 28 and 29), and a microcomputer 27" and an I/F circuit 32" of the sub-control section 25 (see FIGS. 28 and 30). Other than the above, the refrigerating and cooling device of the present embodiment has the same configuration as the seventh embodiment.

As shown in FIG. 7, the microcomputer 22" of the main control section 20 is mainly composed of CPU 301, ROM 302, and the RAM 303. This basic arrangement of the control section 20 is generally known. The ROM 302 stores various programs to be executed by the CPU 301. Further, the RAM 303 stores various data used when the CPU 301 executes the various programs stored in the ROM 302.

As shown in FIGS. 28 and 29, the microcomputer 22" of the main control section 20 includes: a strobe output buffer 90 (first transmission control means); a communication line input buffer 91 (first level detection means); a serial output buffer 92 (third transmission control means); receiving end address addition means 102 for adding a node address of the receiving end to the message when transmitting the message; transmitting end discrimination means 103 for discriminating the transmitting end based on the node address in the message received from each sub-control section 25; a mark transmission means 104 for transmitting the mark 82 indicating the message transmission to each sub-control section 25 has started; communication line detection means 105 for detecting whether or not the transmission through the communication cable 36 is permitted; wait means 106 for setting in the wait state for transmitting a message until the communication line detection means 105 detects the transmission through the communication-use cable 36 is permitted; initialization instruction means 110 for transmitting a message including an initialization instruction; response detection means 107 for detecting whether or not the response message has been received from the sub-control section 25; instruction means 108 for instructing the initialization instruction means 110 to transmit a message including an initialization instruction to the corresponding sub-control section 25 when the response detection means 107 detects successively a predetermined number of times that the response message has not been received from the sub-control section 25 (three times in the present embodiment); power supply stop means 109 (second initialization means) for stopping the power supply to all the sub-control sections 25 when the response detection means 107 detects successively a predetermined number of times that the response message has not been received from the sub-control section 25 (three times in the present embodiment) although the message including the initialization message has been transmitted to the corresponding sub-control section 25 many times based on the instruction from the instruction means 108; third collision detection means (not shown) for detecting the collision among the messages; and the third transmission wait means (not shown) for setting in the wait state for transmitting a message when a collision among the messages is detected.

Additionally, each of the above means is composed of the CPU 301 in the microcomputer 22", which executes the programs stored in the ROM 302 in the microcomputer 22" of the main control section 20.

The communication detection means 105 includes a transmitting section 105a (transmission means) for transmitting a detection signal to the communication-use cable 36, and a waveform judging section 105b (waveform judgment means) for determining whether or not a detection signal is sent to the communication-use cable 36 by reading the waveform of a signal being sent through the communication-use cable 36. For the detection signal, the mark 82 which has been transmitted by the mark transmission means 104 is used in the present embodiment. In the above arrangement, because the mark 82 which indicates that the message transmission has started also serves as a detection signal, an increase in the number of signals can be prevented. Moreover, after it is detected that the transmission through the communication-use cable 36 is permitted, the messages can be transmitted successively, an improvement in the communication efficiency can be achieved.

The response detection means 107 has a detecting function for detecting that the response message has not been received from the sub-control section 25 successively a predetermined number of times (three times in the present embodiment).

The power supply stop means 109 turns OFF the transistor 39a of the DC power supply controlling circuit 39 so as to stop the power supply to all the sub-control sections 25.

For the I/F circuit 24" of the main control section 20, those shown in FIGS. 28 and 29 may be used. The I/F circuit 24" includes a PNP transistor 241 (first switch means) which is turned ON/OFF according to the output level of the strobe output buffer 90 (first transmission control means) of the microcomputer 22"; a resistor 242 provided for the voltage level to be ensured, and a NPN transistor 243 (third switch means) which is turned ON/OFF according to the output level of the strobe output buffer 90 (first transmission control means) of the microcomputer 22". Only when the PNP transistor 241 is turned ON so as to set the output level of the strobe output buffer 90 is set high, the transmission of the serial signal (message) through the communication cable 36 is permitted. More concretely, with the ON state of the PNP transistor 241, when the communication-use cable 36 is set at high level, by adjusting the output level of the serial output buffer 92 between high and low, the NPN transistor 243 is turned ON/OFF. In response to this switching of the NPN transistor 243, output level of the communication-use cable 36 is set high/low, thereby transmitting a serial signal.

While the message is being transmitted, if the main control section 20 detects that the communication-use cable 36 is at low level although the PNP transistor 241 is set ON, and the NPN transistor 243 is set OFF, the main control section 20 determines that the collision among the messages, and thus, the main control section 20 is set in the wait state for transmitting the message.

As shown in FIG. 7, the microcomputer 27" of the sub-control section 25 is mainly composed of the CPU 301, the ROM 302, and the RAM 303. This basic arrangement of the microcomputer 27" is generally known. The CPU 301 stores various programs which CPU 302 executes. Further, the RAM 303 stores various data used when the CPU 301 executes the various programs stored in the ROM 302.

As shown in FIG. 28 and FIG. 30, the microcomputer 27" of each sub-control section 27" includes: a strobe output buffer 90 (second transmission control means); a communication line input buffer 91 (second level detection means); a serial output buffer 92 (fourth transmission control means); transmitting end address addition means 111 for adding its own node address as a transmitting end into the message; receiving end discrimination means 112 for discriminating the receiving end by the node address in the message when the message is received from the main control section 20; communication inhibit means for inhibiting communication through the communication-use cable 36 by turning ON the serial output buffer 92 when the sub-control section carries out the process which has a priority over the communication process (busy state); response means for transmitting a response message to the main control section 20 when a message is received from the main control section 20; the fourth collision detection means (not shown) for detecting a collision among the messages; and fourth transmission wait means (not shown) for setting in the wait state for transmitting a message when a collision among the messages is detected.

Additionally, each of the above means is composed of the CPU 301 in the microcomputer 27, which executes the programs stored in the ROM 302 in the microcomputer 27 of the sub-control section 25.

Here, the busy state of the sub-control section is defined as a state where an initialization of the microcomputer 27" is being carried out, or a state where it is coping with the output unit connected thereto with a problem detected by an excessive power detecting circuit provided therein.

The I/F circuit 32" of each sub-control Section 25 has the same arrangement as the I/F circuit 24" of the main control section 20, and thus the descriptions thereof shall be omitted here. When the strobe output buffer 90 (second transmission control means) in the microcomputer 27" of each sub-control section 25 is set at high level (ON state), the PNP transistor 241 (the second switch means) is turned ON. Only in this state, the transmission of the serial signal (message)

through the communication-use cable 36 is permitted. Further, by adjusting the output level of the serial output buffer 92 (fourth transmission control means) between high and low, the NPN transistor 243 (fourth switch means) is turned ON/OFF. In response to this switching of the NPN transistor 243, the output level of the communication cable 36 switches between high and low, thereby transmitting the serial signal.

While the message is being transmitted, if the sub-control section 25 detects that the communication-use cable 36 is at low level although the PNP transistor 241 is set ON, and the NPN transistor 243 is set OFF, the sub-control section 25 determines that a collision has occurred among the messages, and thus the sub-control section 25 is set in the wait state for transmitting the message.

The operations of the main control section 20 will be explained below.

Figure 32:
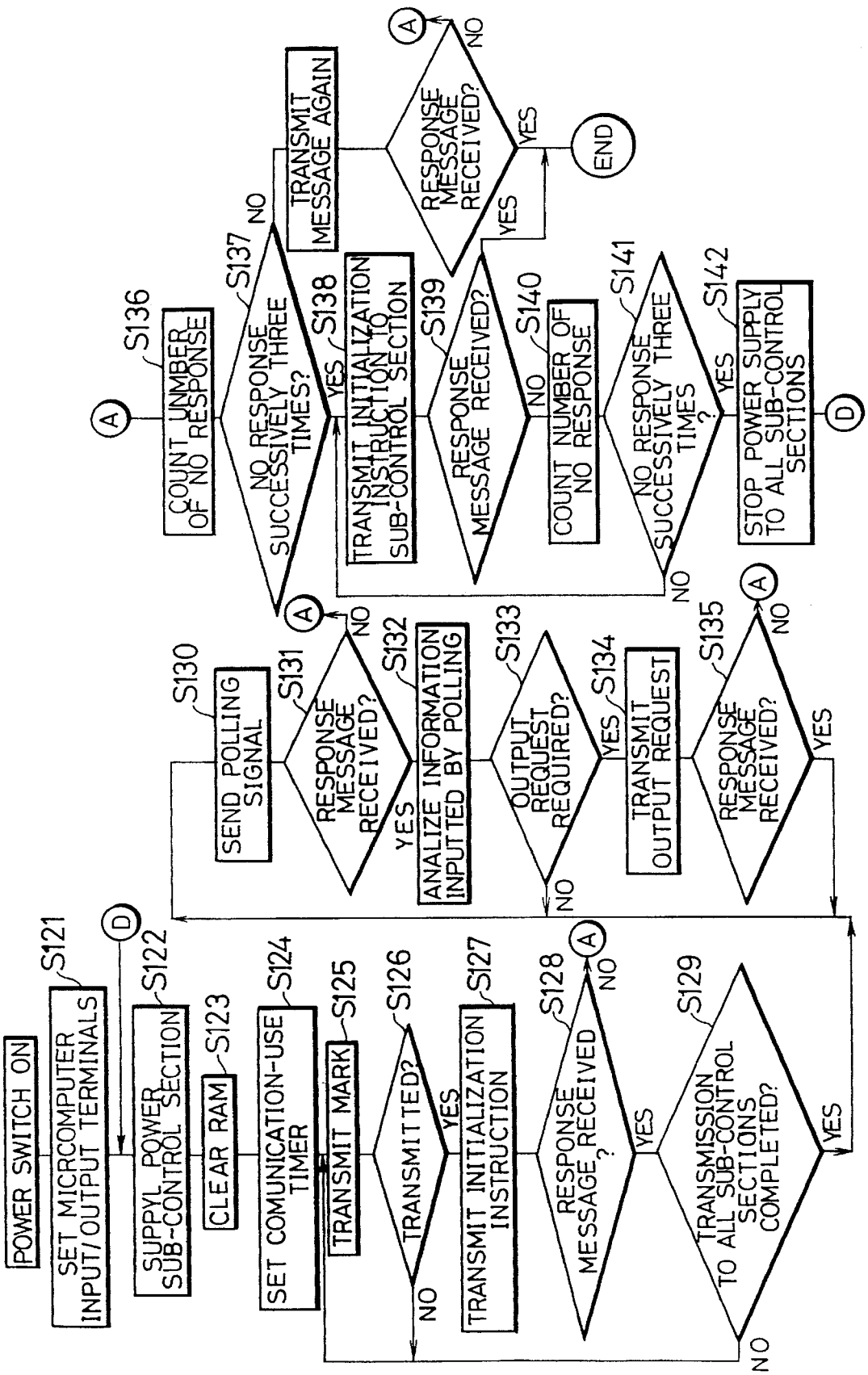

As shown in FIG. 32, after turning ON the power switch, the main control section 20 sets the input/output terminals of the microcomputer 22" (S 121). Thereafter, a DC power controlling circuit 39 is activated for supplying DC power to each sub-control section 25 (S 122). Then, the main control section 20 carries out processes for initializing the microcomputer 22", such as clearing the RAM (S 123), setting the communication-use timer (S 124), etc.

Next, the microcomputer 22" of the main control section 20 turns ON the strobe output buffer 90 so as to transmit the mark 82, which serves as a high level detection signal, to the communication-use cable 36 (S 125). Here, the transmitting section 105a of the communication line detection means 105 of the microcomputer 22" activates the mark transmission means 104, thereby transmitting the mark 82 which serves as a detection signal.

While the mark 82 which serves as a detection signal is being transmitted, the microcomputer 22" of the main control section 20 reads the waveform of the signal being transmitted through the communication-use cable 36 (S 126). This process is done by the waveform judging section 105b of the communication line detection means 105 in the microcomputer 22". The waveform judging section 105b determines whether or not the mark 82 which serves as a high level detection signal is being transmitted through the communication-use cable 36. Namely, the waveform judging section 105b determines whether or not the communication-use cable 36 is set at high level. The waveform judging section 105b determines that the transmission through the communication-use cable 36 is not permitted while the communication-use cable 36 is being set at low level, and when the output level of the communication-use cable 36 switches to high level, the waveform judging section 105b determines that the transmission through the communication-use cable 36 is permitted. Until the waveform judging section 105b detects that the output level of the communication-use cable 36 has switched to high level, the main control section 20 is set in the wait state for transmitting the message including an the initialization instruction to each sub-control section 25 by the wait means 106 of the microcomputer 22".

Figure 31:
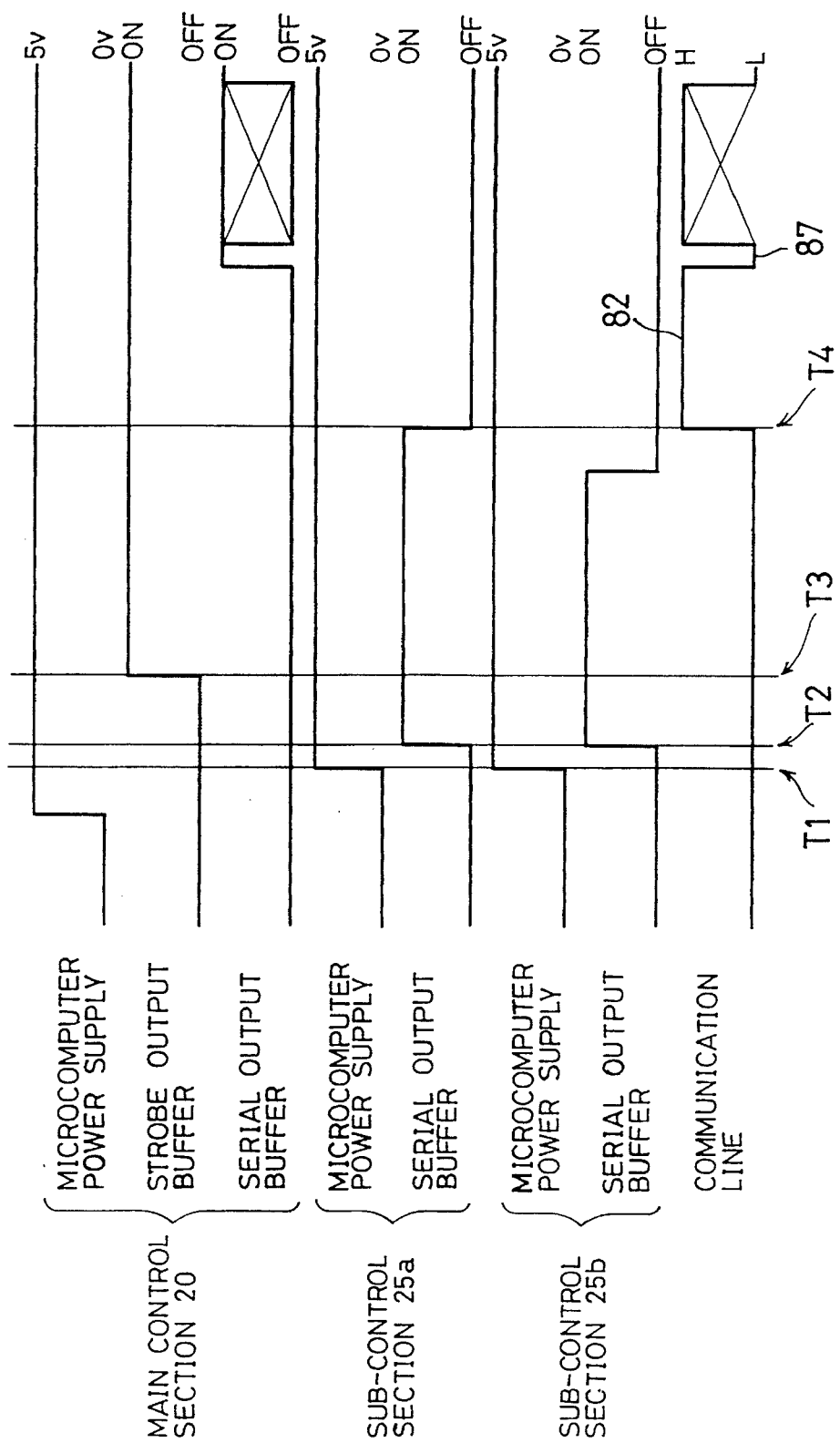

FIG. 31 is a timing chart which explains operations of the main control section 20 and each sub-control section 25 after tuning ON the power switch until the transmission of the message from the main control section 20 to the sub-control section 25 is started. The figure shows the state where the initializing operations of respective microcomputers 27" are being carried out by the sub-control section 25a and the sub-control section 25b (busy state).

After the power switch is turned ON for the microcomputer 22" of the main control section 20, the main control section 20 supplies DC power to the sub-control sections 25a and 25b at a timing indicated by T1 in the figure. Then, the sub-control sections 25a and 25b start the initializations of the respective microcomputers 27" at a timing indicated by T2 in the figure. When the initializations of the respective microcomputers 27" have started, the sub-control sections 25a and 25b are set in busy states. Then, the respective communication exhibit means 113 of the microcomputers 27" turn ON the respective serial output buffers 92.

In order to transmit the mark 82 which serves as a high level detection signal to the communication-use cable 36 at T3, the main control section 20 turns ON the strobe output buffer 90, in the meantime, reads the state of the communication-use cable 36. In this state, the respective serial output buffers 92 of the sub-control sections 25a and 25b are set ON. Therefore, although the main control section 20 turns ON the strobe output buffer 90, the state of the communication-use cable 36 is still at low level. As a result, the main control section 20 is set in the wait state for transmitting a message including an initialization instruction to each sub-control section 25 by the wait means 106 of the microcomputer 22".

After completing the initialization of the microcomputer 27", each sub-control section 25 turns OFF the serial output buffer 92. At T4, all the sub-control sections have completed the initializations of the respective microcomputer 27". Therefore, all the sub-control sections 25 turn OFF the respective serial output buffers 92. Then, the communication-use cable 36 is set at high level. In response to this, the communication line detection means 105 of the main control section 20 detects that the transmission through the communication-use cable 36 is permitted, and the wait state set by the wait means 106 is cancelled. Then, after the mark 82 is transmitted from the main control section 20 through the communication-use cable 36, the message including the initialization instruction is transmitted to each sub-control section 25.

As shown in FIG. 32, the main control section 20 transmits the message including the initialization instruction to each sub-control section 25 (S 127). Then, the A/D converter port 27a and the output port 27c are initialized by the respective sub-control sections 25. Then, the response message including the datum 86 indicating that the initialization has been completed is received from each sub-control section 25 (S 128), thereby confirming that the communications between the main control section 20 and each sub-control section 25 are permitted.

After the main control section 20 transmits the message including the initialization instruction to all the sub-control sections 25, and receives the response message from all the sub-control sections 25 (S 129), the main control section 20 transmits the input request and/or the A/D request to each sub-control section 25 by polling, and input information from input units connected to the respective sub-control sections 25 are collected (S 130), and analyzed (S 132). If the control of the output unit is required (S 133), the main control section 20 transmits the output request message including the command 84 for controlling the output unit to the corresponding sub-control section 25 (S 134). The transmission of the above message through the communication-use cable 36 is carried out by turning ON/OFF the serial output buffer 92 with the ON state of the strobe output buffer 90.

The communicating processes when polling from the main control section 20 are the same as those in the seventh embodiment (see FIG. 21(a) through FIG. 21(e)), thus the descriptions thereof shall be omitted here.

When the response message has not been transmitted from the sub-control section 25 after transmitting the message to the sub-control section 25 (If No in S 128, S 131, or S 135), the main control section 20 repeats the communication processes with the corresponding sub-control section 25. Here, the main control section 20 counts the number of times which the response message has not been received from the corresponding sub-control section 25 the counter (S 136). The counter increases the count value by 1 when the response message is not received from the sub-control section 25. On the other hand, it resets the count value "0" when the response message is received from the corresponding sub-control section 25. When the count value in the counter reaches 3, the response detection means in the microcomputer 22" detects successively three times that the response message has not been received from the corresponding sub-control section 25 (S 137).

In this case, the instruction means 108 of the microcomputer 22" of the main control section 20 instructs the initialization instruction means 110 to transmit the message including the initialization instruction to the sub-control section 25 from which the response message has not been transmitted, and then the message including the initialization instruction is transmitted to the corresponding sub-control section 25 (S 138). If the response message has not been transmitted from sub-control section 25 because the microcomputer 27" suddenly resets due to noise being generated, etc., the sub-control section 25 can restart the normal operation after receiving the message including the initialization instruction. In this case, the sub-control section 25 transmits a response message when it receives the above message. On the other hand, if the response message has not been transmitted from the sub-control section 25 because a run-away has occurred in the sub-control section 25, even after it receives the message including the initialization instruction, the sub-control section 25 cannot restarts the normal operation. In this case, the sub-control section 25 does not transmit the response message when it receives the above message.

In order to meet the all possible situations, when the response message has not been received from the corresponding sub-control section 25 after the message including the initialization instruction is transmitted from main control section 20 (If No in S 139), the main control section 20 counts the number of times detected that the response message has not been transmitted from the corresponding sub-control section 25 by the counter (S 140). In the meantime, the main control section 20 repeats the transmission of the message including the initialization message. The counter increases the count value by 1 when the response message is not received from the corresponding sub-control section 25. On the other hand, it resets the count value "0" when the response message is received from the corresponding sub-control section 25. When the count value in the counter reaches 3, the response detection means 107 in the microcomputer 22" detects successively three times that the response message has not been received from the corresponding sub-control section 25 (S 141). Then, the main control section 20 recognizes that a run-away has occurred in the sub-control section 25.

The power stop means 109 in the microcomputer 22" of the main control section 20 turns OFF the transistor 39a of the DC power controlling circuit 39 (shown in FIG. 28) so as to stop suppling DC power to all the sub-control sections 25 (S 142). Thereafter, the power stop means 109 turns ON the transistor 39a so as to reset all the sub-control sections 25 (S 121). Then, the message including the initialization instruction is transmitted to all the sub-control sections 25 as in the described above.

Figure 33:
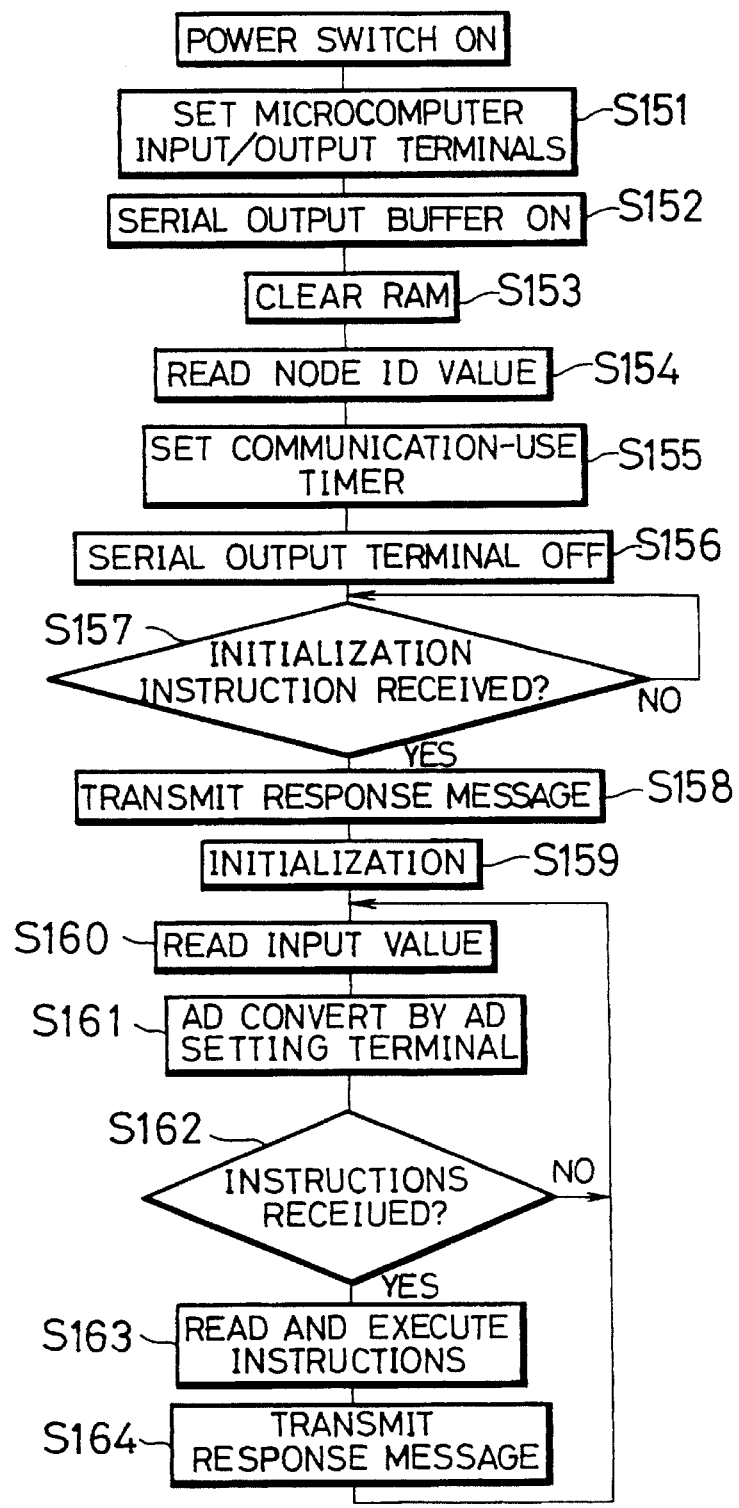

Next, the operations of each sub-control section 25 will be described with reference to the flow chart of FIG. 33.

After the power switch is turned ON by the DC power controlling circuit 39 in the main control section 20, first, each sub-control section 25 sets input/output terminals (S 151). Directly after that, the communication inhibit means 113 in the microcomputer 27" turns ON the serial output buffer 92 (S 152) so as to set the communication-use cable 36 at low level, thereby inhibiting the communication through the communication-use cable 36. In this state, each sub-control section 25 initializes its own microcomputer 27", such as RAM, etc., (S 153–S 155).

When initialization of the microcomputer 27" has been completed, each sub-control section 25 turns OFF the serial output buffer 92 (S 156) so as to the communication-use cable 36 opened (communication through the cable 36 is permitted). Then, the sub-control section 25 is set in the wait state for receiving the message including the initialization instruction from the main control section 20.

When the sub-control section 25 receives the message including the initialization instruction from the main control section 20 (S 157), the sub-control section 25 immediately transmits the response message to-the main control section 20 (S 158). Thereafter, the control of the input/output terminals set by the initialization instruction is carried out based on the instructions received from the main control section 20 (S 160–S 164).

The above explanation is given through the case where the sub-control section 25 is in the busy state for initializing the microcomputer 27". However, the busy state of the sub-control section 25 is not limited to the above case. For example, the sub-control section 25 may include an excessive current detecting circuit which serves as trouble detection means for detecting the trouble in the output unit connected to the sub-control section 25. In the above sub-control section 25, it is assumed that the trouble is detected by the excessive current detecting circuit, the sub-control section 25 is in the busy state for coping with the output unit in which trouble has occurred. In this case, soon after the trouble of the output unit connected to the sub-control section 25 is detected by the excessive current detecting circuit, the sub-control section 25 turns ON the serial output buffer 92 so as to exhibit the communication through the communication-use cable 36. While the serial output buffer 92 is set ON, the transmission of the message from the main control section 20 is not allowed. Therefore, the corresponding sub-control section 25 is enabled to promptly cope with the output unit in which trouble has occurred without being interrupted by the communication process.

In the arrangement of the present embodiment, supplying power to each sub-control section 25 is stopped when the power supply stop means 109 turns OFF the transistor 39a in the DC power supply controlling circuit 39. However, the present invention is not limited to the above arrangement. Alternatively, for example, the power supply stop means 109 transmits a clear signal to each sub-control section so as to stop supplying power to each sub-control section 25.

As described, the communication system in accordance with the present embodiment designed for a plurality of an electric device including a plurality of internal devices, is arranged so as to comprise:

at least one sub-control means for controlling operations of the internal devices, said sub-control means being placed in the vicinity of the corresponding internal device so as to be connected thereto;

main control means for controlling the electric device by controlling said sub-control means; and single communication line for connecting said main control means and said sub-control means so as to permit communications between them, and wherein said main control means includes:

first transmission means for transmitting a message to said sub-control means through said communication line;

first receiving means for receiving a message from said sub-control means through said communication line, communication line state detection means for detecting whether or not transmissions through said communication line is permitted; and wait means for setting said main control means in the wait state for starting the transmission until said communication line state detection means detects that the transmissions through said communication line are permitted, and said sub-control means includes:

second transmission means for transmitting a message to said main control means through said communication line;

second receiving means for receiving a message from said main control means through the communication line; and communication inhibit means for setting said communication line in a communication inhibit state while said sub-control means is carrying out an operation which is given a priority over communication processes.

In the above arrangement, while the processes given priority over the communication processes are being carried out by the sub-control means, the communication line is set in a communication inhibit state by the communication inhibit means. Here, the main control means is set in the wait state for transmitting a message. Therefore, the sub-control means can surely carry out the process given priority over the communication process first. Moreover, because the main control means detects whether or not the communication through the communication line is permitted using the communication line detection means, soon after the communication inhibit state of the communication line set by the communication inhibit means in the sub-control means is cancelled, the communication from the main control means to the sub-control means can restart.

The processes given priority over the communication processes includes the process for initializing the microcomputer. Here, because the respective microcomputers of the sub-control means may be designed in different ways, the time required for initializing the microcomputers may be different from one another. However, in the above arrangement, the communication system can be designed without considering the time required for initializing each microcomputer, and soon after completing the initialization of the microcomputer of each sub-control means, the communications between the main control means and each sub-control means can start.

The communication system in accordance with the present embodiment having the above arrangement may be arranged such that said communication line state detection means includes:

transmission means for sending a detection signal through said communication line; and waveform judge means for detecting a waveform of the signal transmitted through said communication line while the detection signal is being sent by said transmission means, and judges whether the waveform of said communication line corresponds to said detection signal, and said communication line state detection means detects that said communication line is in the state where communications therethrough are not permitted when said waveform judge means judges that the waveform thereof does not correspond to the detection signal, whereas, it detects that said communication line is in the state where communications therethrough are permitted when said waveform judge means judges that the waveform thereof corresponds to the detection signal, and the detection signal sent from the transmission means is a mark indicating that a message transmission has started.

Here, the mark which indicates that the message transmission has started also serves as a detection signal to be transmitted from the transmission means, an increase in the number of signals can be prevented. Moreover, when the state of the communication line has changed to the communication permitted state, it is possible to start the transmission of the mark at the same time, thereby achieving an improvement in the communication efficiency.

The communication system of the present embodiment having the above arrangement may be arranged such that:

the second transmission means of the sub-control means includes second response means for transmitting a response message to the main control means when a message is received therefrom, and said main control means includes:

initialization instruction means for transmitting a message including an initialization instruction to each sub-control means;

response detection means for detecting whether or not the response message has been received from said sub-control means after transmitting a message to said sub-control means; and instruction means for instructing said initialization means to transmit a message including an initialization instruction to said sub-control means when said response detection means detects successively more that a predetermined times that a response message has not been received from said sub-control means.

In the above arrangement, if the response message has not been transmitted from the sub-control means not because a run-way has occurred in the sub-control means but because it is suddenly reset due to noise being generated, etc., the sub-control means can promptly restart the normal operation.

Furthermore, the communication system of the present embodiment having the above arrangement may be arranged so such that the main control means includes:

second initialization means for initializing all of said sub-control means when said response detection means detects that the response message has not been received from the corresponding sub-control means although the message including the initialization instruction has been transmitted to said sub-control means a predetermined number of times based on an instruction from said instruction means.

More concretely, when the response detection means detects successively predetermined number of times that the response message has not been received from the corresponding sub-control means after the message including the initialization instruction has been transmitted from the main control means a predetermined number of times, the main control means determines that the response message has not been received from the corresponding sub-control means because run-away has occurred in the corresponding sub-control section. In this case, the main control means initializes all the sub-control means by the second initialization means. In the above arrangement, when the response message has not been received from the corresponding sub-control means, first, the message including the initialization instruction is transmitted to the corresponding sub-control means so as to enable the sub-control means to restart the normal operation. Only when the sub-control means cannot restart the normal operation even after transmitting the above message, the main control means initialize all the sub-control means. Because the process for enabling to the sub-control means to restart the normal operation is composed of the above two stages, only when the response message has not been transmitted from the corresponding sub-control means because of a ran-way occurred in the sub-control means, the main control means initializes all the sub-control means. Thus, when the response message has not been received from the sub-control means only because it is suddenly reset, the initializations of all the sub-control means are not carried out, thereby eliminating the possibility of wasting time.

[EMBODIMENT 9]

Figure 34:
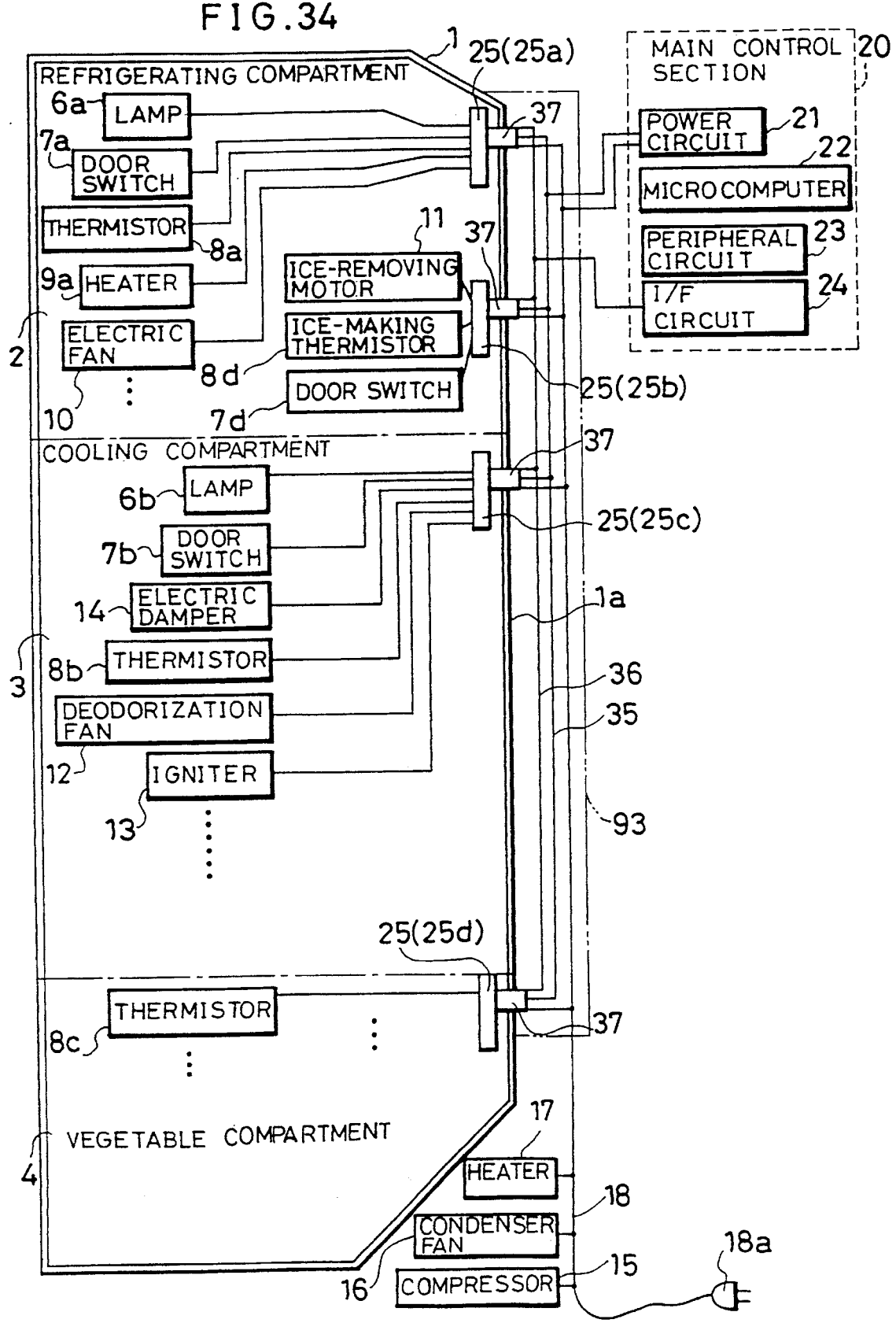
Figure 35:
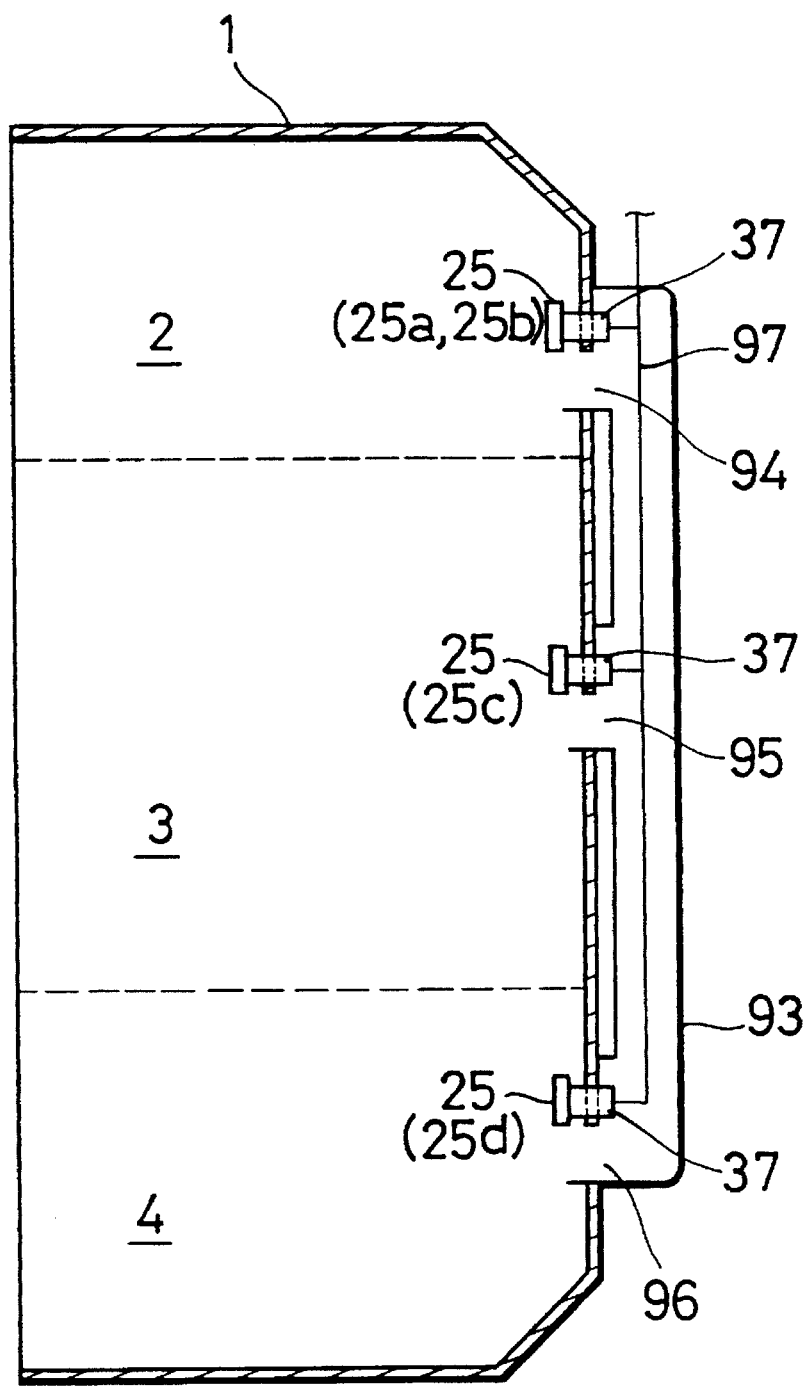
Figure 36:
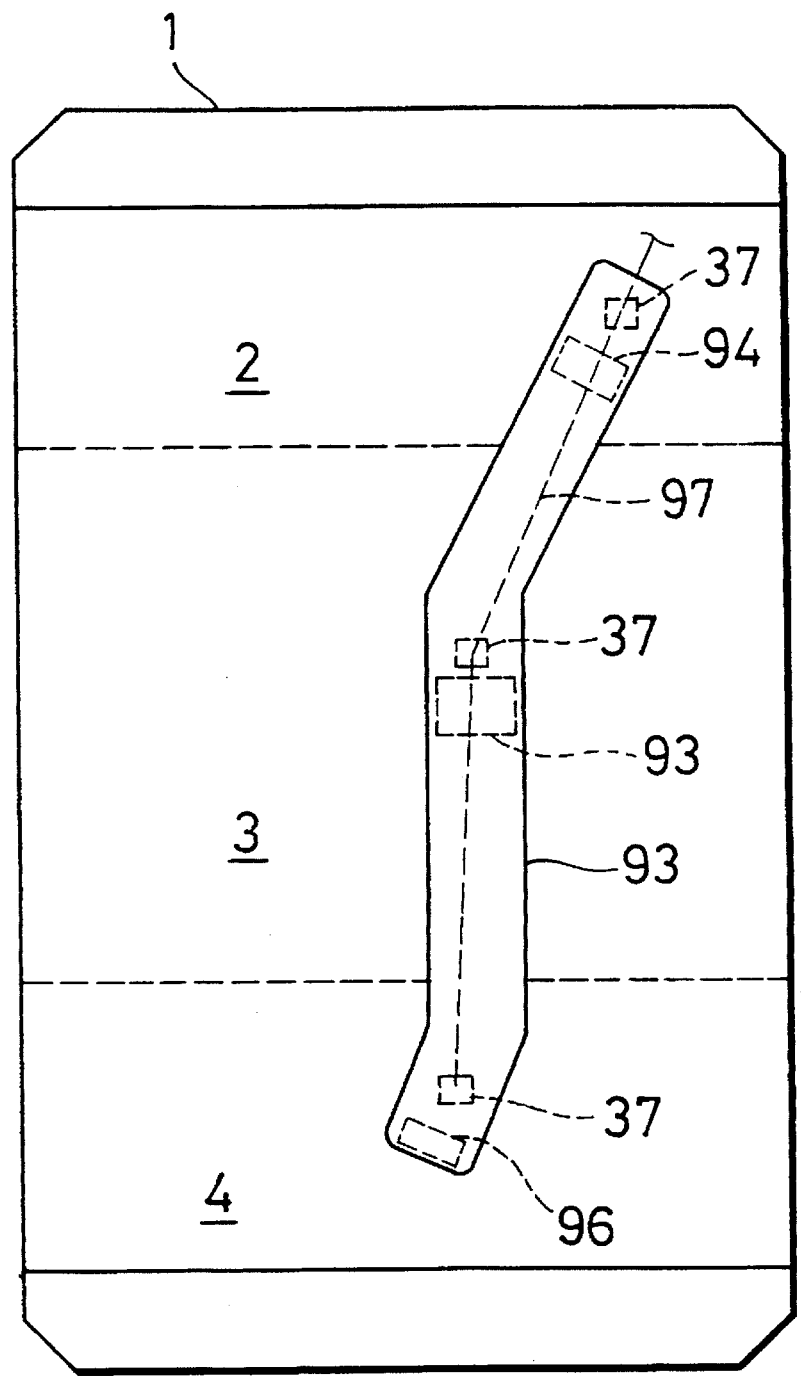

The following description will discuss the ninth embodiment of the present invention with reference to FIG. 34 through FIG. 36.

For convenience, members having the same functions and configurations as in the figures used in the aforementioned embodiments will be designated by the same code and their descriptions will be omitted.

As shown in FIGS. 34 through 36, on the back surface of the casing 1 of the refrigerating and cooling device, a cold air duct 93 (cold air guide member) for guiding cold air to entrances 94, 95 and 96 respectively is formed so as to communicate through the refrigerating compartment 2, the cold compartment 3, and the vegetable compartment 4. In considering the convenience in repairing and checking in the manufacturing process, the cold air duct 93 is removably secured to the casing 1 by, for example, with a screw or screws. Alternatively, a claw-shaped device that mates with cold air duct can be used for removably securing the cold air duct.

Wiring materials 97 shown in FIGS. 35 and 36 include the AC power feeder 18 (wiring member), the DC power feeder 35 (wiring member), and the communication-use cable 36 (communication line). In the present embodiment, the wiring materials 97 are inserted into the cold air duct 93 provided on the back surface of the casing 1 as shown in FIGS. 35 and 36.

Other than the above, the refrigerating and cooling device of the present embodiment has the same arrangements as the eighth embodiment, and the same communication control is carried out as the eighth embodiment.

As described, because the wiring materials 97 are inserted into the cold air duct 93, they can be protected from the external forces by the cold air duct 93, for example, when the back surface of the refrigerating and cooling device is hit by an object, in the process of manufacturing the device or when the device is being used. Therefore, the possibility of the wiring materials 97 being disconnected can be reduced. Moreover, in the above arrangement, because the members for securing the wiring materials 97, such as tape, etc., which are required in conventional models, are not required, the number of components can be reduced.

Normally, the wiring materials 97 and the cold air duct 93 are covered by heat insulating materials, and also covered by a back plate (not shown). However, in the arrangement of the present embodiment, because the wiring materials 97 are covered by the cold air duct 93, even if the cold air duct 93 is exposed to the back surface of the refrigerating and cooling device, the appearance of the device can be kept in presentable condition. Therefore, if material which is excellent in restricting the affects of humidity is used for the cold air duct 93, the back plate is not required.

After the refrigerating and cooling device is manufactured, the device is checked. Depending on the results of the check, a further check, for example, if any disconnections occur, or repair may be required. In this case, because the back surface of the refrigerating and cooling device is closed when the manufacturing process for the device has been completed, whenever checking or repairing the wiring materials 97, such as disconnections, etc., the wiring materials 97 must be exposed to the back surface of the casing 1. Further, the female connector 37 is taken out of each sub-control section 25, and the wiring materials 97 are taken out of the casing 1. After checking or repairing the wiring materials 97, the female connector 37 connected to the wiring materials 97 or to the new wiring materials 97 is connected to each sub-control section 25. Then, the cold air duct 93 is secured to the back surface of the casing 1 so that the wiring materials 97 are not projected therefrom.

In the arrangement, if a large number of wiring materials 97 are used, a long time is required for checking and also for routing them so as to connect the connectors to each sub-control section. However, in the arrangement of the present embodiment, because the communications within the device are to be carried out through the single communication-use cable 36, the wiring materials 97 are composed of only the pair of AC power feeders 18, the pair of DC power feeders 35, and the single communication-use cable 36. Therefore, the respective processes for checking and routing the wiring materials 97 can be easily carried out, and the burden of workers can be reduced.

As described, the communication system of the present embodiment designed for a refrigerator including a plurality of internal devices comprises:

at least one sub-control means for controlling operations of the internal devices, the sub-control means being placed in the vicinity of the corresponding internal device so as to be connected thereto;

main control means for controlling the electric device by controlling the sub-control means;

single communication line for connecting the main control means and the sub-control means so as to permit communications between them; and wiring member for supplying power, the wiring members connecting the main control means and the sub-control means, and wherein the main control means includes:
first transmission means for transmitting a message to the sub-control means through the communication line;
first receiving means for receiving a message from the sub-control means through the communication line, and the sub-control means includes:
second transmission means for transmitting a message to the main control means through the communication line; and
second receiving means for receiving a message from the main control means through the communication line, and wherein the refrigerator includes a pipe-shaped cold air guide member for guiding cold air into compartments, the cold air guide member being provided on the back surface of the refrigerator, and the communication line and the wiring members are inserted within the space of the cold air guide member.

In the above arrangement, the required number of wires can be reduced as in the case of the first embodiment. Moreover, because the communication line and wiring members are inserted within the space-of the cold air guide member, they can be protected by the cold air guide member. Therefore, in the manufacturing process or when being used, even if the back surface of the refrigerator is hit by external forces, the communication line and the wiring members can be prevented from being disconnected. Moreover, because the communication line and the wiring members are inserted into the space in the cold air guide member, components for securing the wires such as tape, etc., are not required, thereby reducing the required number of components. Moreover, because the communication line and the wiring members are not exposed, the appearance of the back surface of the refrigerator can be kept in presentable condition without providing a back plate on the back surface of the refrigerator.

[EMBODIMENT 10]

Figure 37:
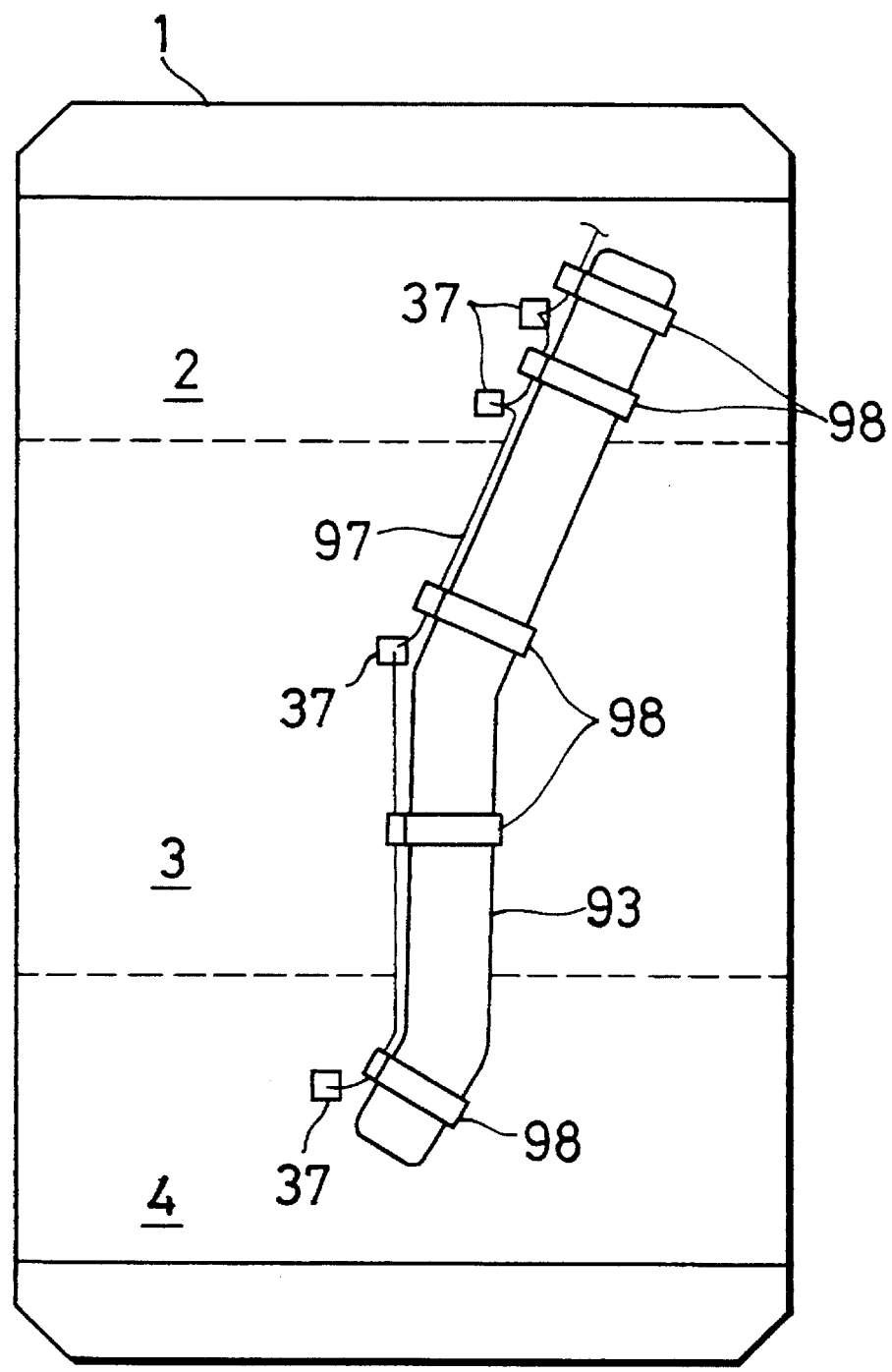
Figure 38:
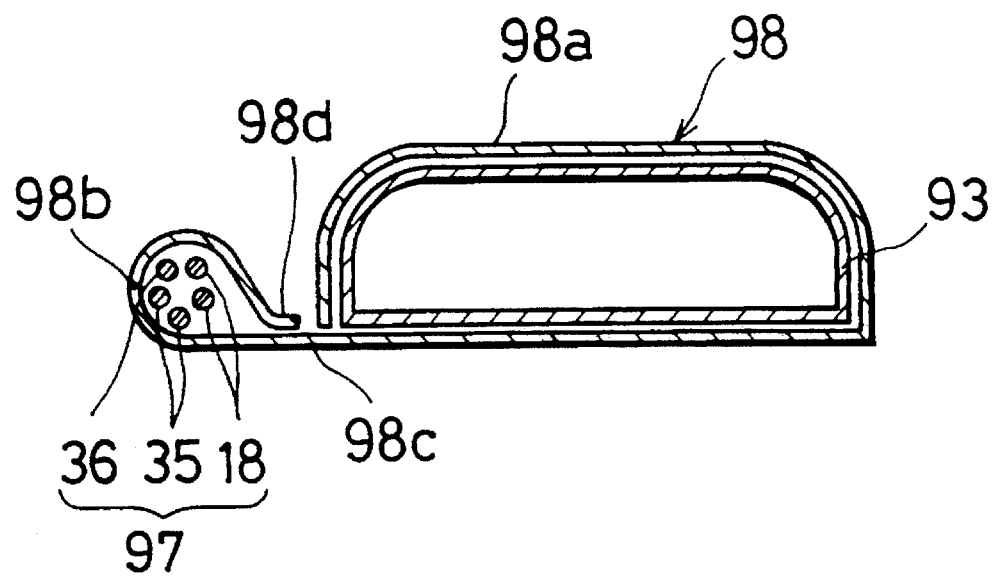

The following description will discuss the tenth embodiment of the present invention with reference to FIGS. 37 and 38.

For convenience, members having the same functions and configurations as in the figures used in the aforementioned embodiments will be designated by the same code and their descriptions will be omitted.

As shown in FIG. 37, the refrigerating and cooling device of the present embodiment is provided with five guides 98 (guide members) on the cold air duct 93, for guiding the wiring materials 97 (communication line and wiring member) along the cold air duct 93 (cold air guide member). The guides 98 are provided on the cold air duct 93 with an intervals between the adjacent guides 98 in the lengthwise direction of the cold air duct 93.

As shown in FIG. 38, the guide 98 is formed by bending a piece of metal, and is composed of a cold air duct securing member 98a (securing means) which surrounds the peripheral surface of the cold air duct 93, for securing the guide 98 to the cold air duct 93 so as to be detachable, a wiring material securing member 98b for securing the wiring materials 97 by bundling the five wires on the side of the cold air duct securing member 98a, and a connecting member 98c for connecting the duct securing member 98a and the wiring material securing member 98b.

The duct securing member 98a is formed such that the diameter thereof is slightly larger than that of the cold air duct 93 so as to fit the shape of the cold air duct 93. Therefore, the duct securing member 98a is capable of sliding along the cold air duct 93, and the guides 98 are detachable to the cold air duct 93.

The wiring material securing member 98b has substantially a circular cross-section. Further, the wiring material securing member 98b is arranged such that the end thereof is placed in the vicinity of the connecting member 98c in order to prevent the wiring materials 97 from being released.

Additionally, the wiring materials 97 are provided so as to be detachable from the female connector 37 so that the wiring materials 97 can be taken out of the wiring material securing member 98b from above or below the wiring material securing member 98b. Moreover, even if the wiring materials 97 is not detachable from the female connector 37, if the elastic material is used for the end portion 98d of the wiring material securing member 98b, the wiring materials 97 can be taken out from between the end portion 98d and the connecting member 98c.

Other than the above, the refrigerating and cooling device of the present embodiment has the same arrangements as the eighth embodiment, and the same communication control is carried out as the eighth embodiment.

The above five guide members 98 are provided with an interval between the adjacent guide members 98. Therefore, in the portions between the adjacent guide members 98, the wiring materials 97 are exposed. However, because the wiring materials 97 are provided along the cold air duct 93, the wiring materials 97 at the portions hide under the cold air duct 93. Therefore, even if the back surface of the refrigerating and cooling device is hit by some external forces, the wiring materials 97 can be protected by the cold air duct 93, thereby reducing the possibility of the wiring materials 97 being disconnected.

When installing the guides 98 along the cold air duct 93, the duct securing member 98a of the guide 98 is inserted either from the upper or lower end of the cold air duct 93, and placed in a predetermined position shown in FIG. 37. Here, considering the convenience in positioning the duct securing member 98a, in the position of the cold air duct 93 where the duct securing member 98a to be provided, a shallow positioning groove (portion for positioning the guide member) is preferably formed.

In the present embodiment, the wiring materials 97 are protected by the cold air duct 93 as in the case of the ninth embodiment. However, because the wiring materials 97 are not inserted into the cold air duct 93, air flow in the cold air duct 93 are not disturbed by the wiring materials 97.

Moreover, the process for securing the wiring materials 97 using the guide 98 is improved in terms of its operation efficiency and reliability in stretching compared with the conventional process wherein bond tape is used.

As described, the communication system of the present embodiment designed for a refrigerator including a plurality of internal devices comprises:

at least one sub-control means for controlling operations of the internal devices, the sub-control means being placed in the vicinity of the corresponding internal device so as to be connected thereto;

main control means for controlling the electric device by controlling the sub-control means;

single communication line for connecting the main control means and the sub-control means so as to permit communications between them; and wiring member for supplying power, the wiring members connecting the main control means and the sub-control means, and wherein the main control means includes:
 first transmission means for transmitting a message to the sub-control means through the communication line;
 first receiving means for receiving a message from the sub-control means through the communication line, and the sub-control means includes:
 second transmission means for transmitting a message to the main control means through the communication line; and
 second receiving means for receiving a message from the main control means through the communication line, and wherein the refrigerator includes:
 a pipe-shaped cold air guide member for guiding cold air into compartments, the cold air guide member being provided on the back surface of the refrigerator; and guide member for guiding the communication line and the wiring members along the cold air guide member, the guide member being provided along the cold air guide member.

In the above arrangement, the required number of the wires can be reduced as in the case of the first embodiment. Moreover, because the communication line and wiring members are provided along the cold air guide member, the communication line and the wiring members can be protected by the cold air guide member. Therefore, in the manufacturing process or when being used, even if the back surface of the refrigerator is hit by external forces, the communication line and the wiring members can be prevented from being disconnected.

The communication system of the present embodiment having the above arrangement may be arranged such that the guide member includes fixing means which removably secures the guide member to the cold air guide member.

According to the above arrangement, in order to check or repair the refrigerator, the communication line and the wiring member can be taken out of the cold air guide member together with the guide means. Therefore, the communication line and the guide member are bundled by the guide member until being wired again. This permits easy processes for repairing and checking the refrigerator.

[EMBODIMENT 11]

Figure 39:
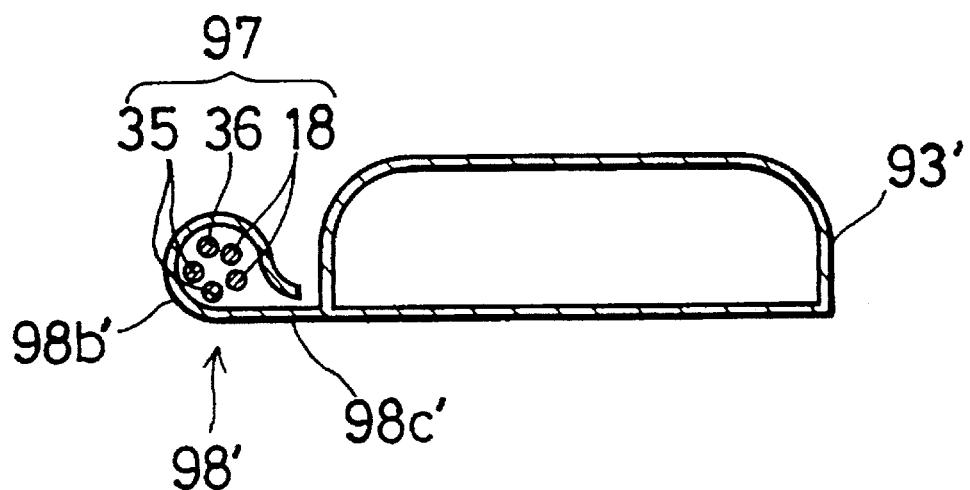

The following description will discuss the eleventh embodiment of the present invention with reference to FIG. 39.

For convenience, members having the same functions and configurations as in the figures used in the aforementioned embodiments will be designated by the same code and their descriptions will be omitted.

In the present embodiment, a duct 93' (cold air guide member) is a resin molding, and is integrally provided with a plurality of guides 98' (guide member) for guiding the wiring materials 97 (communication line, and wiring member) along the duct 93'. When molding the duct 93', the guide 98' is formed by a mold so as to be integrally secured.

The plurality of guides 98' are respectively formed on the duct 93' with intervals. Here, the positions where the guides 98' are formed are substantially the same as the positions where the guides 98 are formed on the duct 93 (see FIG. 37) of the tenth embodiment.

The guide 98' is composed of securing member 98b' for securing the wiring materials 97 by bundling five wires on the side of the duct 93', and the connecting member 98c' for connecting the routing member securing section 98b' and the duct 93'.

Other than the above, the refrigerating and cooling device of the present embodiment has the same configurations as that of the eighth embodiment, and the communication controls are carried out in the same manner as those described in the eighth embodiment.

In the present embodiment, by adopting the duct 93 and the guide 98 of the ninth embodiment as one integral part, the process for securing the guide 98 required in the tenth embodiment can be omitted. Moreover, because the duct securing member 98a adopted in the tenth embodiment is not required, the reduction in the cost of the components can be achieved.

As described, the communication system of the present embodiment designed for a refrigerator including a plurality of internal devices comprises:

at least one sub-control means for controlling operations of the internal devices, the sub-control means being placed in the vicinity of the corresponding internal device so as to be connected thereto;

main control means for controlling the electric device by controlling the sub-control means;

single communication line for connecting the main control means and the sub-control means so as to permit communications between them; and wiring member for supplying power, the wiring members connecting the main control means and the sub-control means, and wherein the main control means includes:
first transmission means for transmitting a message to the sub-control means through the communication line;
first receiving means for receiving a message from the sub-control means through the communication line, and the sub-control means includes:
second transmission means for transmitting a message to the main control means through the communication line; and
second receiving means for receiving a message from the main control means through the communication line, and wherein the refrigerator includes:
a pipe-shaped cold air guide member for guiding cold air into compartments, the cold air guide member being provided on the back surface of the refrigerator; and
guide member for guiding the communication line and the wiring members along the cold air guide member, the guide member being provided along the cold air guide member, and
the cold air guide member and the guide member are integrally provided.

In the above arrangement, the following effect can be achieved in addition to the effects of the tenth embodiment. That is, the process for installing the guide member can be omitted, thereby achieving simplified processes for assembling the refrigerator.

[EMBODIMENT 12]

Figure 40:
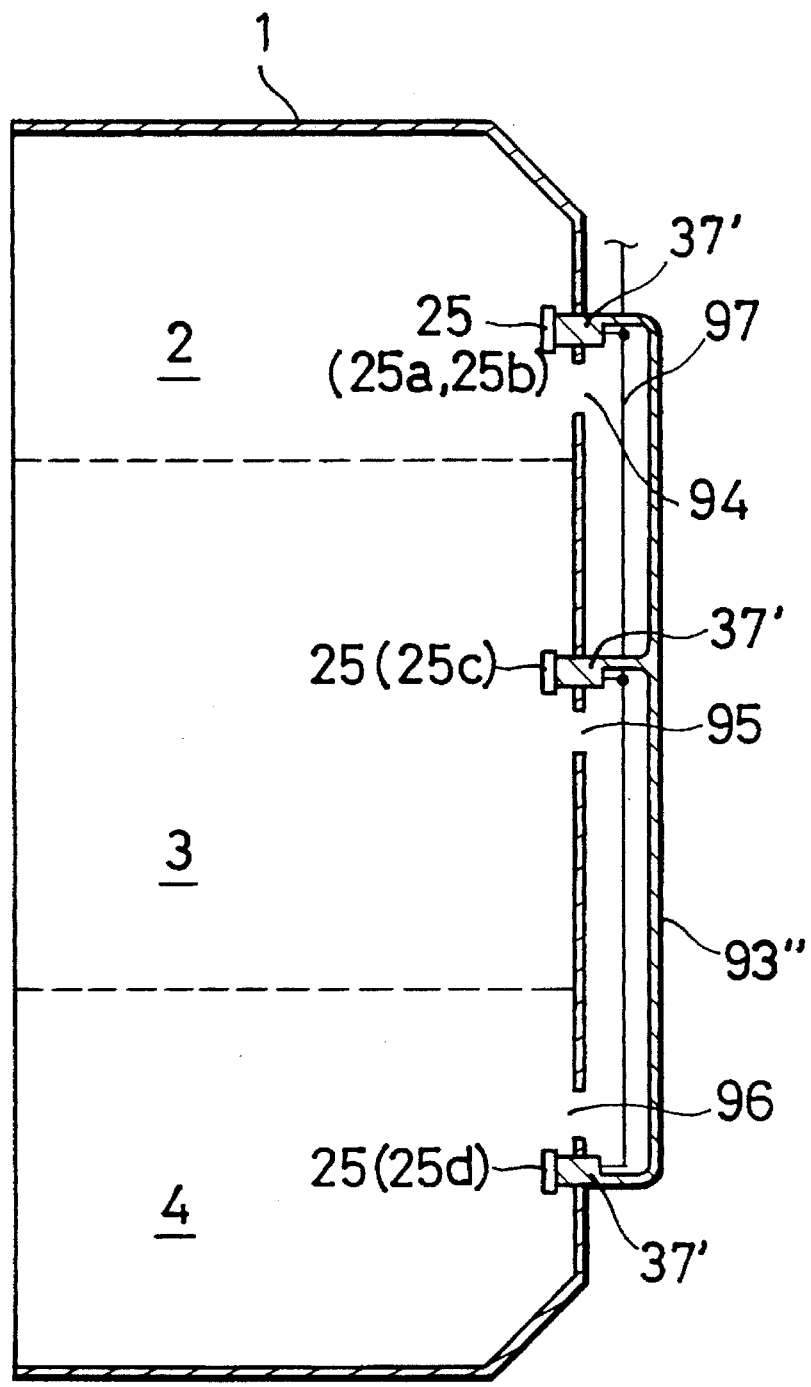
Figure 41:
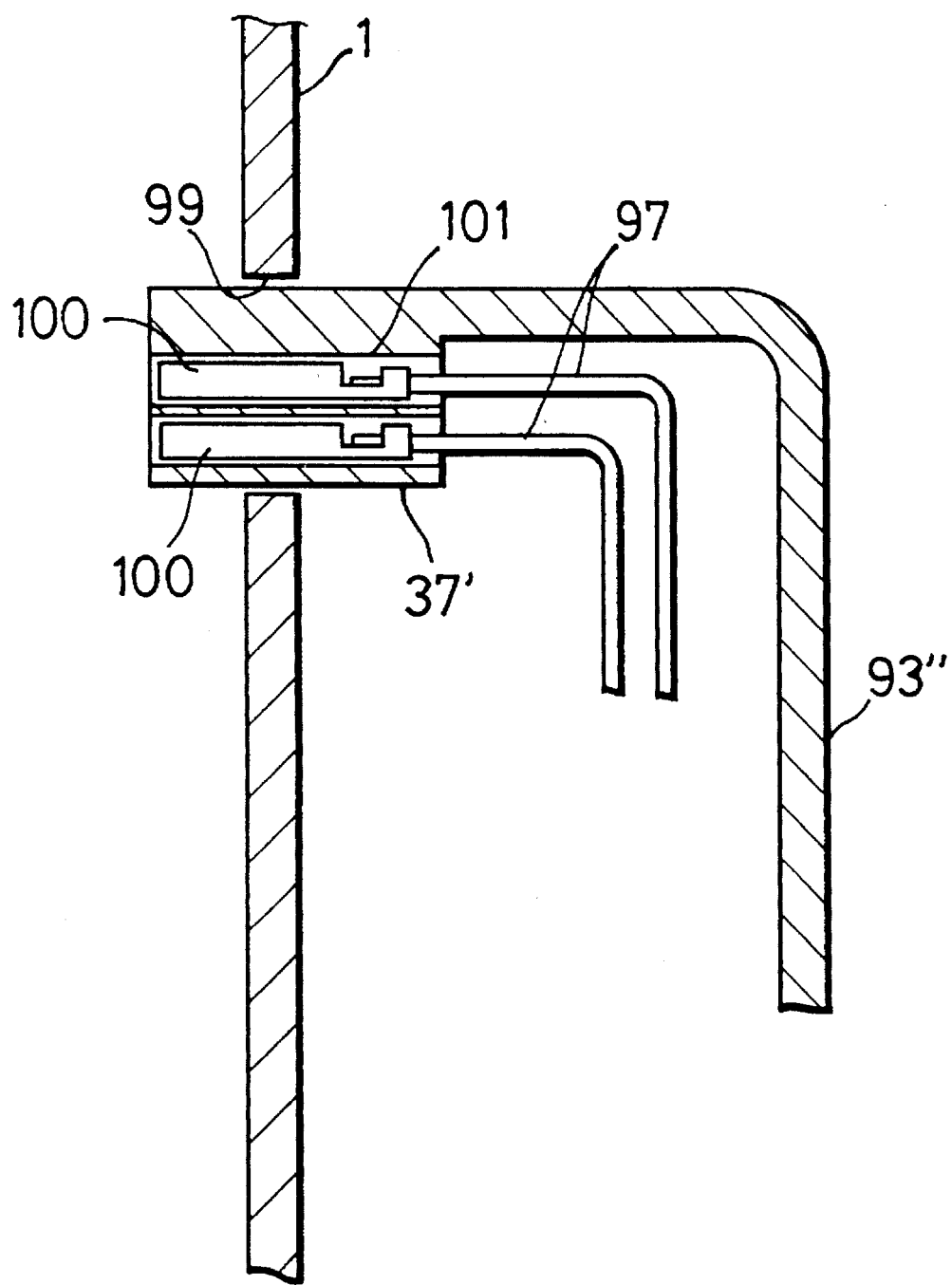

The following description will discuss the twelfth embodiment of the present invention with reference to FIGS. 40 and 41.

For convenience, members having the same functions and configurations as in the figures used in the aforementioned embodiments will be designated by the same code and their descriptions will be omitted.

In the ninth embodiment, the female connector 37 for connecting wiring materials 97 (communication line, and wiring member) to each sub-control section 25 is independent from the duct 93 as shown in FIG. 35. On the other hand, in the arrangement of the present embodiment, the female connector 37' (connection means) is integrally secured to the duct 93" (cold air guide member). As in the case of the ninth embodiment, the wiring materials 97" are inserted into the duct 93" provided on the back surface of the casing 1.

As shown in FIG. 41, an opening 99 is formed on the casing 1 at the position corresponding to each sub-control section 25 so that the female connecter 37' can be fit thereinto.

The duct 93" adopted in the present embodiment is a resin molding, and when forming the duct 93", the female connector 37' is formed using the same resin material by molding at the position of the duct 93", corresponding to the opening 99. The female connector 37' stores therein terminals 100 of the wiring materials 97.

In order to install the terminals 100 into the female connector 37', they may be fit into the female connector 37' when molding it (insert molding). Alternatively, in order to enable the exchange of the wiring materials 97, the female connecter 37' and the terminals 100 of the wiring materials 97 are both preferably made so as to be detachable. Therefore, in the present embodiment, an hold 101 is formed so that the terminals 100 can be fit into the female connector 37' through the hole 101 after the female connector 37' is formed by molding. The hole 101 has a uniform diameter in and outside the casing 1. Thus, when exchanging the wiring materials 97' with new wiring materials 97', only by pushing the terminals 100 outward from the female connector 37', the terminals 100 can taken out of the female connector 37'. In this arrangement, because the duct 93" is not required to be taken out of the casing 1 for exchange the wiring materials 97' with new ones, the wiring materials 97' can be easily recovered.

Other than the above, the refrigerating and cooling device of the present embodiment has the same configurations as that of the eighth embodiment, and the communication controls are carried out in the same manner as those described in the eighth embodiment.

According to the arrangement of the present embodiment, only by installing the duct 93" into the casing 1, the female connecter 37' can be connected to the sub-control section 25. Therefore, this arrangement has an advantage of high operation efficiency. Moreover, the above arrangement has the same effects as the ninth embodiment, for example, because the wiring materials 97 are provided in the duct 93", the wiring materials 97 can be protected from being disconnected.

As described, the communication system of the present embodiment designed for a refrigerator including a plurality of internal devices comprises:

at least one sub-control means for controlling operations of the internal devices, the sub-control means being placed in the vicinity of the corresponding internal device so as to be connected thereto;

main control means for controlling the electric device by controlling the sub-control means;

single communication line for connecting the main control means and the sub-control means so as to permit communications between them;

wiring member for supplying power, the wiring members connecting the main control means and the sub-control means; and connecting member for connecting both the communication line and the wiring members to the sub-control means so as to be detachable, and wherein the main control means includes:

first transmission means for transmitting a message to the sub-control means through the communication line;

first receiving means for receiving a message from the sub-control means through the communication line, and the sub-control means includes:

second transmission means for transmitting a message to the main control means through the communication line, and second receiving means for receiving a message from the main control means through the communication line, and wherein the refrigerator includes a pipe-shaped cold air guide member for guiding cold air into compartments, the cold air guide member being provided on the back surface of the refrigerator, the cold air guide member and the connecting member are integrally provided, and the communication line and the wiring member are inserted into the space of the cold air guide member.

In the above arrangement, the following effect can be achieved in addition to the effects of the nine embodiment. That is, the process for installing the cold air guide member and the process for connecting the wiring member to the sub-control means can be carried out at the same time, thereby achieving simplified processes for assembling the refrigerator.

[EMBODIMENT 13]

Figure 42:
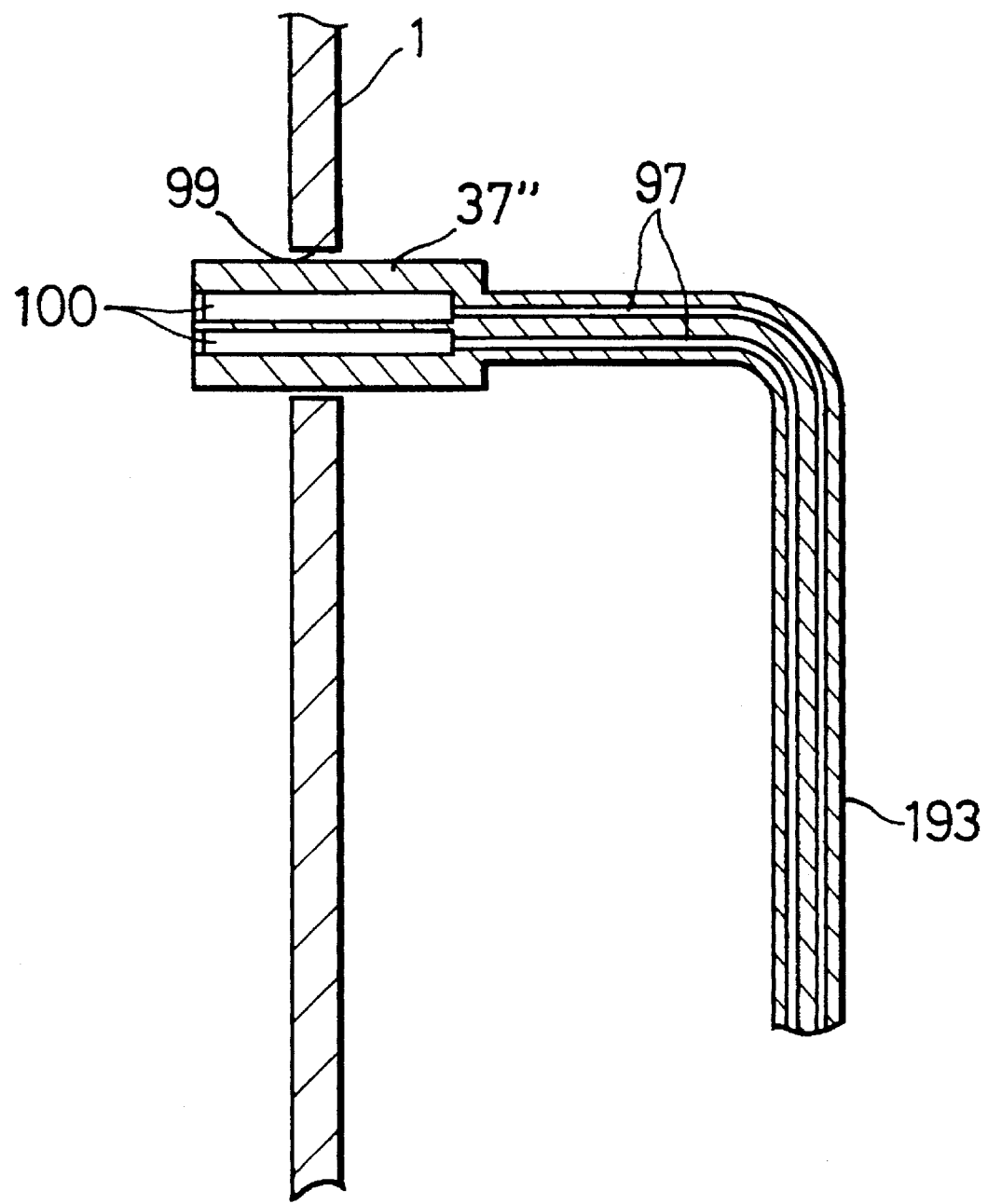

The following description will discuss the thirteenth embodiment of the present invention with reference to FIG. 42.

For convenience, members having the same functions and configurations as in the figures used in the aforementioned embodiments will be designated by the same code and their descriptions will be omitted.

As shown in FIG. 42, in the refrigerating and cooling device of the present embodiment, a duct 193 (cold air guide member) is a resin molding, and when forming the duct 193 by molding, the wiring materials 97 (communication line and wiring member) are buried into the duct 193 (insert molding). The female connector 37" (connecting member) for connecting the wiring materials 97 to each sub-control section 25 is integrally formed with the duct 193 so as to be fit thereto. Further, the terminals 100 of the wiring materials 97 are buried into the female connector 37" when molding the female connector 37" (insert molding).

Other than the above, the refrigerating and cooling device of the present embodiment has the same configurations as that of the eighth embodiment, and the communication controls are carried out in the same manner as those described in the eighth embodiment.

According to the arrangement of the present embodiment, only by installing the duct 193 into the casing 1, the female connecter 37" can be connected to the sub-control section 25 at the same time, and the process for securing the wiring materials 97 is not required. Therefore, this arrangement permits a significant reduction in the manufacturing processes. Moreover, because the wiring materials 97 are provided so as to be buried into the inner wall of the duct 193, the wiring materials 97 can be protected from being disconnected not only after the refrigerator has been manufactured but also during the processes for assembling the refrigerator.

As described, the communication system of the present embodiment designed for a refrigerator including a plurality of internal devices comprises:

at least one sub-control means for controlling operations of the internal devices, the sub-control means being placed in the vicinity of the corresponding internal device so as to be connected thereto;

main control means for controlling the electric device by controlling the sub-control means;

single communication line for connecting the main control means and the sub-control means so as to permit communications between them; and wiring member for supplying power, the wiring members connecting the main control means and the sub-control means, and wherein the main control means includes:

first transmission means for transmitting a message to the sub-control means through the communication line;

first receiving means for receiving a message from the sub-control means through the communication line, and the sub-control means includes:
second transmission means for transmitting a message to the main control means through the communication line, and
second receiving means for receiving a message from the main control means through the communication line, and
wherein the refrigerator includes a pipe-shaped cold air guide member for guiding cold air into compartments, the cold air guide member being provided on the back surface of the refrigerator, and
the communication line and the wiring member are buried in the wall of the cold air guide member.

In the above arrangement, the required number of wires can be reduced as in the case of the first embodiment. Moreover, because the communication line and wiring members are buried in the wall of the cold air guide member, they can be protected by the cold air guide member. Therefore, in the manufacturing process or when being used, even if the back surface of the refrigerator is hit by external forces, the communication line and the wiring members can be prevented from being disconnected. Moreover, because components for securing the wires such as tape, etc., required in the conventional model are not required, the required number of components can be reduced. Moreover, because the communication line and the wiring member hide under the cold air guide member, the appearance of the back surface of the refrigerator can be improved without providing a back plate on the back surface of the refrigerator. Furthermore, because the wires (communication line and the wiring member) and the cold air guide member are provided as one integral part, the components can be easily dealt with.

The communication system of the present embodiment, having the above arrangement may be arranged so as to further comprise a connecting member for connecting both the communication line and the wiring members to the sub-control means so as to be detachable wherein the cold air guide member and the connecting member are integrally formed.

In this arrangement, the process for installing the cold air guide member and the processes for connecting the communication line and the wiring members to the sub-control means can be carried out at the same time, thereby achieving the simplified assembling processes of the refrigerator in addition to the above effects.

[EMBODIMENT 14]

Figure 43:
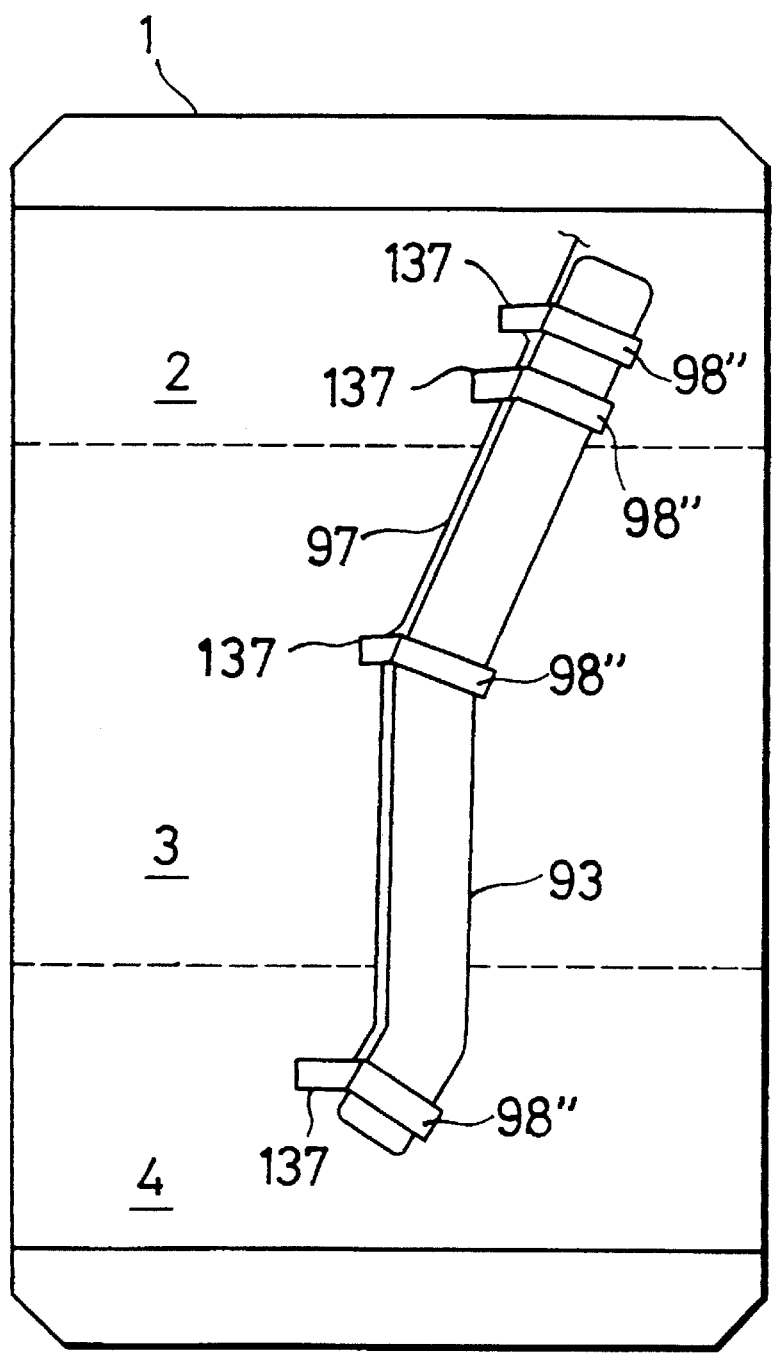
Figure 44:
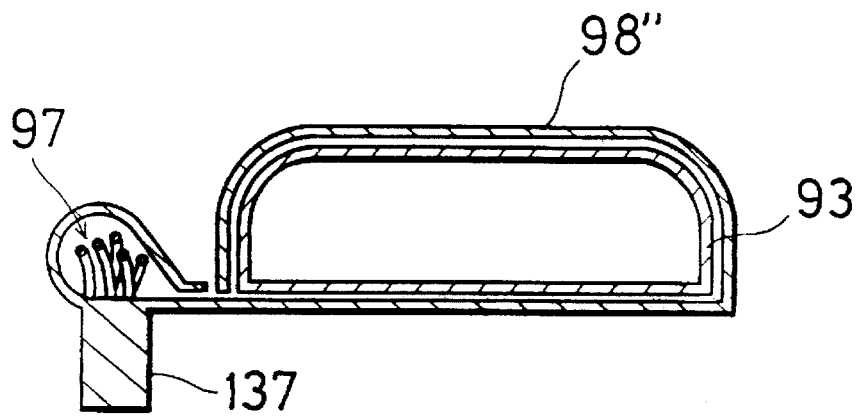

The following description will discuss the fourteenth embodiment of the present invention with reference to FIGS. 43 and 44.

For convenience, members having the same functions and configurations as in the figures used in the aforementioned embodiments will be designated by the same code and their descriptions will be omitted.

As shown in FIG. 44, in the arrangement of the refrigerating and cooling device of the present embodiment, a guide 98" (guide member) for guiding the wiring materials 97 (communication line and wiring member) along the duct 93 (cold air guide member) is a resin molding. The guide 98" is provided with a female connector 137 (connection means) for connecting the wiring materials 97 to each sub-control section 25. The female connector 137 is integrally formed with the guide 98" so as to be attached thereto when the guide 98" is formed by molding.

Additionally, the guide 98" has the same appearance as the guide 98 (see FIG. 38) of the tenth embodiment. As in the case of the guide 98 in the tenth embodiment, the guide 98" is formed so as to be detachable from the duct 93.

Other than the above, the refrigerating and cooling device of the present embodiment has the same arrangements as the eighth embodiment, and the same communication control is carried out as the eighth embodiment.

When installing the guide 98" with the female connector 137 integrally provided thereto to the duct 93, the guide 98" is inserted from the upper end or the lower end of the duct 93, and fixed at the position corresponding to each sub-control section 25 as shown in FIG. 43. Additionally, in considering the convenience in positioning the guide 98", a shallow groove (portion for positioning the guide member) is preferably formed in the duct 93 at the position where the guide 98" is placed.

In the above arrangement, after installing the guide 98" into the duct 93, by fitting the duct 93 into the casing 1, the female connecter 137 can be connected to the sub-control section 25 at the same time.

In checking or repairing the wiring materials 97, the wiring materials 97 are taken out of the duct 93 together with the guide 98" with the female connector 137 integrally provided thereto. As a result of checking, if any trouble is detected on the wiring materials. 97, such as disconnection, etc., the used wiring materials 97 should be thrown away, and replaced with new wiring materials 97. In this case, as in the case of the twelfth embodiment (see FIG. 41), a hole (not shown) is formed for fitting the terminals 100 of the wiring materials 97 into the female connector 137 so that the terminals 100 are detachable from the female connector 137. In this way, after the disposal of the damaged wiring materials 37, the guide 98" and the female connector 137 can be still used.

As described, the communication system of the present embodiment designed for a refrigerator including plurality of internal devices comprises:

at least one sub-control means for controlling operations of the internal devices, the sub-control means being placed in the vicinity of the corresponding internal device so as to be connected thereto;

main control means for controlling the electric device by controlling the sub-control means; and single communication line for connecting the main control means and the sub-control means so as to permit communications between them; and wiring member for supplying power, the wiring members connecting the main control means and the sub-control means, and wherein the main control means includes:
first transmission means for transmitting a message to the sub-control means through the communication line;
first receiving means for receiving a message from the sub-control means through the communication line, and the sub-control means includes:
second transmission means for transmitting a message to the main control means through the communication line; and
second receiving means for receiving a message from the main control means through the communication line, and wherein the refrigerator includes:
a pipe-shaped cold air guide member for guiding cold air into compartments, the cold air guide member being provided on the back surface of the refrigerator; and
guide member for guiding the communication line and the wiring members along the cold air guide member, the guide member being provided along the cold air guide member, and the guide member and the connecting member are integrally formed.

In this arrangement, the process for installing the cold air guide member and the processes for connecting the communication line and the wiring members to the sub-control means can be carried out at the same time, thereby achieving the simplified assembling processes of the refrigerator in addition to the effects of tenth embodiment.

[EMBODIMENT 15]

Figure 45:
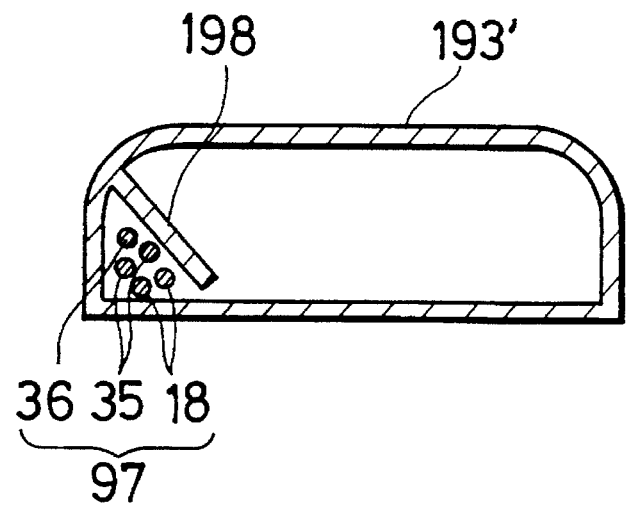
Figure 46:
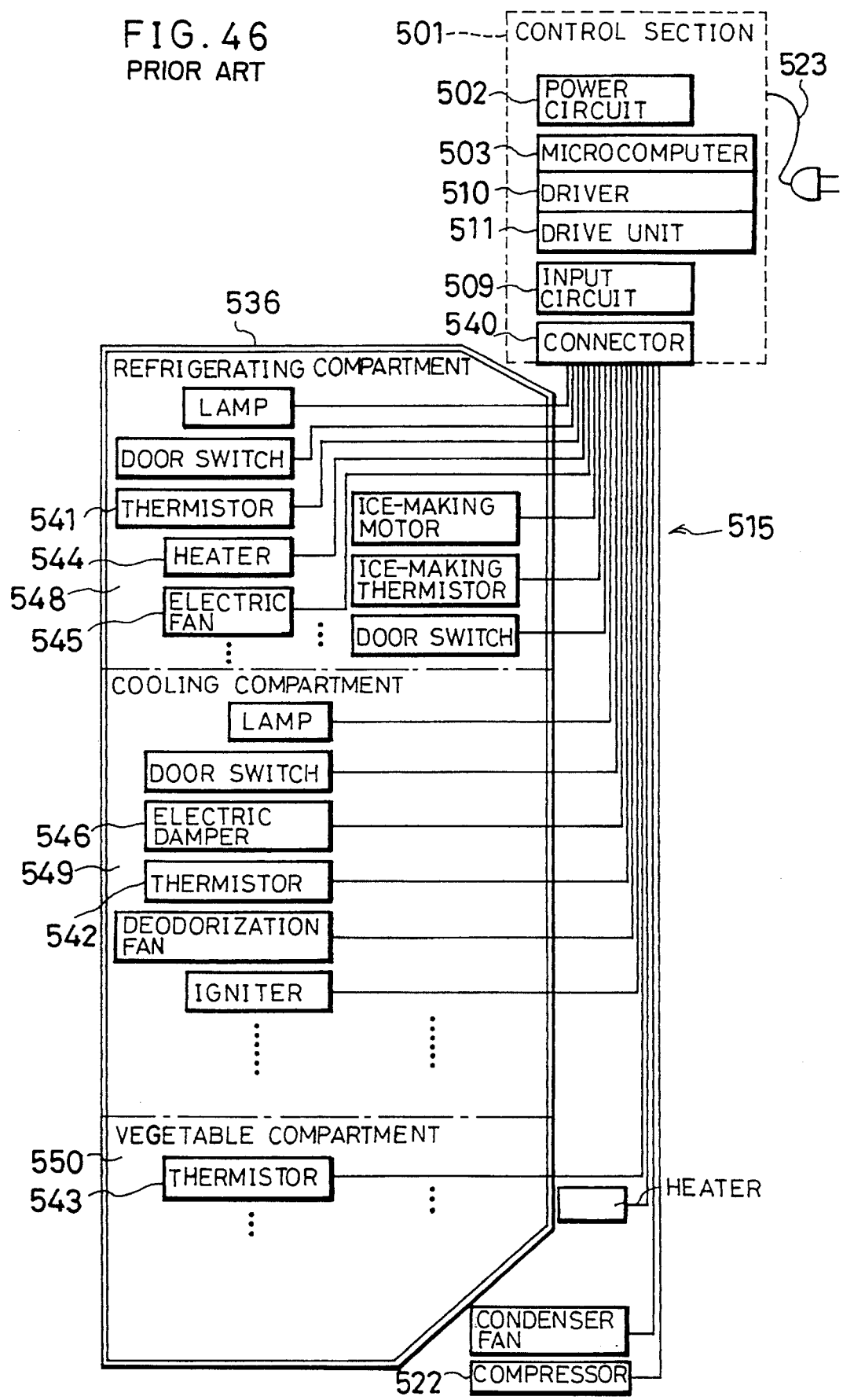
FIG. 46 through FIG. 48 show prior art.
Figure 47:
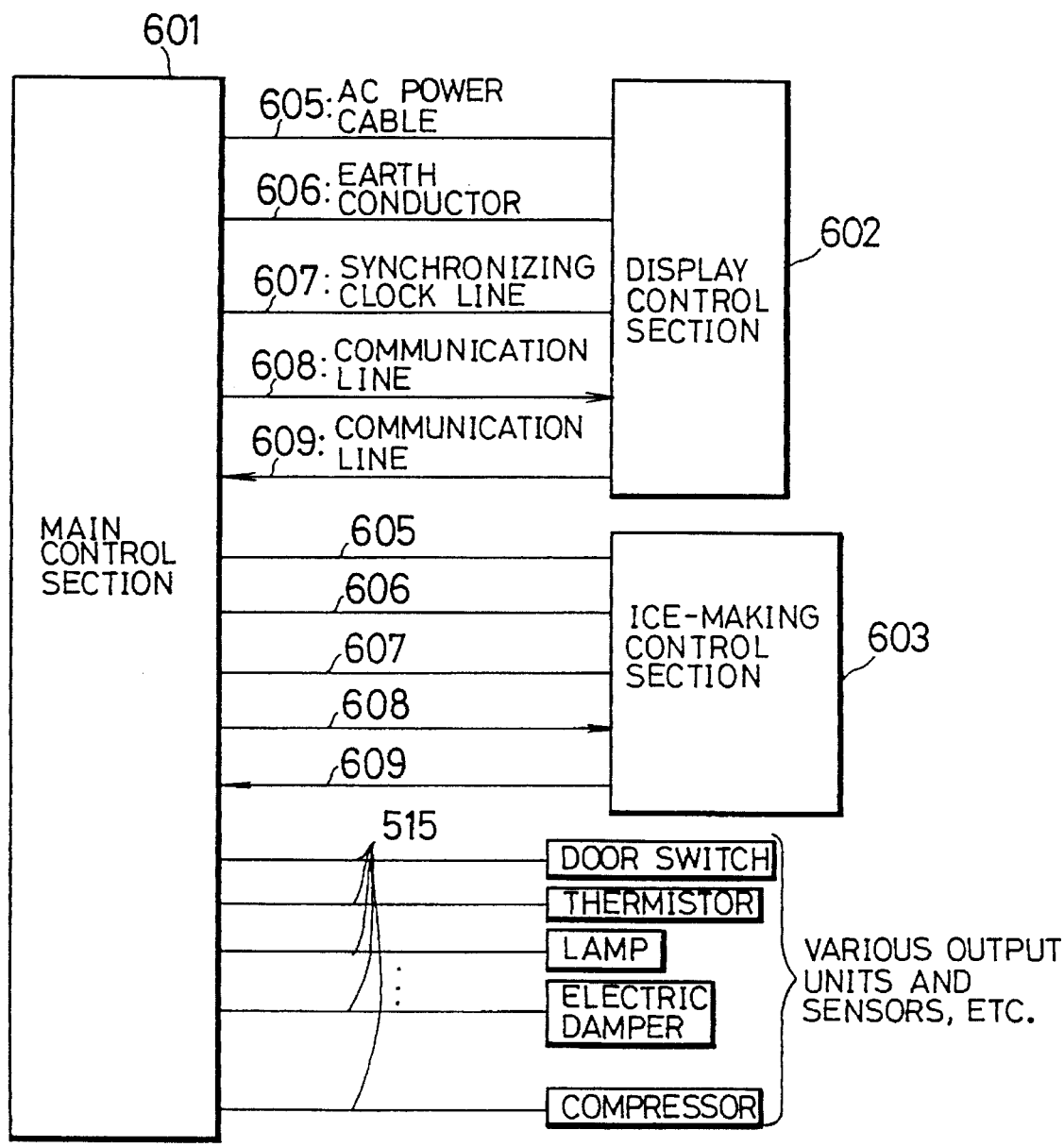
Figure 48:
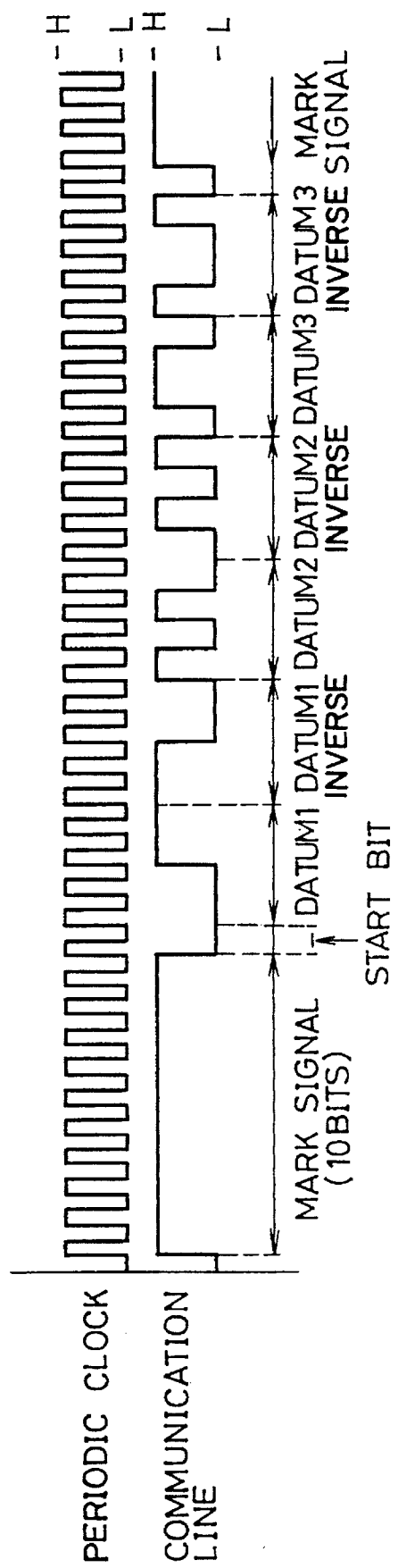

The following description will discuss the fifteenth embodiment of the present invention with reference to FIG. 45.

For convenience, members having the same functions and configurations as in the figures used in the aforementioned embodiments will be designated by the same code and their descriptions will be omitted.

As shown in FIG. 45, in the refrigerating and cooling device of the present embodiment, the wiring materials 97 (communication line and wiring member) are inserted into a duct 193' (cold air guide member) provided on the back surface of the casing 1 as in the case of the ninth embodiment. Further, guides 198 (guide member) for guiding the wiring materials 97 along the duct 193' are provided in the duct 193'.

Other than the above, the refrigerating and cooling device of the present embodiment has the same arrangements as the eighth embodiment, and the same communication control is carried out as the eighth embodiment.

In the above arrangement, the position of the wiring materials 97 in the duct 193' is positioned by the guides 198. As shown in FIG. 45, by bundling the wiring materials 97 at a corner within the duct 193' using the guides 198, cold air can be flown into the duct 193' without being disturbed.

As described, the communication-system of the present embodiment designed for a refrigerator including a plurality of internal devices comprises:

at least one sub-control means for controlling operations of the internal devices, the sub-control means being placed in the vicinity of the corresponding internal device so as to be connected thereto;

main control means for controlling the electric device by controlling the sub-control means;

single communication line for connecting the main control means and the sub-control means so as to permit communications between them; and wiring member for supplying power, the wiring members connecting the main control means and the sub-control means, and wherein the main control means includes:

first transmission means for transmitting a message to the sub-control means through the communication line;

first receiving means for receiving a message from the sub-control means through the communication line, and the sub-control means includes:

second transmission means for transmitting a message to the main control means through the communication line; and second receiving means for receiving a message from the main control means through the communication line, and wherein the refrigerator includes:

a pipe-shaped cold air guide member for guiding cold air into compartments, the cold air guide member being provided on the back surface of the refrigerator; and guide member for guiding the communication line and the wiring members along the cold air guide member, the guide member being provided along the cold air guide member, and the guide member is provided within the space of the cold air guide member, and the communication line and the wiring member are inserted into the space of the cold air guide member.

In the above arrangement, because the respective positions of the communication line and the wiring member which are inserted into the cold air guide member are positioned by the guide member, air flow in the cold air guide member can be stabilized in addition to the effects of the ninth embodiment.

The invention being thus described, it will be obvious that the same way be varied in many ways such variations are not to be regarded as a departure from the spirit and scope of the invention, and all such modifications as would be obvious to one skilled in the art are intended to be included within the scope of the following claims.

What is claimed is:

1. A communication system, provided in an electric refrigerator including a plurality of internal devices, comprising:

at least one sub-control means for controlling operations of the internal devices, said sub-control means being placed in a vicinity of a corresponding internal device so as to be connected thereto;

main control means for controlling the electric device by controlling said sub-control means;

a single communication line for connecting said main control means and said sub-control means so as to permit communications between them;

wherein said main control means includes:

first transmission means for transmitting a message to said sub-control means through said communication line; and first receiving means for receiving a message from said sub-control means through said communication line, and said sub-control means includes;

second transmission means for transmitting a message to said main control means through said communication line; and second receiving means for receiving a message from said main control means through said communication line;

wiring members for supplying power, said wiring members connecting said main control means and said sub-control means;

said first transmission means of said main control means and said second transmission means of said sub-control means are provided between one of said wiring members and said communication lines;

said first transmission means and said second transmission means respectively include:

first switching means for switching a state of said communication line between a low level and a high level by connecting and disconnecting it to one of said wiring members, and first transmission control means for controlling switching operations of said first switching means;

said first transmission means and said second transmission means respectively transmit messages through said communication line by controlling the switching operations of said first switching means using said first transmission control means;

wherein the refrigerator includes a pipe-shaped cold air guide member for guiding cold air into compartments, said cold air guide member being provided on a back surface of the refrigerator, and said communication line and said wiring members are inserted within a space of said cold air guide member.

2. The communication system as set forth in claim 1, wherein:

said wiring members include a pair of AC power feeders for feeding AC power and a pair of DC power feeders for feeding DC power.

3. The communication system as set forth in claim 1, further comprising:

a connecting member for connecting both said communication line and said wiring members to said sub-control means so as to be detachable, and wherein said cold air guide member and said connecting member are integrally formed.

4. The communication system as set forth in claim 3, wherein:

said connecting member includes a hole for fitting thereto respective terminals of said communication line and said wiring members for enabling them to be detachable from said connecting member.

5. A communication system provided in an electric refrigerator including a plurality of internal devices, comprising:

at least one sub-control means for controlling operations of the internal devices, said sub-control means being placed in a vicinity of a corresponding internal device so as to be connected thereto;

main control means for controlling the electric device by controlling said sub-control means;

a single communication line for connecting said main control means and said sub-control means so as to permit communications between them;

wherein said main control means includes:

first transmission means for transmitting a message to said sub-control means through said communication line; and first receiving means for receiving a message from said sub-control means through said communication line, and said sub-control means includes;

second transmission means for transmitting a message to said main control means through said communication line; and second receiving means for receiving a message from said main control means through said communication line;

wiring members for supplying power, said wiring members connecting said main control means and said sub-control means;

said first transmission means of said main control means and said second transmission means of said sub-control means are provided between one of said wiring members and said communication lines;

said first transmission means and said second transmission means respectively include:

first switching means for switching a state of said communication line between a low level and a high level by connecting and disconnecting it to one of said wiring members, and first transmission control means for controlling switching operations of said first switching means;

said first transmission means and said second transmission means respectively transmit messages through said communication line by controlling the switching operations of said first switching means using said first transmission control means;

and a guide member for guiding said communication line and said wiring members along a cold air guide member, said guide member being provided along said cold air guide member.

6. The communication system as set forth in claim 5, wherein:

said guide member includes fixing means which removably secures said guide member to said cold air guide member.

7. The communication system as set forth in claim 6, wherein:

said fixing means includes a ring-shaped fixing member whose inner periphery is slightly larger than an outer periphery of said cold air guide member, said ring-shaped fixing member being shaped so as to fit an outer shape of said cold air guide member.

8. The communication system as set forth in claim 7, wherein said guide member is formed by bending a plate and is composed of:

a cable securing member for securing said communication line and said wiring members by bundling them, said cable securing member being formed by bending one end of the plate to be circular in shape, and said fixing member formed by bending the other end of the plate so as to fit the outer shape of said cold air guide member.

9. The communication system as set forth in claim 8, wherein:

a front portion of said cable securing member is made of an elastic material so that it can be freely deformed.

10. The communication system as set forth in claim 6, wherein:

the fixing means is a portion of said cold air guide member.

11. The communication system as set forth in claim 5, wherein:

said cold air guide member and said guide member are integrally formed.

12. The communication system as set forth in claim 11, wherein:

said guide member is provided outside said cold air guide member.

13. The communication system as set forth in claim 11, wherein:

said guide member is provided within the space of said cold air guide member, and said communication line and said wiring members are inserted within the space of said cold air guide member.

14. The communication system as set forth in claim 5, further comprising:

a connecting member for connecting both said communication line and said wiring members to said sub-control means so as to be detachable, and wherein said guide member and said connecting member are integrally formed.

15. The communication system as set forth in claim 14, wherein:

said connecting member includes a hole for fitting thereto respective terminals of said communication line and said wiring members for enabling them to be detachable from said connecting member.

16. A communication system, provided in an electric refrigerator including a plurality of internal devices, comprising:

at least one sub-control means for controlling operations of the internal devices, said sub-control means being placed in a vicinity of a corresponding internal device so as to be connected thereto;

main control means for controlling the electric device by controlling said sub-control means;

a single communication line for connecting said main control means and said sub-control means so as to permit communications between them;

wherein said main control means includes:

first transmission means for transmitting a message to said sub-control means through said communication line; and first receiving means for receiving a message from said sub-control means through said communication line, and said sub-control means includes;

second transmission means for transmitting a message to said main control means through said communication line; and second receiving means for receiving a message from said main control means through said communication line;

wiring members for supplying power, said wiring members connecting said main control means and said sub-control means;

said first transmission means of said main control means and said second transmission means of said sub-control means are provided between one of said wiring members and said communication lines;

said first transmission means and said second transmission means respectively include:

first switching means for switching a state of said communication line between a low level and a high level by connecting and disconnecting it to one of said wiring members, and first transmission control means for controlling switching operations of said first switching means;

said first transmission means and said second transmission means respectively transmit messages through said communication line by controlling the switching operations of said first switching means using said first transmission control means;

wherein said communication line and said wiring members are located in a wall of a cold air guide member.

17. The communication system as set forth in claim 16, further comprising:

a connecting member for connecting both said communication line and said wiring members to said sub-control means so as to be detachable, and wherein said cold air guide member and said connecting member are integrally formed.

18. A refrigerator, comprising:

wiring members for electrically connecting members provided in the refrigerator;

a pipe-shaped cold air guide member for guiding cold air into compartments, said pipe-shaped cold air guide member being provided on a back surface of the refrigerator; and a connector formed at one end of said wiring members, for electrically connecting said wiring members to the back surface of said refrigerator, wherein said wiring members are provided in an internal space of said cold air guide member or located in the wall of said cold air guide member, and said connector is integrally formed with said pipe-shaped cold air guide member at a connecting portion of said pipe-shaped cold air guide member with the back surface of said refrigerator.

19. A refrigerator, comprising:

wiring members for electrically connecting members provided in the refrigerator;

a pipe-shaped cold air guide member for guiding cold air into compartments, said cold air guide member being provided on a back surface of the refrigerator;

a connector formed at one end of said wiring members, for electrically connecting said wiring members to the back surface of said refrigerator; and a guide member for guiding said wiring members along said cold air guide member said guide member being provided along said cold air guide member, wherein said connector is integrally formed with said pipe-shaped cold air guide member at a connecting portion of said pipe-shaped cold air guide member with the back surface of said refrigerator.

* * * * *